United States Patent
Gotoh et al.

(10) Patent No.: US 7,324,416 B2
(45) Date of Patent: Jan. 29, 2008

(54) INFORMATION RECORDING MEDIUM, METHOD FOR SIMULTANEOUS RECORDING AND REPRODUCTION, AND INFORMATION RECORDING AND REPRODUCTION APPARATUS

(75) Inventors: Yoshiho Gotoh, Osaka (JP); Miyuki Sasaki, Osaka (JP); Kaoru Murase, Nara (JP); Tatsushi Bannai, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 11/746,673

(22) Filed: May 10, 2007

(65) Prior Publication Data

US 2007/0206465 A1    Sep. 6, 2007

Related U.S. Application Data

(62) Division of application No. 10/488,020, filed on Feb. 27, 2004, now Pat. No. 7,233,553.

(51) Int. Cl.
*G11B 7/007* (2006.01)

(52) U.S. Cl. .................. 369/47.32; 360/55
(58) Field of Classification Search ........... 369/47.32; 360/55
See application file for complete search history.

(56) References Cited

U.S. PATENT DOCUMENTS

| | | | |
|---|---|---|---|
| 5,353,276 A | 10/1994 | Schröder | |
| 6,141,715 A | 10/2000 | Porterfield | |
| 6,208,703 B1 | 3/2001 | Cavanna et al. | |
| 6,240,244 B1 | 5/2001 | Ikeda | |
| 6,249,362 B1 | 6/2001 | Sato et al. | |
| 6,285,632 B1 | 9/2001 | Ueki | |
| 6,639,746 B1 | 10/2003 | Chung et al. | |
| 6,697,958 B1* | 2/2004 | Yada et al. | 714/6 |
| 6,876,664 B1* | 4/2005 | Bullis et al. | 370/429 |
| 7,002,909 B2 | 2/2006 | Hagopian et al. | |

FOREIGN PATENT DOCUMENTS

EP    913828 A2 *   5/1999

(Continued)

OTHER PUBLICATIONS

Hungarian Office Action for corresponding PCT Application No. PCT/JP02/08767, dated Oct. 26, 2004.

*Primary Examiner*—Gautam R. Patel
(74) *Attorney, Agent, or Firm*—Renner, Otto, Boisselle & Sklar, LLP

(57) ABSTRACT

In order to perform simultaneous recording and reproduction, a large capacity of buffer memories were required. In addition, it was difficult to record data while reproducing data which was recorded by a different apparatus. The present invention has an objective of providing an information recording medium, a simultaneous recording and reproduction method, and an information recording and reproduction apparatus which guarantee simultaneous recording and reproduction. The simultaneous recording and reproduction is guaranteed by reproducing data recorded in an area having at least a minimum size fulfilling the simultaneous recording and reproduction condition which allows for four access operations, recording data in an area having at least the same size, and performing reproduction and recording alternately by switching reproduction to recording when the data amount in the reproduction buffer becomes full and switching recording to reproduction when the data amount in the recording buffer becomes empty.

13 Claims, 31 Drawing Sheets

FOREIGN PATENT DOCUMENTS

| | | |
|---|---|---|
| HU | 216 451 B | 6/1999 |
| HU | 216 669 B | 8/1999 |
| JP | 9-63190 | 3/1997 |
| JP | 10-214455 | 8/1998 |
| JP | 10-322662 | 12/1998 |
| JP | 11-102574 | 4/1999 |
| JP | 2001-43631 | 2/2001 |
| JP | 2001-167519 | 6/2001 |
| WO | 92-05556 A1 | 4/1992 |
| WO | 99/48094 | 9/1999 |

\* cited by examiner

INFORMATION RECORDING MEDIUM, METHOD FOR SIMULTANEOUS RECORDING AND REPRODUCTION, AND INFORMATION RECORDING AND REPRODUCTION APPARATUS

This application is a division of U.S. application Ser. No. 10/488,020 filed Feb. 27, 2004 now U.S. Pat No. 7,233,553, the entire disclosure of which is incorporated herein by reference.

TECHNICAL FIELD

The present invention relates to an information recording medium, a method for simultaneous recording and reproduction, and an information recording and reproduction apparatus capable of simultaneous recording and reproduction of a plurality of pieces of real time data.

BACKGROUND ART

One exemplary information recording medium having a sector structure is a hard disc. Hard discs, which are increasing more and more in memory capacity and used for multimedia contents, are applied in wider fields including personal computers and various consumer apparatuses.

Hereinafter, simultaneous recording and reproduction in a conventional hard disc will be described with reference to the figures. In hard discs, the size of recording and reproduction areas is pre-fixed to be a unit larger than a sector, and access is performed in units of fixed-size block.

FIG. 2 shows a model for simultaneously recording and reproducing a plurality of pieces of real time data. This model includes a pickup 74 for recording real time data to and reproducing real time data from an information recording medium, an encoder 70 for encoding first real time data, a recording buffer 72 for temporarily storing the encoded first real time data before the first real time data is recorded by the pickup 74, a reproduction buffer 73 for temporarily storing second real time data which is reproduced by the pickup 74, and a decoder 71 for decoding the second real time data which is transferred from the reproduction buffer 73.

FIG. 30 shows an example in which two pieces of real time data are simultaneously recorded and reproduced while ensuring continuity using the recording buffer 72 and the reproduction buffer 73. In this example, while the first real time data is recorded in areas 81 and 84 of an information recording medium, the second real time data which is recorded in areas 83 and 85 of the information recording medium is reproduced.

In FIG. 30, A81, A82 and A83 refer to operations of the pickup 74 of moving between areas to be accessed (access operations). It is assumed here that the time required for each of the access operations A81, A82 and A83 is a time period required for the pickup 74 to move between an innermost area and an outermost area of the information recording medium (i.e., the maximum access time Ta). It is also assumed that the data transfer rate between the pickup 74 and the recording buffer 72 and the data transfer rate between the pickup 74 and the reproduction buffer 73 are a constant rate Vt. It is also assumed that the data transfer rate between the encoder 70 and the recording buffer 72 and the data transfer rate between the decoder 71 and the reproduction buffer 73 are a constant rate Vd. In the case where the data to be recorded and reproduced is compressed at a variable rate, Vd is the maximum value of the range in which the rate is variable.

In a recording operation W81, data accumulated in the recording buffer 72 is all recorded in the area 81. Then, data is accumulated in the recording buffer 72 during the access operation A81, a reproduction operation R81 and the access operation A82. In a recording operation W82, data accumulated in the recording buffer 72 is all recorded in the area 84. Then, data is accumulated in the recording buffer 72 during the access operation A83, a reproduction operation R82 and the next access operation (not shown).

During the recording operation W81 and the access operation A81, data accumulated in the reproduction buffer 73 is consumed, and data is accumulated in the reproduction buffer 73 during the reproduction operation R81. Then, during the access operation A82, the recording operation W82 and the access operation A83, data accumulated in the reproduction buffer 73 is consumed, and data is accumulated in the reproduction buffer 73 during the reproduction operation R82.

In the case where the transfer rate of the data to be recorded and the transfer rate of the data to be reproduced are each constant, the data amount in the recording buffer 72 is balanced between a recording state and a non-recording state. The data amount in the reproduction buffer 73 is also balanced between a reproduction state and a non-reproduction state. Since the recording of the first real time data and the reproduction of the second real time data are performed alternately, the two pieces of real time data can be recorded and reproduced continuously.

The example shown in FIG. 30 shows a condition for the minimum size of the areas in which data can be recorded and reproduced. Namely, since it cannot be defined where in the information recording medium (disc) the areas for recording and reproduction exist, the access between the recording area and the reproduction area is considered based on the maximum access time including the time period until the rotation rate of the disc becomes a desired value.

FIG. 31 shows a transition in the data amount in the recording buffer 72 and the reproduction buffer 73 while the data is recorded and reproduced at a variable rate. In the case where data of more than or equal to the size of the recording area is not accumulated in the recording buffer 72 at the time of termination of a series of operations of: a recording operation W91, an access operation A91, a reproduction operation R91 and an access operation A92; a low recording rate results in the state where there is no sufficient data to be recorded. Thus, the recording operation is temporarily interrupted, which extends the time required for recording. In this case, an access operation A93 is performed for accessing an area next to the area in which real time data has been recorded, and thus a reproduction operation R92 is performed. In the case as described above where the data is recorded and access is performed, both in units of fixed-size block, the memory size required for the recording buffer 72 is a sum of the amount of data accumulated during the two access operations and one reproduction operation and the size of the fixed block. The reproduction buffer 73 needs to have the same memory size as that of the recording buffer 72.

In the case of a hard disc, data transfer capability is high. Therefore, the size of the fixed block can be reduced and the size of the buffer memory can also be reduced.

However, when the above-described system of simultaneous recording and reproduction is applied to an optical disc, there is a problem in that a large buffer memory is necessary. The reasons are that the data transfer rate of the optical disc is low and the access time is long. In order to perform simultaneous recording and reproduction for a disc having data recorded thereon by a different apparatus, there is another problem that compatibility needs to be ensured for stable simultaneous recording and reproduction.

DISCLOSURE OF THE INVENTION

A method according to the present invention is for simultaneously recording and reproducing a plurality of pieces of real time data in accordance with a simultaneous recording and reproduction model. The simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj. The method includes the steps of searching for an unassigned area in a volume space in the information recording medium and assigning at least one unassigned area in the volume space as an area Ai in which the real time data Di is to be recorded; executing a recording operation Wi for recording the real time data Di accumulated in the recording buffer WBi in the area Ai; executing a reproduction operation Rj for reading the real time data Dj from an area Aj having the real time data Dj recorded therein; determining whether the recording buffer WBi is empty or not while the recording operation Wi is being executed; when the recording buffer WBi is determined to be empty, switching the recording operation Wi to another recording operation Wi or a reproduction operation Rj; and when the recording buffer WBi is determined not to be empty, continuing the recording operation Wi; and determining whether the reproduction buffer RBj is full or not while the reproduction operation Rj is being executed; when the reproduction buffer RBj is determined to be full, switching the reproduction operation Rj to another reproduction operation Rj or a recording operation Wi; and when the reproduction buffer RBj is determined not to be full, continuing the reproduction operation Rj. Each of the at least one area assigned as the area Ai is structured to fulfill a condition that the recording buffer WBi can be made empty by at most one access operation and at most two recording operations. Each of the at least one area assigned as the area Aj is structured to fulfill a condition that the reproduction buffer RBj can be made full by at most one access operation and at most two reproduction operations. i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

Each of at least one area assigned as the area Ai has a size of Y or greater, and each of the at least one area assigned as the area Aj has a size of Y or greater. $Y=2 \times n \times Ta \times Vd \times Vt \div (Vt-n \times Vd)$. Ta is an access time required for the pickup P to access between an innermost area and an outermost area of the information recording medium. Vt is a data transfer rate between the pickup P and the recording buffer WBi, and also a data transfer rate between the pickup P and the reproduction buffer RBj. Vd is a data transfer rate between the encoding module EMi and the recording buffer WBi, and also a data transfer rate between the decoding module DMj and the reproduction buffer RBj, for all values of i and j.

Each of the at least one area assigned as the area Ai has a size of Yi or greater, and each of the at least one area assigned as the area Aj has a size of Yj or greater. $Yi=(2 \times n \times Ta \times Vt \times Vdi) \div \{Vt-(Vd1+Vd2+ \ldots +Vdn)\}$; and $Yj=(2 \times n \times Ta \times Vt \times Vdj) \div \{Vt-(Vd1+Vd2+ \ldots Vdn)\}$. Ta is an access time required for the pickup P to access between an innermost area and an outermost area of the information recording medium. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

The method further includes the steps of estimating a first access time required for the pickup P to access from an area Ak to an area Al and a second access time required for the pickup P to access from one area among at least one area assigned as the area Ak to another area, where k and l are each any integer of 1 or greater and n or less, and k≠l.

Each of the at least one area assigned as the area Ai has a size of Y or greater, and each of the at least one area assigned as the area Aj has a size of Y or greater. $Y=\{2 \times (T1+ \ldots +Tn) \times Vt \times Vd\} \div (Vt-n \times Vd)$. Tk is the first access time or the second access time. Vt is a data transfer rate between the pickup P and the recording buffer WBi, and also a data transfer rate between the pickup P and the reproduction buffer RBj. Vd is a data transfer rate between the encoding module EMi and the recording buffer WBi, and also a data transfer rate between the decoding module DMj and the reproduction buffer RBj, for all values of i and j.

Each of the at least one area assigned as the area Ai has a size of Yi or greater, and each of the at least one area assigned as the area Aj has a size of Yj or greater. $Yi=\{2 \times (T1+ \ldots +Tn) \times Vt \times Vdi\} \div \{Vt-(Vd1+Vd2+ \ldots +Vdn)\}$; and $Yj=\{2 \times (T1+ \ldots +Tn) \times Vt \times Vdj\} \div \{Vt-(Vd1+Vd2+ \ldots +Vdn)\}$. Tk is the first access time or the second access time. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

The area Ai and the area Aj are provided in an outer portion of the information recording medium, for all values of i and for all values of j.

A method according to the present invention is for simultaneously recording and reproducing a plurality of pieces of real time data in accordance with a simultaneous recording and reproduction model. The simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj. The method includes the steps of searching for an unassigned area in a volume space in the information recording medium and assigning at least one unassigned area in the volume space as an area Ai in which the real time data Di is to be recorded; executing a recording operation Wi for recording the real time data Di accumulated in the recording buffer WBi in the area Ai; executing a reproduction operation Rj for reading the real time data Dj from an area Aj having the real time data Dj recorded therein; determining whether the real time data Di has been recorded up to an end of one of at least one area assigned as the area Ai or not in the recording operation Wi; when the real time data Di is determined to have been recorded up to the end, switching the recording operation Wi to another recording operation Wi or a reproduction operation Rj; and when the real time data Di is determined not to have been recorded up to the end, continuing the recording operation Wi; and determining whether the real time data Dj has been reproduced up to an end of one of at least one area assigned as the area Aj or not in the reproduction operation Rj; when the real time data Dj is determined to have been reproduced up to the end, switching the reproduction operation Rj to another reproduction operation Rj or a recording operation Wi; and when the real time data Dj is determined not to have been reproduced up to the end, continuing the reproduction operation Rj. Each of the at least one area assigned as the area Ai is structured to fulfill a condition that the real time data Di, which is accumulated in the recording buffer WBi during n number of access operations accompanying switching between the recording operation and the reproduction operation, (m−1) number of recording operations and (n−m) number of reproduction operations, can be recorded by one recording operation. Each of the at least one area assigned as the area Aj is structured to fulfill a condition that the real time data Dj, which is accumulated in the reproduction buffer RBj during one reproduction operation, can be consumed during n number of access operations accompanying switching between the reproduction operation and the recording operation, (n−m−1) number of reproduction operations and m number of recording operations. i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

Each of at least one area assigned as the area Ai has a size of Yi, and each of the at least one area assigned as the area Aj has a size of Yj. $Yi=(n \times Ta \times Vt \times Vdi) \div \{Vt-(Vd1+Vd2+ \ldots +Vdn)\}$; and $Yj=(n \times Ta \times Vt \times Vdj) \div \{Vt-(Vd1+Vd2+ \ldots +Vdn)\}$. Ta is an access time required for the pickup P to access between an innermost area and an outermost area of the information recording medium. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

The method further includes the steps of estimating an access time required for the pickup P to access from an area Ak to an area Al where k and l are each any integer of 1 or greater and n or less, and k≠l.

Each of the at least one area assigned as the area Ai has a size of Y, and each of the at least one area assigned as the area Aj has a size of Y. $Y=\{(T1+ \ldots +Tn) \times Vt \times Vd\} \div (Vt-n \times Vd)$. Tk is the access time. Vt is a data transfer rate between the pickup P and the recording buffer WBi, and also a data transfer rate between the pickup P and the reproduction buffer RBj. Vd is a data transfer rate between the encoding module EMi and the recording buffer WBi, and also a data transfer rate between the decoding module DMj and the reproduction buffer RBj, for all values of i and j.

Each of the at least one area assigned as the area Ai has a size of Yi, and each of the at least one area assigned as the area Aj has a size of Yj. $Yi=\{(T1+ \ldots +Tn) \times Vt \times Vdi\} \div \{Vt-(Vd1+Vd2+ \ldots +Vdn)\}$; and $Yj=\{(T1+ \ldots +Tn) \times Vt \times Vdj\} \div \{Vt-(Vd1+Vd2+ \ldots +Vdn)\}$. Tk is the access time. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

The area Ai and the area Aj are provided in an outer portion of the information recording medium, for all values of i and for all values of j.

An information recording and reproduction apparatus according to the present invention is for simultaneously recording and reproducing a plurality of pieces of real time data in accordance with a simultaneous recording and reproduction model. The simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj. The information recording and reproduction apparatus includes means for searching for an unassigned area in a volume space in the information recording medium and assigning at least one unassigned area in the volume space as an area Ai in which the real time data Di is to be recorded; means for executing a recording operation Wi for recording the real time data Di accumulated in the recording buffer WBi in the area Ai; means for executing a reproduction operation Rj for reading the real time data Dj from an area Aj having the real time data Dj recorded therein; means for determining whether the recording buffer WBi is empty or not while the recording operation Wi is being executed; when the recording buffer WBi is determined to be empty, switching the recording operation Wi to another recording operation Wi or a reproduction operation Rj; and when the recording buffer WBi is determined not to be empty, continuing the recording operation Wi; and means for determining whether the reproduction buffer RBj is full or not while the reproduction operation Rj is being executed; when the reproduction buffer RBj is determined to be full, switching the reproduction operation Rj to another reproduction operation Rj or a recording operation Wi; and when the reproduction buffer RBj is determined not to be full, continuing the reproduction operation Rj. Each of the at least one area assigned as the area Ai is structured to fulfill a condition that the recording buffer WBi can be made empty by at most one access operation and at most two recording operations. Each of the at least one area assigned as the area Aj is structured to fulfill a condition that the reproduction buffer RBj can be made full by at most one access operation and at most two reproduction operations. i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

An information recording and reproduction apparatus according to the present invention is for simultaneously recording and reproducing a plurality of pieces of real time data in accordance with a simultaneous recording and reproduction model. The simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj. The information recording and reproduction apparatus includes means for searching for an unassigned area in a volume space in the information recording medium and assigning at least one unassigned area in the volume space as an area Ai in which the real time data Di is to be recorded; means for executing a recording operation Wi for recording the real time data Di accumulated in the recording buffer WBi in the area Ai; means for executing a reproduction operation Rj for reading the real time data Dj from an area Aj having the real time data Dj recorded therein; means for determining whether the real time data Di has been recorded up to an end of one of at least one area assigned as the area Ai or not in the recording operation Wi; when the real time data Di is determined to have been recorded up to the end, switching the recording operation Wi to another recording operation Wi or a reproduction operation Rj; and when the real time data Di is determined not to have been recorded up to the end, continuing the recording operation Wi; and means for determining whether the real time data Dj has been reproduced up to an end of one of at least one area assigned as the area Aj or not in the reproduction operation Rj; when the real time data Dj is determined to have been reproduced up to the end, switching the reproduction operation Rj to another reproduction operation Rj or a recording operation Wi; and when the real time data Dj is determined not to have been reproduced up to the end, continuing the reproduction operation Rj. Each of the at least one area assigned as the area Ai is structured to fulfill a condition that the real time data Di, which is accumulated in the recording buffer WBi during n number of access operations accompanying switching between the recording operation and the reproduction operation, (m−1) number of recording operations and (n−m) number of reproduction operations, can be recorded by one recording operation. Each of the at least one area assigned as the area Aj is structured to fulfill a condition that the real time data Dj, which is accumulated in the reproduction buffer RBj during one reproduction operation, can be consumed during n number of access operations accompanying switching between the reproduction operation and the recording operation, (n−m−1) number of reproduction operations and m number of recording operations. i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

An information recording medium according to the present invention allows for simultaneous recording and reproducing of a plurality of pieces of real time data in accordance with a simultaneous recording and reproduction model. The simultaneous recording and reproduction model includes a pickup P for accessing an area on the information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj. Each of at least one area assigned as an area Ai in which the real time data Di is to be recorded is structured to fulfill a condition that the recording buffer WBi can be made empty by at most one access operation and at most two recording operations. Each of at least one area assigned as an area Aj having the real time data Dj recorded therein is structured to fulfill a condition that the reproduction buffer RBj can be made full by at most one access operation and at most two reproduction operations. i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

Each of the at least one area assigned as the area Ai has a size of Y or greater, and each of the at least one area assigned as the area Aj has a size of Y or greater. $Y=2 \times n \times Ta \times Vd \times Vt \div (Vt-n \times Vd)$. Ta is an access time required for the pickup P to access between an innermost area and an outermost area of the information recording medium. Vt is a data transfer rate between the pickup P and the recording buffer WBi, and also a data transfer rate between the pickup P and the reproduction buffer RBj. Vd is a data transfer rate between the encoding module EMi and the recording buffer WBi, and also a data transfer rate between the decoding module DMj and the reproduction buffer RBj, for all values of i and j.

Each of the at least one area assigned as the area Ai has a size of Yi or greater, and each of the at least one area assigned as the area Aj has a size of Yj or greater. $Yi=(2 \times n \times Ta \times Vt \times Vdi) \div \{Vt-(Vd1+Vd2+ \ldots +Vdn)\}$; and $Yj=(2 \times n \times Ta \times Vt \times Vdj) \div \{Vt-(Vd1+Vd2+ \ldots +Vdn)\}$. Ta is an access time required for the pickup P to access between an innermost area and an outermost area of the information recording medium. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

Each of the at least one area assigned as the area Ai has a size of Y or greater, and each of the at least one area assigned as the area Aj has a size of Y or greater. $Y=\{2 \times (T1+ \ldots +Tn) \times Vt \times Vd\} \div (Vt-n \times Vd)$. Tk is an estimated first access time required for the pickup P to access from an area Ak to an area Al or an estimated second access time required for the pickup P to access from one area among at least one area assigned as the area Ak to another area, where k and l are each any integer of 1 or greater and n or less, and k≠l. Vt is a data transfer rate between the pickup P and the recording buffer WBi, and also a data transfer rate between the pickup P and the reproduction buffer RBj. Vd is a data transfer rate between the encoding module EMi and the recording buffer WBi, and also a data transfer rate between the decoding module DMj and the reproduction buffer RBj, for all values of i and Each of the at least one area assigned as the area Ai has a size of Yi or greater, and each of the at least one area assigned as the area Aj has a size of Yj or greater. $Yi=\{2 \times (T1+ \ldots +Tn) \times Vt \times Vdi\} \div \{Vt-(Vd1+Vd2+ \ldots +Vdn)\}$; and $Yj=\{2 \times (T1+ \ldots +Tn) \times Vt \times Vdj\} \div \{Vt-(Vd1+Vd2+ \ldots +Vdn)\}$. Tk is an estimated first access time required for the pickup P to access from an area Ak to an area Al or an estimated second access time required for the pickup P to access from one area among at least one area assigned as the area Ak to another area, where k and l are each any integer of 1 or greater and n or less, and k≠l. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

The area Ai and the area Aj are provided in an outer portion of the information recording medium, for all values of i and for all values of j.

An information recording medium according to the present invention allows for simultaneous recording and reproducing of a plurality of pieces of real time data in accordance with a simultaneous recording and reproduction model. The simultaneous recording and reproduction model includes a pickup P for accessing an area on the information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj. Each of at least one area assigned as an area Ai in which the real time data Di is to be recorded is structured to fulfill a condition that the real time data Di, which is accumulated in the recording buffer WBi during n number of access operations accompanying switching between the recording operation and the reproduction operation, (m−1) number of recording operations and (n−m) number of reproduction operations, can be recorded by one recording operation. Each of at least one area assigned as an area Aj having the real time data Dj recorded therein is structured to fulfill a condition that the real time data Dj, which is accumulated in the reproduction buffer RBj during one reproduction operation, can be consumed during n number of access operations accompanying switching between the reproduction operation and the recording operation, (n−m−1) number of reproduction operations and m number of recording operations. i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

Each of the at least one area assigned as the area Ai has a size of Yi, and each of the at least one area assigned as the area Aj has a size of Yj. $Yi=(n \times Ta \times Vt \times Vdi) \div \{Vt-(Vd1+Vd2+ \ldots +Vdn)\}$; and $Yj=(n \times Ta \times Vt \times Vdj) \div \{Vt-(Vd1+Vd2+ \ldots +Vdn)\}$. Ta is an access time required for the pickup P to access between an innermost area and an outermost area of the information recording medium. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

Each of the at least one area assigned as the area Ai has a size of Y, and each of the at least one area assigned as the area Aj has a size of Y. $Y=\{(T1+ \ldots +Tn) \times Vt \times Vd\} \div (Vt-n \times Vd)$. Tk is an estimated access time required for the pickup P to access from an area Ak to an area Al, where k and l are each any integer of 1 or greater and n or less, and k≠l. Vt is a data transfer rate between the pickup P and the recording buffer WBi, and also a data transfer rate between the pickup P and the reproduction buffer RBj. Vd is a data transfer rate between the encoding module EMi and the recording buffer WBi, and also a data transfer rate between the decoding module DMj and the reproduction buffer RBj, for all values of i and j.

Each of the at least one area assigned as the area Ai has a size of Yi, and each of the at least one area assigned as the area Aj has a size of Yj. $Yi=\{(T1+ \ldots +Tn) \times Vt \times Vdi\} \div \{Vt-(Vd1+Vd2+ \ldots +Vdn)\}$; and $Yj=\{(T1+ \ldots +Tn) \times Vt \times Vdj\} \div \{Vt-(Vd1+Vd2+ \ldots +Vdn)\}$. Tk is an estimated access time required for the pickup P to access from an area Ak to an area Al, where k and l are each any integer of 1 or greater and n or less, and k≠l. Vt is a data transfer rate between the pickup P and the recording buffer WBi, and also a data transfer rate between the pickup P and the reproduction buffer RBj. Vdi is a data transfer rate between the encoding module EMi and the recording buffer WBi. Vdj is a data transfer rate between the decoding module DMj and the reproduction buffer RBj.

The area Ai and the area Aj are provided in an outer portion of the information recording medium, for all values of i and for all values of j.

BEST MODE FOR CARRYING OUT THE INVENTION

Hereinafter, embodiments of the present invention will be described by way of drawings.

EXAMPLE 1

A method for performing simultaneous recording and reproduction of a plurality of pieces of real time data using a simultaneous recording and reproduction model will be described. The simultaneous recording and reproduction model used here has the identical structure to that of the simultaneous recording and reproduction model shown in FIG. 2 in that two buffers, i.e., the recording buffer 72 and the reproduction buffer 73 are included. The term "real time data" refers to data including at least either video data or audio data. The term "information recording medium" refers to any type of recording medium such as, for example, an optical disc.

Figure 1:
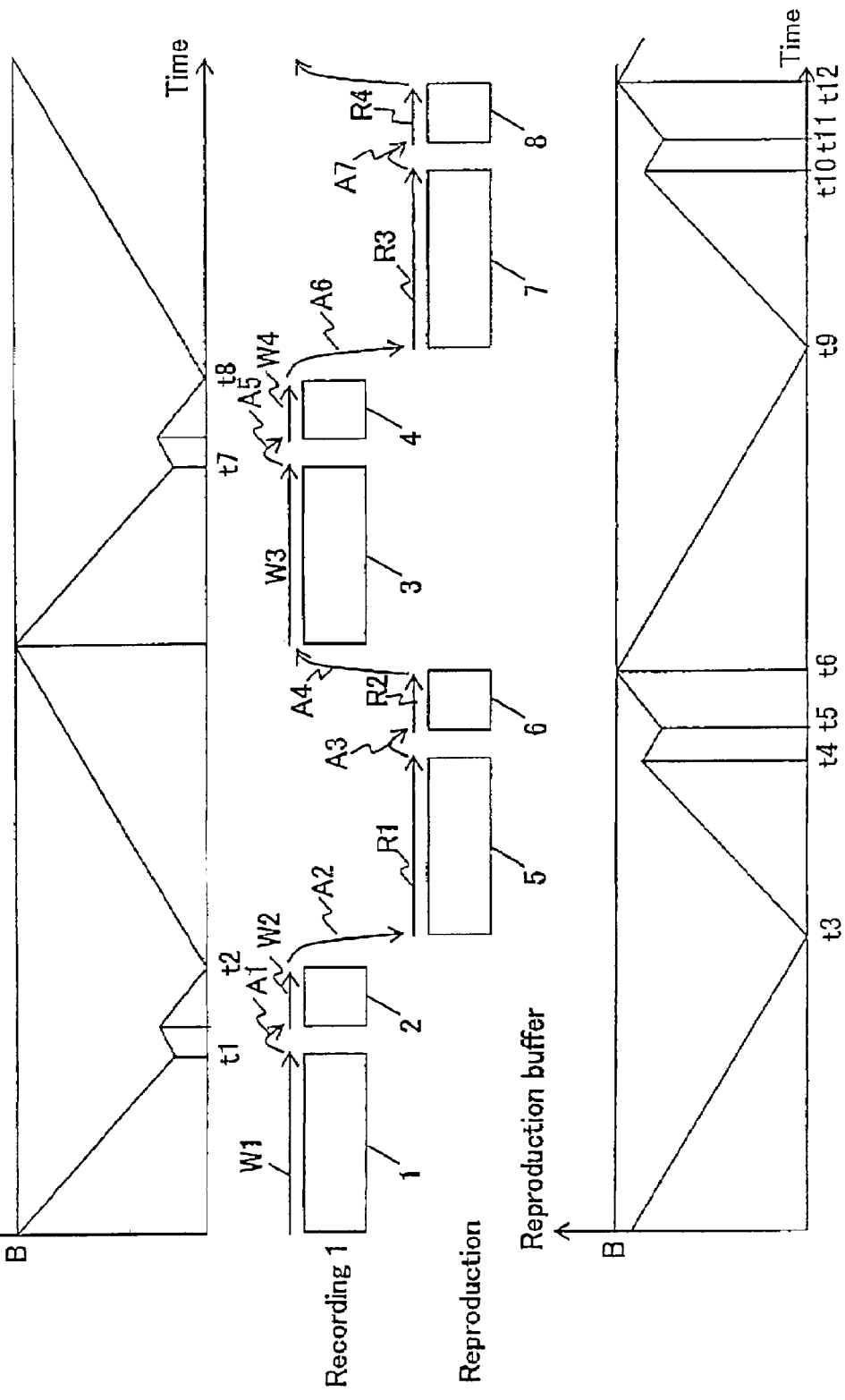
FIG. 1 shows a simultaneous recording and reproduction condition for an information recording medium according to a first example of the present invention.

FIG. 1 shows a transition in the data amounts in the recording buffer 72 and the reproduction buffer 73 in the simultaneous recording and reproduction model during simultaneous recording and reproduction of real time data A and B.

In the example shown in FIG. 1, while the real time data A is recorded in areas 1, 2, 3 and 4 of an information recording medium, real time data B recorded in areas 5, 6, 7 and 8 of the information recording medium is reproduced. The areas 1, 2, 3 and 4 are assigned as areas in which the real time data A is to be recorded. The areas 5, 6, 7 and 8 are assigned as areas having the real time data B recorded therein.

In FIG. 1, A1 through A7 refer to operations of the pickup 74 of moving between areas to be accessed (access operations). It is assumed here that the time required for each of the access operations A1 through A7 is a time period required for the pickup 74 to move between an innermost area and an outermost area of the information recording medium (i.e., the maximum access time Ta). It is also assumed that the data transfer rate between the pickup 74 and the recording buffer 72 and the data transfer rate between the pickup 74 and the reproduction buffer 73 are a constant rate Vt. It is also assumed that the data transfer rate between the encoder 70 and the recording buffer 72 and the data transfer rate between the decoder 71 and the reproduction buffer 73 are a constant rate Vd. In the case where the data to be recorded and reproduced is compressed at a variable rate, Vd is the maximum value of the range in which the rate is variable.

In a recording operation W1, real time data A accumulated in the recording buffer 72 is recorded in the area 1. When the real time data A is recorded to the end of the area 1, the recording buffer 72 is not empty. Therefore, the recording operation of the real time data A is not switched to the reproduction operation of real time data B. After an access operation A1, in a recording operation W2, real time data A accumulated in the recording buffer 72 is recorded in the area 2.

While the recording operation W2 is being executed, the recording buffer 72 becomes empty. As a result, the recording operation of the real time data A is switched to the reproduction operation of the real time data B (access operation A2).

In a reproduction operation R1, the real time data B is read from the area 5 and accumulated in the reproduction buffer 73. When the data is reproduced from the end of the area 5, the reproduction buffer 73 is not full. Therefore, the reproduction operation of the real time data B is not switched to the recording operation of the real time data A. After an access operation A3, in a reproduction operation R2, the real time data B is read from the area 6 and accumulated in the reproduction buffer 73.

While the reproduction operation R2 is being executed, the reproduction buffer 73 becomes full. As a result, the reproduction operation of the real time data B is switched to the recording operation of the real time data A (access operation A4).

Thus, the method of simultaneous recording and reproduction according to the present invention is designed so as to fulfill both (i) the condition that the recording buffer 72 can be made empty by at most one access operation and at most two recording operations and (ii) the condition that the reproduction buffer 73 can be made full by at most one access operation and at most two reproduction operations. Namely, the condition for simultaneous recording and reproduction is to fulfill these two conditions. By fulfilling these two conditions, it is made possible to surely record the real time data A on the information recording medium while reproducing the real time data B recorded on the information recording medium, without causing the recording buffer 72 and the reproduction buffer 73 to overflow, and without causing the recording buffer 72 and the reproduction buffer 73 to underflow.

For example, the above-mentioned condition for simultaneous recording and reproduction can be fulfilled where each of at least one area assigned as an area in which the real time data A is to be recorded has a size of Y or greater, and each of at least one area assigned as an area having the real time data B recorded therein has a size of Y or greater. Accordingly, the condition for simultaneous recording and reproduction can be fulfilled by searching for at least one unassigned area having a size of Y or greater and assigning the at least one area thus found as an area in which the real time data A is to be recorded. The area for the real time data B is obtained in a similar manner.

In the example shown in FIG. 1, the condition for simultaneous recording and reproduction can be fulfilled where each of the areas 1, 2, 3 and 4 has a size of Y or greater, and each of the areas 5, 6, 7 and 8 has a size of Y or greater.

The minimum size Y for each of the recording area and the reproduction area, and a buffer size B which is required for each of the recording buffer 72 and the reproduction buffer 73, are obtained by the following expressions.

$$Y = 4 \times Ta \times Vd \times Vt \div (Vt - 2 \times Vd)$$

$$B = (4 \times Ta + Y \div Vt) \times Vd$$

The expression for obtaining the minimum size Y for each of the recording area and the reproduction area is derived as follows.

During a recording operation of the real time data A, the data in the recording buffer 72 is consumed at Vt−Vd. During an access operation and a reproduction operation of the real time data B, the data in the recording buffer 72 is accumulated at Vd. The data amount which is consumed from the recording buffer 72 during the recording operation W1, the access operation A1 and the recording operation W2 is equal to the data amount accumulated in the recording buffer 72 during the access operation A2, the reproduction operation R1, the access operation A3, the reproduction operation R2 and the access operation A4. Accordingly, for simultaneous recording and reproduction of two pieces of real time data, the following expression is satisfied.

$$Y \div Vt \times (Vt - Vd) - Ta \times Vd = (3 \times Ta + Y \div Vt) \times Vd$$

By manipulating this expression, the above expression for obtaining the minimum size Y for each of the recording area and the reproduction area is obtained.

In the case where the number of pieces of real time data which are to be simultaneously recorded and reproduced is n (n is any integer of 2 or greater), a simultaneous recording and reproduction model including m number of encoders, m number of recording buffers, (n−m) number of decoders, and (n−m) number of reproduction buffers is used. Here, m is any integer which fulfills m<n and is 1 or greater. In this case, the number of access operations is in proportion to the number of pieces of real time data to be simultaneously recorded and reproduced. Therefore, the following expression is satisfied.

$$Y \div Vt \times (Vt - Vd) - Ta \times Vd = ((2 \times n - 1) \times Ta + (n-1) \times Y \div Vt) \times Vd$$

Accordingly, when the number of pieces of real time data which are to be simultaneously recorded and reproduced is n, the minimum size Y for each of the recording area and the reproduction area and the size B required for each of the recording buffer and the reproduction buffer, are obtained by the following expressions.

$$Y = 2 \times n \times Ta \times Vd \times Vt \div (Vt - n \times Vd)$$

$$B = (2 \times n \times Ta + (n-1) \times Y/Vt) \times Vd$$

The number of pieces of data to be recorded may be different from the number of pieces of data to be reproduced. A recording operation may be switched to another recording operation, or may be switched to a reproduction operation. Similarly, a reproduction operation may be switched to another reproduction operation, or may be switched to a recording operation. When the data transfer rate of the data to be recorded or reproduced is maximum, it is sufficient to record or reproduce n number of real time data, and there is clearly no limitation on the combination of the number of pieces of data to be recorded and the number of pieces of data to be reproduced.

One of the differences of the present invention from the prior art for simultaneous recording and reproduction of two pieces of real time data is that access is operated four times according to the present invention. According to the present invention, the access operation is performed when the recording operation of real time data A and the reproduction operation of the real time data B are switched to each other, and also when access is performed from one of at least one area assigned as an area in which real time data A (or real time data B) is to be recorded to another area. Accordingly, the present invention provides a model capable of performing an access operation four times from the time when recording buffer 72 becomes full until the next time when recording buffer 72 becomes full (or from the time when reproduction buffer 73 becomes empty until the next time when reproduction buffer 73 becomes empty). In this manner, it is made possible to dynamically switch the recording operation and the reproduction operation to each other in accordance with the transition in the data amounts in the recording buffer 72 and the reproduction buffer 73. Thus, the transition in the data amounts in the recording buffer 72 and the reproduction buffer 73 can be stably controlled. In more detail, when the data amount in the recording buffer 72 becomes close to full, the reproduction operation of the real time data B is immediately switched to the recording operation of the real time data A. In this way, the data amount in the recording buffer 72 can be decreased. When the data amount in the reproduction buffer 73 becomes close to empty, the recording operation of the real time data A is immediately switched to the reproduction operation of the real time data B. In this way, the data amount in the reproduction buffer 73 can be increased.

Figure 3:
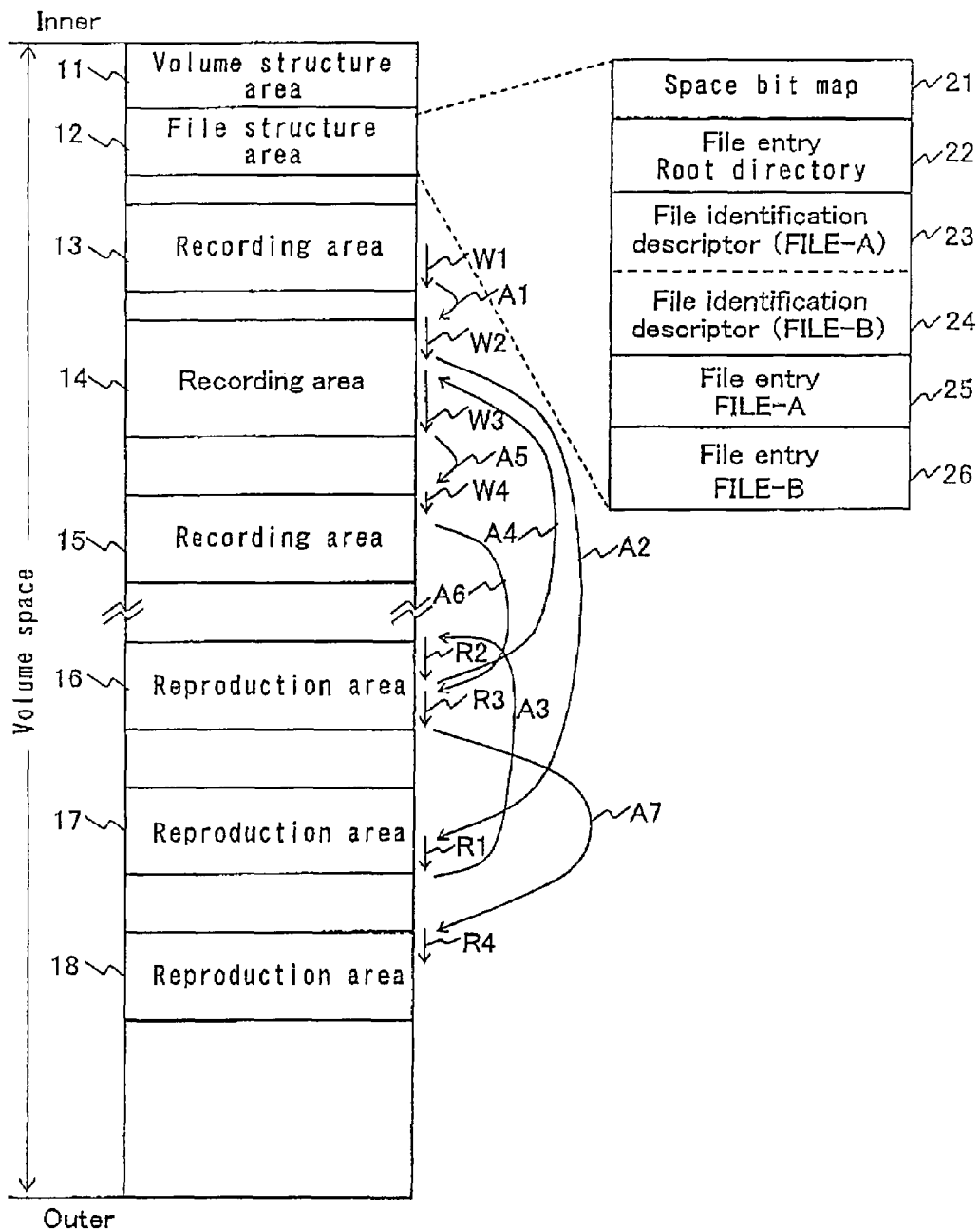
FIG. 3 shows a layout illustrating access operations on the information recording medium according to the first example of the present invention.

FIG. 3 shows an example of an arrangement of areas on an information recording medium (optical disc), in which files to be managed by a volume file structure defined by the ECMA167 Standards are recorded.

In FIG. 3, W1 through W4 refer to the recording operations described above with reference to FIG. 1, and R1 through R4 refer to the reproduction operations described above with reference to FIG. 1. A1 through A7 refer to the access operations described above with reference to FIG. 1.

Figure 7:
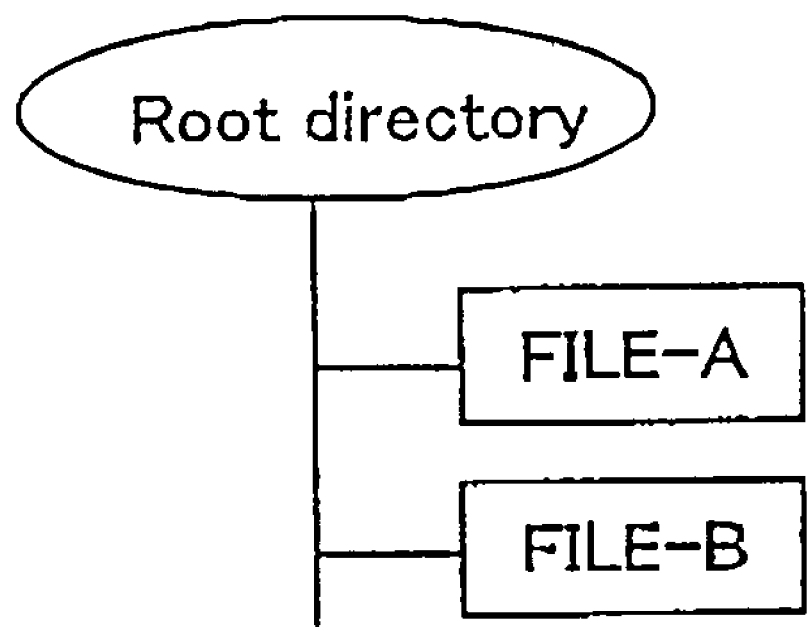
FIG. 7 shows a directory structure of data to be recorded.

In FIG. 3, the top side represents the inner side of the optical disc, and the bottom side represents the outer side of the optical disc. In a volume space, a volume structure area 11 and a file structure area 12 are assigned. The file structure area 12 includes a space bit map 21 in which unused areas in the volume space are registered as unassigned areas sector by sector, and a data structure corresponding to the directory structure shown in FIG. 7 (i.e., a file entry 22 of a root directory, a file identification descriptor 23 of FILE-A, a file identification descriptor 24 of FILE-B, a file entry 25 of FILE-A, and a file entry 26 of FILE-B).

According to the ECMA167 Standards, an area in which file data is recorded is referred to as an "extent". Positional information of the extent is registered in the file entry. For each file under the directory, a file identification descriptor is recorded in the file structure area 12.

An area in which real time data is recorded is referred to as a "real time extent" so as to be distinguished from the area where general data is recorded.

In the example shown in FIG. 3, as areas in which real time data of FILE-A is to be recorded, recording areas 13, 14 and 15 in an inner portion of the optical disc are assigned. As areas having real time data of FILE-B recorded therein, reproduction areas 16, 17 and 18 are assigned. The recording area 15 and the reproduction area 16 are distanced from each other such that an access time required for access therebetween is equal to an access time required for access between an innermost area and an outermost area of the optical disc.

Each of the recording areas 13 through 15 has a size of Y (minimum size for the recording area) or greater in order to fulfill the above-described simultaneous recording and reproduction condition. Each of the reproduction areas 16 through 18 has a size of Y (minimum size for the recording area) or greater in order to fulfill the above-described simultaneous recording and reproduction condition. Thus, even when, for example, the real time data is actually recorded in a part of a recording area, the real time data can further be recorded in the next recording area after the access operation. Therefore, the real time data can be recorded in an area having a total size of Y or greater. Under the condition for simultaneous recording and reproduction described above with reference to FIG. 1, a time period required for the access operation (access time) is set to be an access time required for accessing from an innermost area to an outermost area of the optical disc. Therefore, regardless of where in the optical disc the recording area and the reproduction area are located, simultaneous recording and reproduction can be guaranteed.

Figure 4:
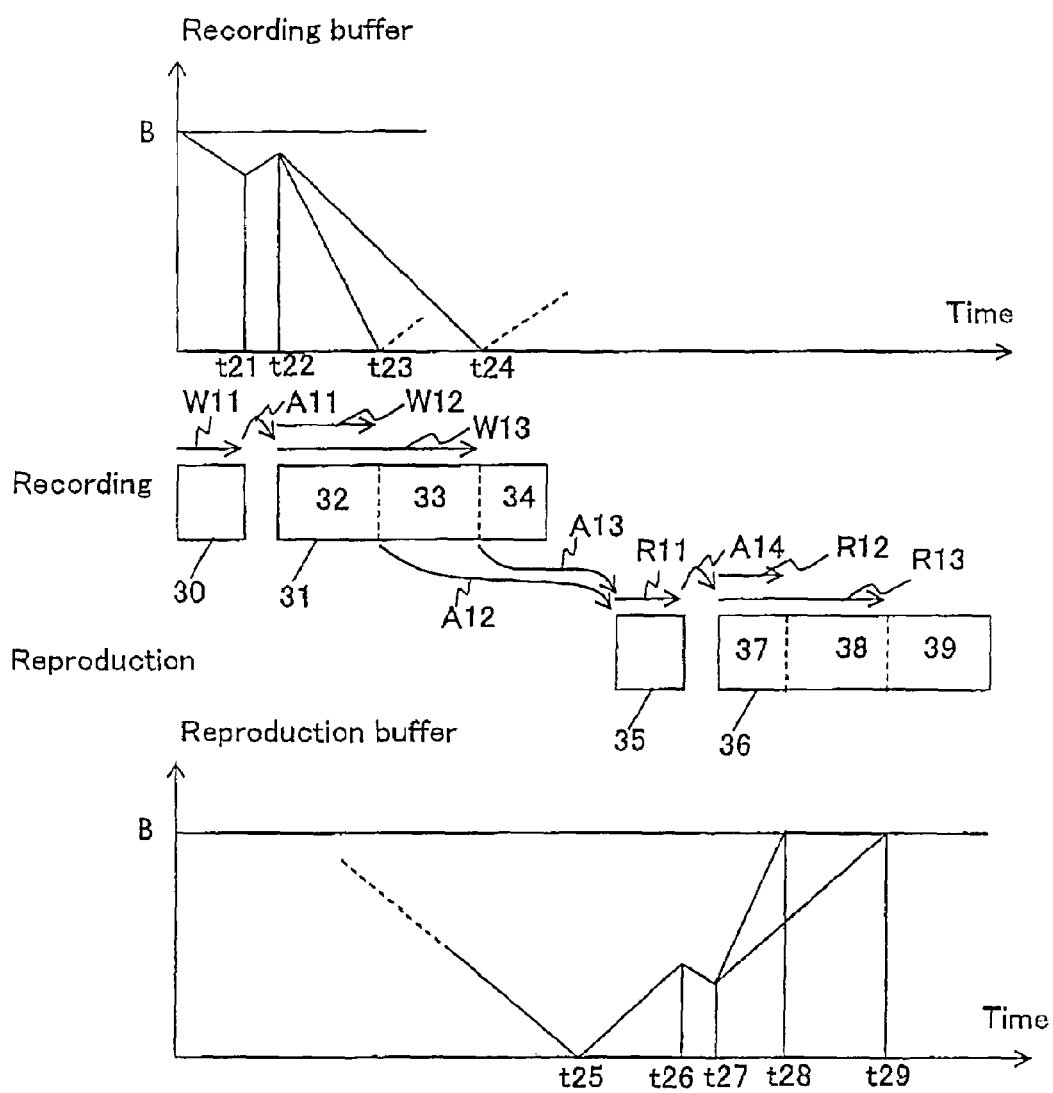
FIG. 4 shows a switching operation for simultaneous recording and reproduction to and from the information recording medium according to the first example of the present invention.

FIG. 4 shows a transition in the data amounts in the recording buffer 72 and the reproduction buffer 73.

Hereinafter, with reference to FIG. 4, the relationship between (i) the transition in the transfer rate of the data to be recorded and reproduced and (ii) the transition in the data amounts in the recording buffer 72 and the reproduction buffer 73 will be described.

The recording areas 30 and 31 are assigned as areas in which the real time data A is to be recorded. The reproduction areas 35 and 36 are assigned as areas having the real time data B recorded therein. The recording area 31 includes areas 32, 33 and 34. The reproduction area 36 includes areas 37, 38 and 39.

In a recording operation of the real time data A, when the data transfer rate to the recording buffer 72 is maximum, the recording buffer 72 becomes empty at time t24 as a result of performing a recording operation W11, an access operation A11, and a recording operation W13. When the data transfer rate to the recording buffer 72 is lower than the maximum rate, the amount of data transferred from the encoder 70 to the recording buffer 72 is smaller. Therefore, the recording buffer 72 becomes empty at time t23, which is earlier than time t24, as a result of performing the recording operation W11, the access operation A11, and a recording operation W12. Namely, when the data transfer rate from the encoder 70 to the recording buffer 72 is lower, the recording buffer 72 becomes empty earlier. When the recording operation of the real time data A is switched to the reproduction operation of the real time data B at time t23, the time until the reproduction operation of real time data B is switched to the next recording operation is equal to or less than the sum of (i) a time period required for performing three access operations and (ii) a time period required for performing two reproduction operations for reproducing data from two reproduction areas. Therefore, the recording buffer 72 is not overflowed. Even when the data having the maximum transfer rate needs to be recorded in the next recording operation, that data can be recorded in an area having a size of Y which is obtained based on the simultaneous recording and reproduction condition.

In a reproduction operation of the real time data B also, when the data transfer rate from the reproduction buffer 73 is maximum, data can be read from an area having a size of Y by one reproduction operation. When the data transfer rate from the reproduction buffer 73 is maximum, the reproduction buffer 73 becomes full at time t29 as a result of performing a reproduction operation R11, an access operation A14, and a reproduction operation R13. When the data transfer rate from the reproduction buffer 73 is lower than the maximum rate, the amount of data transferred from the reproduction buffer 73 to the decoder 71 is smaller. Therefore, the reproduction buffer 73 becomes full at time t28, which is earlier than time t29, as a result of performing the reproduction operation R11, the access operation A14, and a reproduction operation R12. Namely, when the data transfer rate from the reproduction buffer 73 to the decoder 71 is lower, the reproduction buffer 73 becomes full earlier. When the reproduction operation of the real time data B is switched to the recording operation of the real time data A at time t28, the time until the recording operation of real time data A is switched to the next reproduction operation is equal to or less than the sum of (i) a time period required for performing three access operations and (ii) a time period required for performing two recording operations for recording data to two recording areas. Therefore, the reproduction buffer 73 is not underflowed. Even when the data having the maximum transfer rate needs to be reproduced in the next reproduction operation, that data can be reproduced from an area having a size of Y which is obtained based on the simultaneous recording and reproduction condition.

Next, an information recording and reproduction apparatus and a method for performing simultaneous recording and reproduction according to a first example of the present invention will be described with reference to FIGS. 3, 5 and 6.

Figure 5:
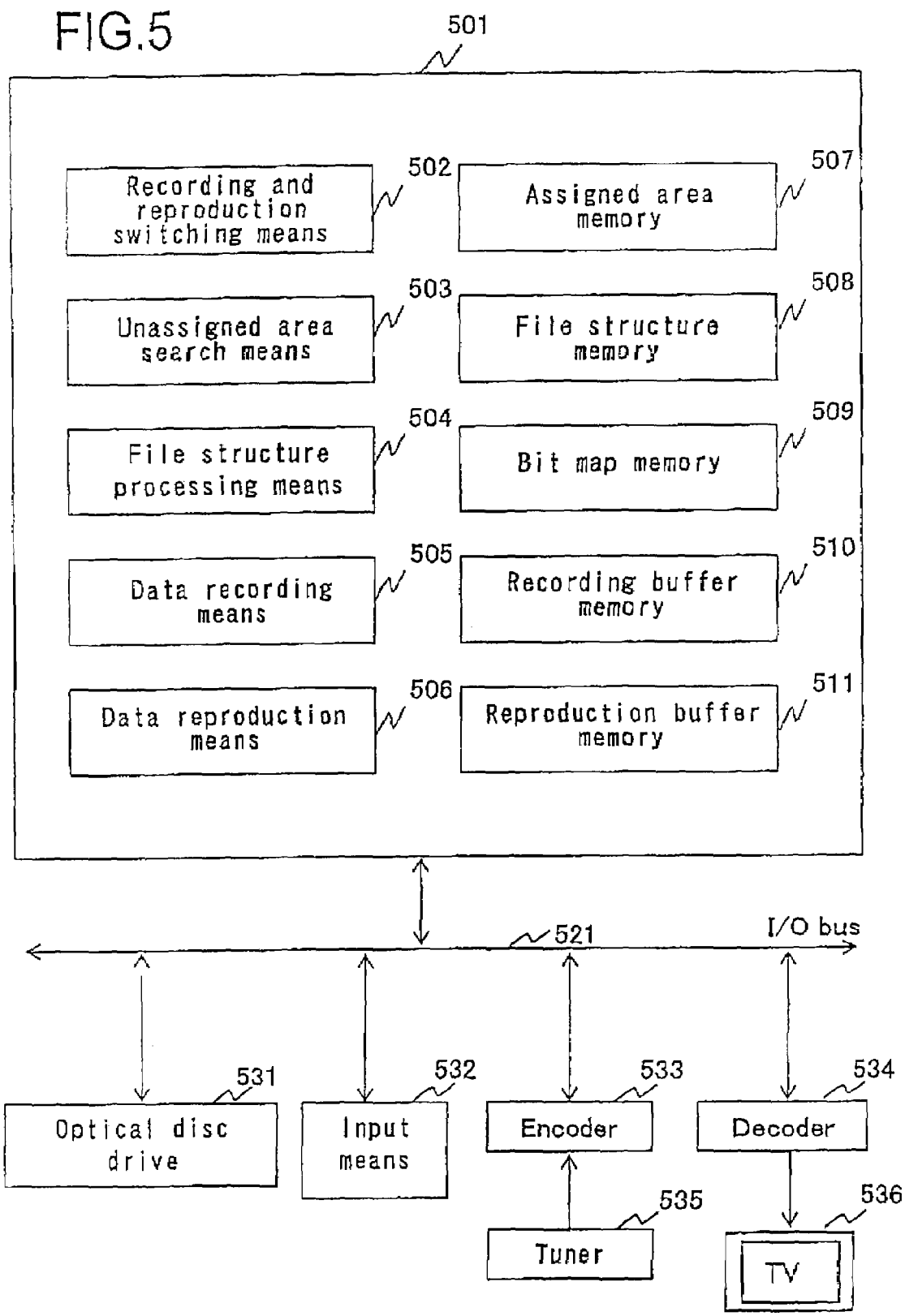
FIG. 5 is a block diagram illustrating an information recording and reproduction apparatus according to the first example of the present invention.

FIG. 5 shows a structure of the information recording and reproduction apparatus in the first example.

The information recording and reproduction apparatus includes a system control section 501, an I/O bus 521, an optical disc drive 531, input means 532 for designating a recording mode or instructing the start of simultaneous recording and reproduction, a tuner 535 for receiving TV broadcasting, an encoder 533 for encoding an audio/video signal selected by the tuner 535, a decoder 534 for decoding audio/video data, and a TV 536 for reproducing the audio/video signal.

The system control section 501 is realized by, for example, a microcomputer and a memory. The elements included in the system control section 501 are realized by, for example, the microcomputer executing various programs. The memories included in the system control section 501 are realized by, for example, areas of one memory being used for different uses.

Recording and reproduction switching means 502 switches a recording operation and a reproduction operation to each other while checking the data amounts in the buffer memories. Unassigned area search means 503 searches for an area fulfilling the simultaneous recording and reproduction condition from unassigned areas in the volume space. File structure processing means 504 reads data from the file structure area 12 and analyzes the file structure. Data recording means 505 instructs the optical disc drive 531 to record data. Data reproduction means 506 instructs the optical disc drive 531 to reproduce data.

An assigned area memory 507 temporarily stores positional information of the recordable area which is found by the unassigned area search means 503. A file structure memory 508 is for temporarily storing the data which is read from the file structure area 12 in the buffer memories. A bit map memory 509 is for reducing the number of times of access to the disc by storing the data which is read from the space bit map 21. A recording buffer memory 510 and a reproduction buffer memory 511 respectively correspond to the recording buffer 72 and the reproduction buffer 73 of the simultaneous recording and reproduction model, and each has a buffer memory which is greater than or equal to the size calculated based on the simultaneous recording and reproduction condition.

Figure 6:
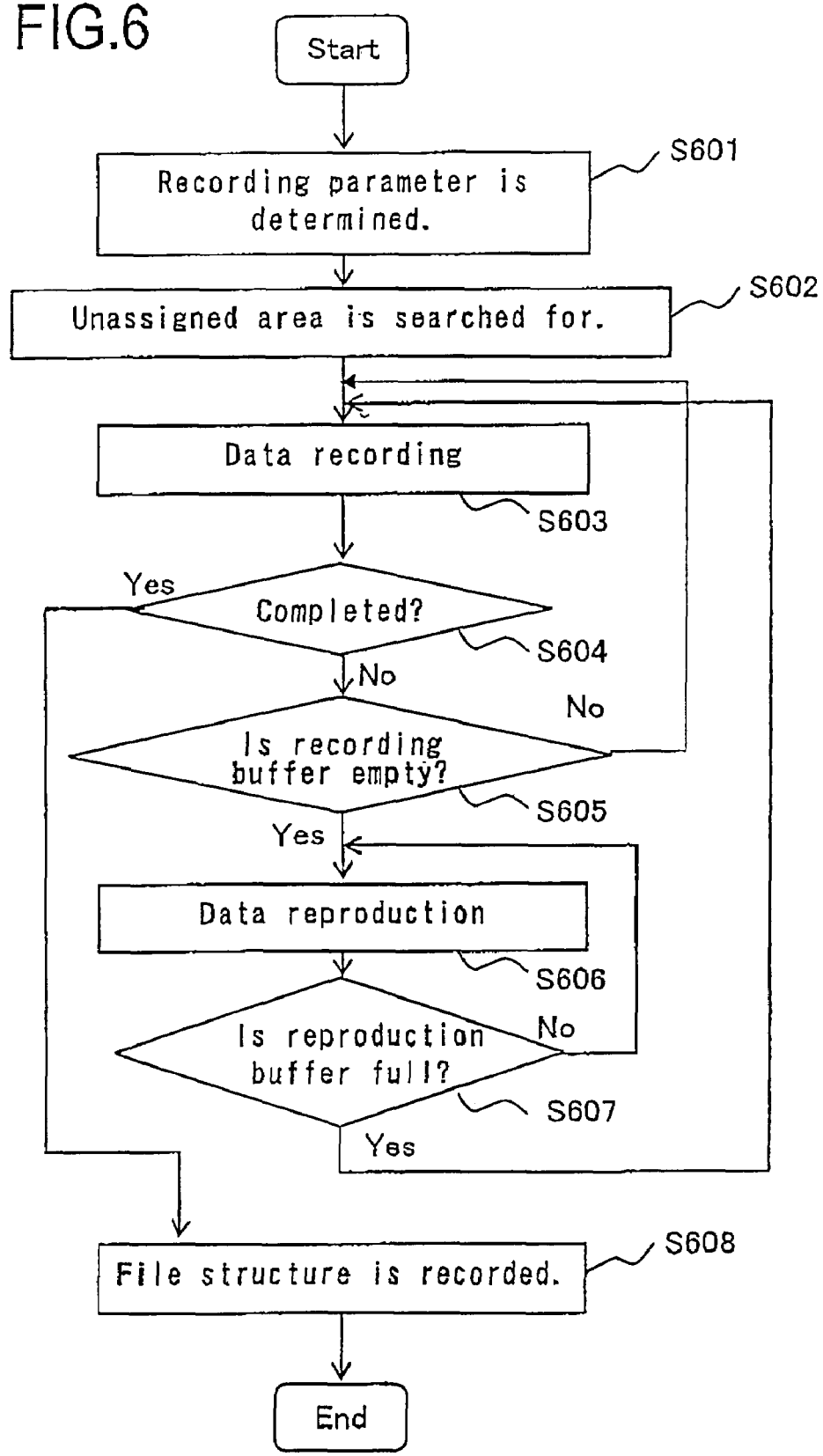
FIG. 6 is a flowchart illustrating a method for simultaneous recording and reproduction according to the first example of the present invention.

FIG. 6 shows a procedure of a method for simultaneous recording and reproduction. Such a method is stored, for example, in the form of a program in a memory in the system control section 501. Such a program can be executed by the microcomputer in the system control section 501.

The user uses the input means 532 to input an instruction for simultaneous recording and reproduction to the information recording and reproduction apparatus. In compliance with the instruction for simultaneous recording and reproduction, the minimum size Y for the recording area is determined in accordance with the maximum transfer rate of the data to be recorded. The method for obtaining the minimum size Y for the recording area is as described with reference to FIG. 1 ($Y=4 \times Ta \times Vd \times Vt \div (Vt-2 \times Vd)$).

When recording a specific program such as a movie or the like, the user sets the recording time. In this manner, a recording parameter is determined (step S601).

The unassigned area search means 503 searches for an unassigned area having a size of Y (minimum size for the recording area) or greater which is obtained in step S601, for each piece of real time data to be recorded, based on the data stored in the bit map memory 509. When the user sets the recording time, the unassigned area search means 503 performs a search for unassigned areas in the volume space until the sum of the sizes of the unassigned areas is greater than or equal to the logical product of the maximum rate and the recording time, and assigns at least one unassigned area in the volume space as an area in which real time data is to be recorded (step S602). Accordingly, each of at least one area assigned as the area in which real time data is to be recorded has a size of Y or greater. Thus, the simultaneous recording and reproduction condition can be fulfilled.

In FIG. 3, the recording areas 13, 14 and 15 are assigned as areas in which the real time data A is to be recorded. Each of the recording areas 13, 14 and 15 has a size of Y or greater. The positional information on the recording areas 13, 14 and 15 is stored in the assigned area memory 507.

The data recording means 505 instructs the optical disc drive 531 to record the real time data A accumulated in the recording buffer memory 510 on the optical disc, and transfers the real time data A to be recorded to the optical disc drive 531 (step S603).

In FIG. 3, the real time data A is recorded in a part of the recording area 13 in the recording operation W1. When it is determined that the recording operation is to be continued in step S605 described below, the real time data A is recorded from the start of the recording area 14 in the recording operation W2 after the access operation A1.

In FIG. 3, the real time data A is recorded from the middle of the recording area 13. In the case where the recording operation is started from the recording area 13, the real time data A may be recorded from the start of the recording area 13.

When the user uses the input means 532 to input an instruction for terminating recording or reproduction to the information recording and reproduction apparatus, the recording and reproduction switching means 502 terminates the recording operation or the reproduction operation (step S604).

The recording and reproduction switching means 502 determines whether the recording buffer memory 510 is empty or not. When the recording buffer memory 510 is determined to be empty, the recording and reproduction switching means 502 switches the recording operation of the real time data A to the reproduction operation of the real time data B. When the recording buffer memory 510 is determined not to be empty, the recording and reproduction switching means 502 continues the recording operation of the real time data A (step S605).

In FIG. 3, the recording buffer memory 510 becomes empty in the recording operation W2. Thus, the recording operation of the real time data A is switched to the reproduction operation of the real time data B. As a result, the real time data B is read from a part of the reproduction area 17 by the reproduction operation R1 after the access operation A2. The reason why the reproduction is performed from the middle of the reproduction area is that the order of reproduction has been changed by editing.

The real time data B may be reproduced from the start of the reproduction area 17. In this case, the size of the reproduction area 17 is Y or greater. Therefore, the reproduction operation is switched to the recording operation without the access operation A3 to the reproduction area 16.

The data reproduction means 506 instructs the optical disc drive 531 to reproduce the real time data B from the optical disc and transfers the real time data B to be reproduced to the optical disc drive reproduction buffer memory 511 (step S606).

The recording and reproduction switching means 502 determines whether the reproduction buffer memory 511 is full or not. When the reproduction buffer memory 511 is determined to be full, the recording and reproduction switching means 502 switches the reproduction operation of the real time data B to the recording operation of the real time data A. When the reproduction buffer memory 511 is determined not to be full, the recording and reproduction switching means 502 continues the reproduction operation of the real time data B (step S607).

In FIG. 3, the reproduction buffer memory 511 becomes full in the reproduction operation R2. Thus, the reproduction operation of the real time data B is switched to the recording operation of the real time data A. As a result, the real time data A is recorded in the remaining area of the recording area 14 in the recording operation W3 after the access operation A4.

When recording of all the data is completed, the file structure processing means 504 records a file entry in the file structure area 12 in order to manage the areas in which real time data is recorded as real time extents (step S608).

In this manner, the recording operation of the real time data A and the reproduction operation of the real time data B are switched to each other while the data accumulation states in the recording buffer memory and the reproduction buffer memory are checked.

For simultaneous recording and reproduction of n number of real time data, a simultaneous recording and reproduction model including the following is used: a pickup P for accessing an area in the information recording medium, an encoding module EMi for encoding real time data Di, a recording buffer WBi for accumulating the encoded real time data Di, a reproduction buffer RBj for accumulating real time data Dj which is read from the information recording medium, and a decoding module DMj for decoding real time data Dj accumulated in the reproduction buffer RBj. (This simultaneous recording and reproduction model will be referred to as an "n-simultaneous recording and reproduction model", hereinafter.) In this case, the following operation is performed in each of the above-mentioned steps.

Step S602: The unassigned area search means 503 searches for an unassigned area in the volume space in the information recording medium, and assigns at least one unassigned area in the volume space as an area Ai in which real time data Di is to be recorded.

Step S603: In compliance with the instruction from the data recording means 505 for recording, the optical disc drive 531 executes a recording operation Wi for recording the real time data Di accumulated in the recording buffer WBi in the area Ai.

Step S605: While the recording operation Wi is being executed, the recording and reproduction switching means 502 determines whether the recording buffer WBi is empty or not. When the recording buffer WBi is determined to be empty, the recording and reproduction switching means 502 switches the recording operation Wi to another recording operation Wi or a reproduction operation Rj. When the recording buffer WBi is determined not to be empty, the recording and reproduction switching means 502 continues the recording operation Wi.

Step S606: In compliance with the instruction from the data reproduction means 506 for reproduction, the optical disc drive 531 executes the reproduction operation Rj for reading the real time data Dj from the area Aj in which the real time data Dj is recorded.

Step S607: While the reproduction operation Rj is being executed, the recording and reproduction switching means 502 determines whether the reproduction buffer RBj is full or not. When the reproduction buffer RBj is determined to be full, the recording and reproduction switching means 502 switches the reproduction operation Rj to another reproduction operation Rj or a recording operation Wi. When the reproduction buffer RBj is determined not to be full, the recording and reproduction switching means 502 continues the reproduction operation Rj.

With reference to FIG. 6, a method for simultaneous recording and reproduction of two pieces of real time data is described. Thus, the recording operation and the reproduction operation are alternately switched. For simultaneous recording and reproduction of n number of real time data, n may be an odd number, and the number of pieces of real time data to be recorded may be different from the number of pieces of real time data to be reproduced. Therefore, a recording operation may be switched to another recording operation, and a reproduction operation may be switched to another reproduction operation.

Each of at least one area assigned as the area Ai is structured so as to fulfill the condition that the recording buffer WBi can be made empty by at most one access operation and at most two recording operations. Each of at least one area assigned as the area Aj is structured so as to fulfill the condition that the reproduction buffer RBj can be made full by at most one access operation and at most two reproduction operations. Fulfilling these two conditions is to fulfill the simultaneous recording and reproduction condition.

The simultaneous recording and reproduction condition can be fulfilled where, for example, each of at least one area assigned as the area Ai has a size of Y or greater and each of at least one area assigned as the area Aj has a size of Y or greater. The method for obtaining the minimum size Y for each of the recording area and the reproduction area is as described with reference to FIG. 1.

$$Y = 2 \times n \times Ta \times Vd \times Vt \div (Vt - n \times Vd)$$

In the above, Ta represents the access time required for the pickup P to move between an innermost area and an outermost area of the information recording medium.

Vt represents the data transfer rate between the pickup P and the recording buffer WBi, and the data transfer rate between the pickup P and the reproduction buffer RBj.

Vd represents the data transfer rate between the encoding module EMi and the recording buffer WBi, and the data transfer rate between the decoding module DMj and the reproduction buffer RBj, for all values of i and all values of j.

Here, i is any integer of 1 or greater and m or less, and j is any integer of (m+1) or greater and n or less. m is any integer which fulfills m<n and is 1 or greater, and n is any integer of 2 or greater which represents the number of a plurality of pieces of real time data to be simultaneously recorded and reproduced.

Figure 8:
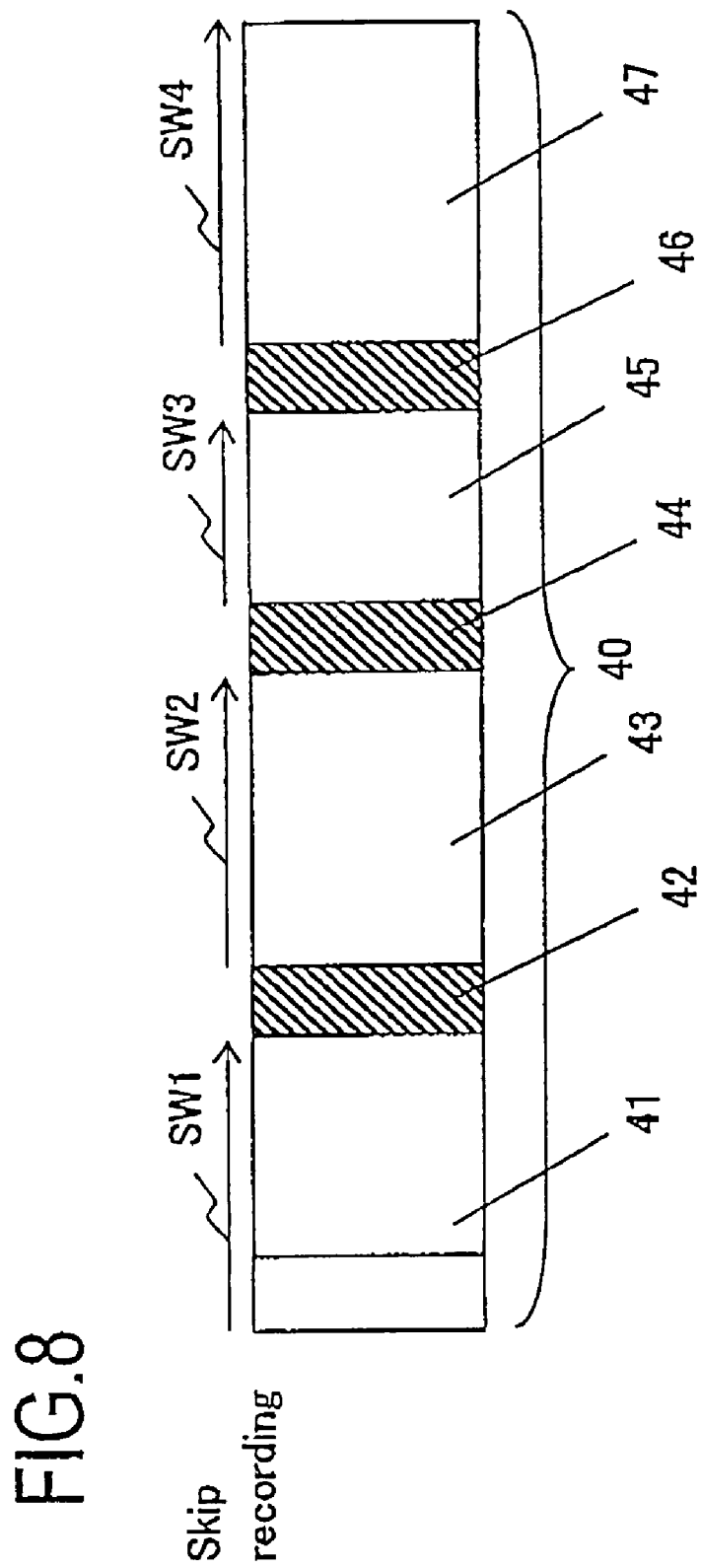
FIG. 8 shows an operation for skip recording.

Skip recording may be performed to pre-assigned areas. "Skip recording" refers to a technique of performing recording while avoiding pre-detected defects or defects detected during data recording. With reference to FIG. 8 which illustrates skip recording, it is assumed that, for example, no defective sector is detected in an area 40 before recording and defective areas 42, 44 and 46 are detected during recording. In this case, data which was to be recorded in the defective area is recorded in the area next to the defective area in order to avoid the data from being recorded in the defective area. In the example of skip recording shown in FIG. 8, the recording operations are performed in the order of SW1, SW2, SW3 and SW4. Since the access time is short in skip recording, skip recording may be performed such that areas including defects are avoided in units of ECC block, not in units of sector. Where the size of each ECC block is E, the access time to each ECC block in such skip recording is E÷Vt. In order to guarantee compatibility among apparatuses in simultaneous recording and reproduction, the number of ECC blocks to be skipped may be limited. For example, the ratio of the skippable area in skip recording to the recording area is defined as "e". When skip recording is performed under the simultaneous recording and reproduction condition described above with reference to FIG. 1, recording or reproduction is performed in an area of Ye×(1−e) (Ye is the minimum size of the recording area), and the area of Ye×e is skipped and only accessed to and is not recorded to. The condition for simultaneous recording and reproduction obtained in consideration of skip recording with a limited ratio of skippable area is as follows.

$$Ye \times (1-e) \div Vt \times (Vt-Vd) - Ta \times Vd - Ye \times e \div Vt \times Vd = (3 \times Ta + Ye \times (1-e) \div Vt) \times Vd + Ye \times e \div Vt \times Vd$$

Thus, $$Ye = 4 \times Ta \times Vd \times Vt \div (Vt - e \times Vt - 2 \times Vd).$$

A buffer size Be required in this case is as follows.

$$Be = (4 \times Ta + Ye \times (1-e) \div Vt) \times Vd + 2 \times Ye \times e \div Vt \times Vd$$

The recording may be performed in units of ECC block, not in units of sector.

Although not shown, a threshold in a buffer is predetermined such that the buffer is determined to be empty when the data amount in the buffer is below the threshold. A threshold in a buffer is predetermined such that the buffer is determined to be full when the data amount in the buffer is above the threshold. Therefore, the size of the buffer memory may contain a margin corresponding to the minimum reading or writing unit or a margin corresponding to the time period until the rotation rate becomes a desired value.

A recording operation and a reproduction operation are switched at an optimal timing. Therefore, even when an error occurs during recording or reproduction, and as a result, recording and reproduction cannot be performed for a certain time period, the return to the normal state is rapidly realized.

Figure 2:
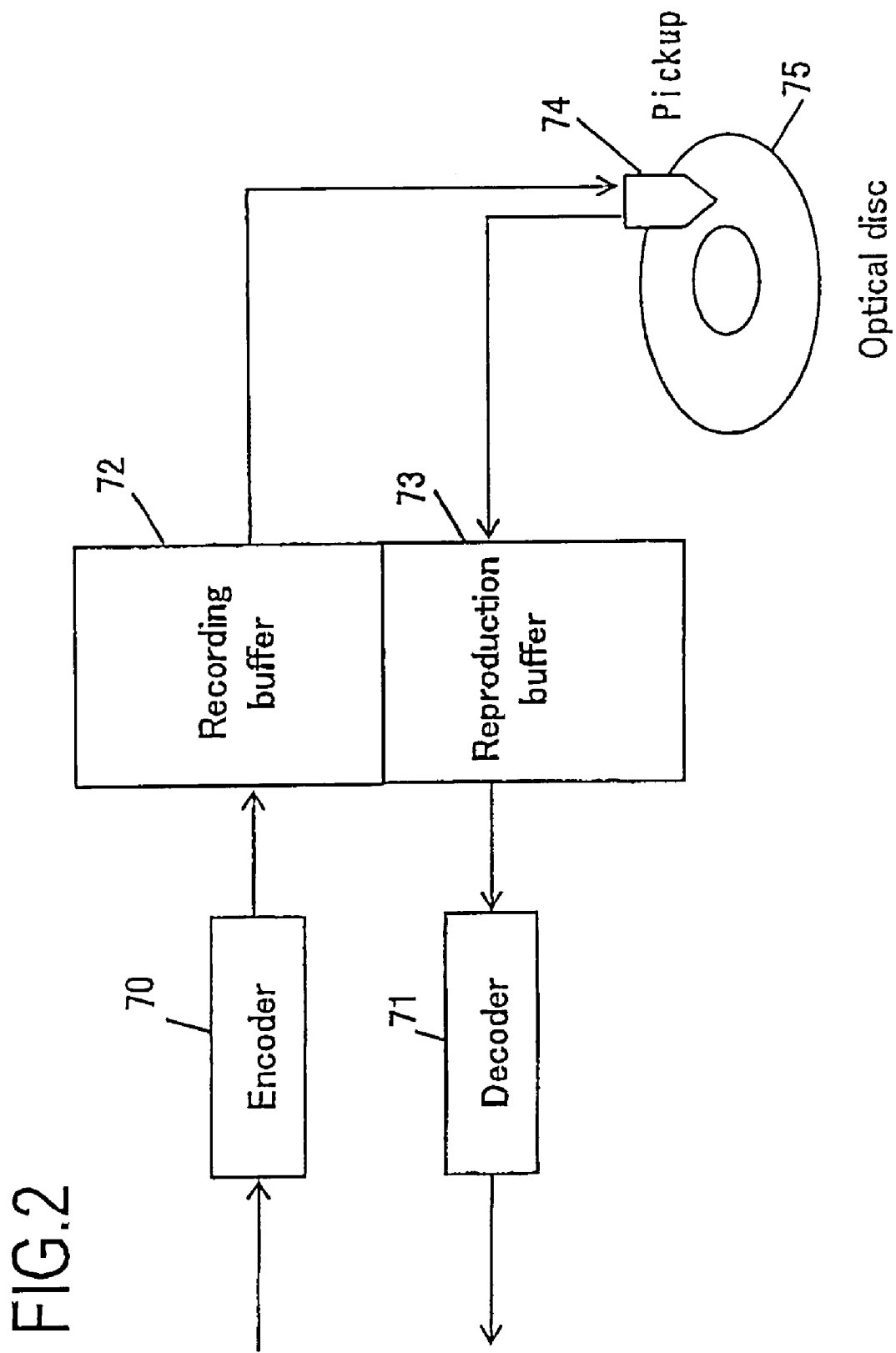
FIG. 2 shows a simultaneous recording and reproduction model.

FIG. 2 shows a model; neither the encoder nor the decoder are absolutely necessary. A system handling only digital signals, such as a streamer, does not include an encoder or decoder. The present invention, when applied to a streamer, provides the effect of transferring audiovisual data with no interruption.

EXAMPLE 2

In a second example of the present invention, a case where the transfer rates of a plurality of pieces of real time data are different will be described. In the first example, the simultaneous recording and reproduction condition is described in the case where the plurality of pieces of real time data have the same transfer rate. In the second example, a simultaneous recording and reproduction condition is set for each of the data having a high transfer rate and data having a low transfer rate. This allows data having a low transfer rate to be recorded even in a small continuous empty area, and also reduces the required size of buffer memories.

Figure 9:
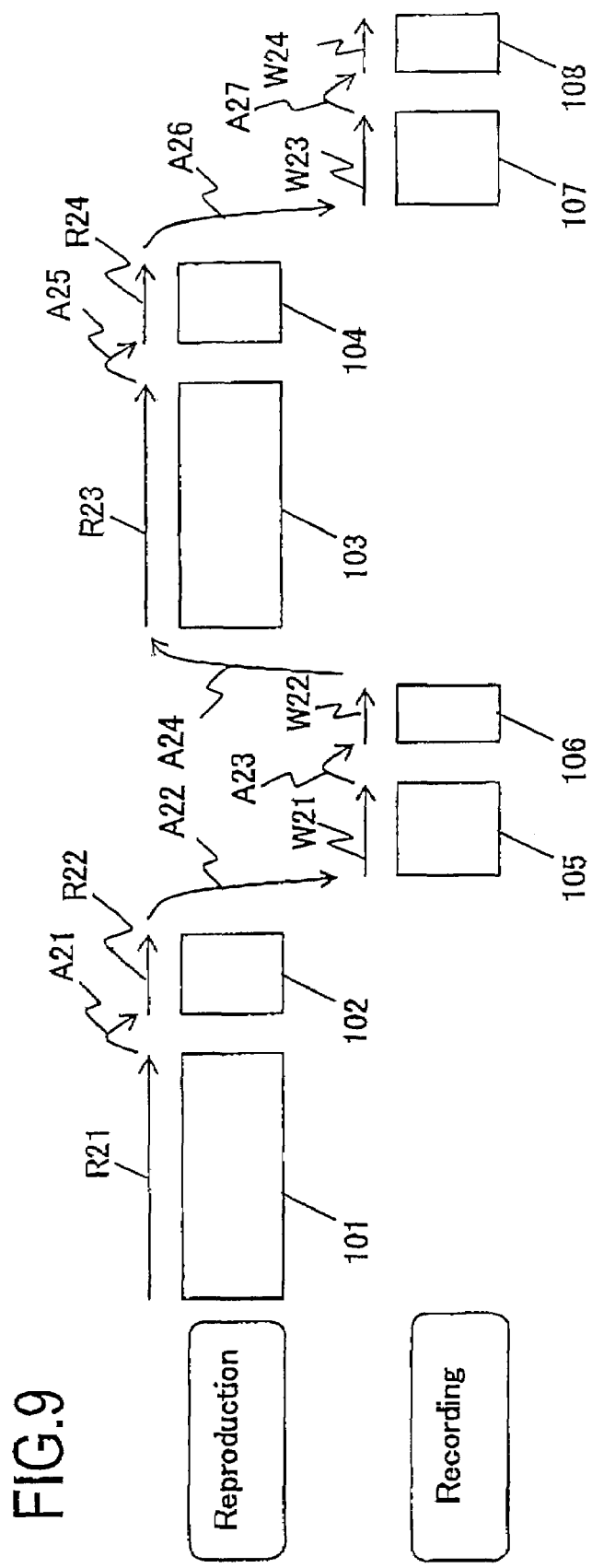
FIG. 9 shows recording operations, reproduction operations and access operations for simultaneous recording and reproduction of two pieces of real time data according to a second example of the present invention.

FIG. 9 shows recording operations, reproduction operations and access operations for reproducing the real time data A having a high transfer rate and recording the real time data B having a low transfer rate. The simultaneous recording and reproduction model is identical with that shown in FIG. 2 which is described in the first example. The transition in the data amounts in the recording buffer and the reproduction buffer during the simultaneous recording and reproduction is described in the first example and will be omitted here.

Figure 10:
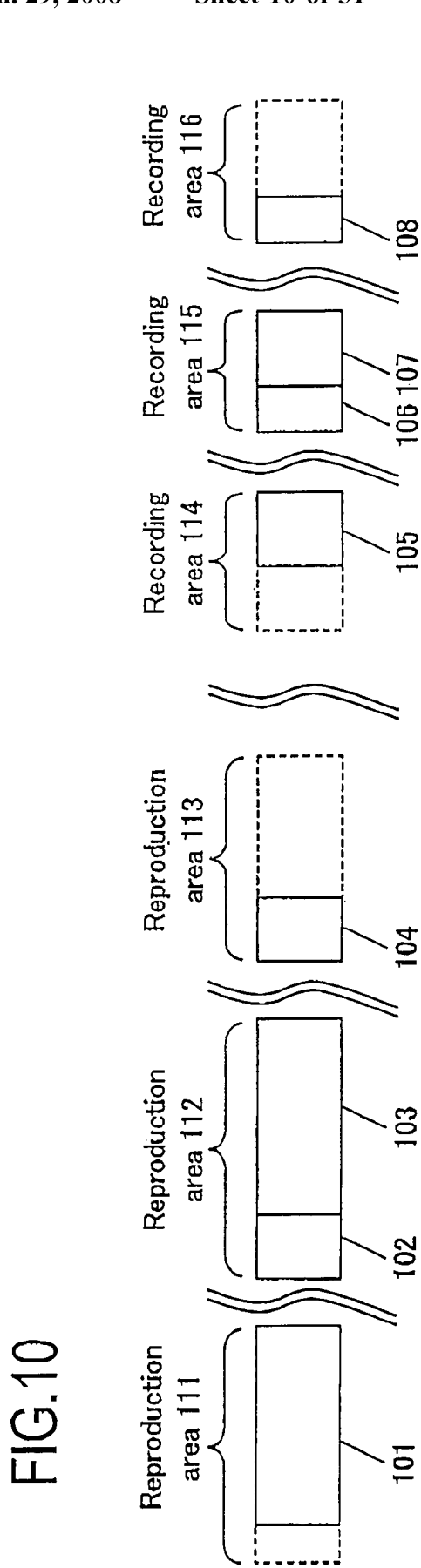
FIG. 10 shows a layout of reproduction areas and recording areas on the disc according to the second example of the present invention.

FIG. 10 shows a layout of recording areas and reproduction areas in the disc. The left side represents the inner side of the disc, and the right side represents the outer side of the disc. In FIG. 10, reproduction areas 111, 112 and 113 are assigned as areas having the real time data A recorded therein, and recording areas 114, 115 and 116 are assigned as areas in which the real time data B is to be recorded. The real time data A is actually reproduced from an area 101 of the reproduction area 111, areas 102 and 103 of the reproduction area 112, and an area 104 of the reproduction area 113. The real time data B is actually recorded in an area 105 of the recording area 114, areas 106 and 107 of the recording area 115, and an area 108 of the recording area 116.

In FIG. 9, A21 through A27 refer to operations of the pickup 74 of moving between areas to be accessed (access operations). It is assumed here that the time required for each of the access operations A21 through A27 is a time period required for the pickup 74 to move between an innermost area and an outermost area of the information recording medium (i.e., the maximum access time Ta). It is also assumed that the data transfer rate between the pickup 74 and the recording buffer 72 and the data transfer rate between the pickup 74 and the reproduction buffer 73 are a constant rate Vt. It is also assumed that the data transfer rate between the encoder 70 and the recording buffer 72 is Vd2, which is the maximum value of a range in which the rate is variable. It is also assumed that the data transfer rate between the decoder 71 and the reproduction buffer 73 is Vd1, which is the maximum value of a range in which the rate is variable.

In a reproduction operation R21, the real time data A is read from the area 101. After an access operation A21, in a reproduction operation R22, the real time data A is read from the area 102. Then, the reproduction operation of the real time data A is switched to the recording operation of the real time data B (access operation A22).

In a recording operation W21, the real time data B is recorded in the area 105. After an access operation A23, in a recording operation W22, the real time data B is recorded in the area 106. Then, the recording operation of the real time data B is switched to the reproduction operation of the real time data A (access operation A24).

Thus, the method of simultaneous recording and reproduction according to the present invention is designed so as to fulfill the simultaneous recording and reproduction condition that a recording operation is switched to a reproduction operation by at most one access operation and at most two recording operations and also a reproduction operation is switched to a recording operation by at most one access operation and at most two reproduction operations.

In the reproduction operation of the real time data A, data accumulated in the reproduction buffer 73 is accumulated at Vt−Vd1. In the access operation and the recording operation of the real time data B, data in the reproduction buffer 73 is consumed at Vd1. The data amount which is accumulated in the reproduction buffer 73 during the reproduction operation R21, the access operation A21 and the reproduction operation R22 is equal to the data amount consumed from the reproduction buffer 73 during the access operation A22, the recording operation W21, the access operation A23, the recording operation W22 and the access operation A24. Accordingly, the following expressions are satisfied, where Y1 is the minimum size of at least one reproduction area assigned as an area having the real time data A recorded therein, and Y2 is the minimum size of at least one recording area assigned as an area in which the real time data B is to be recorded.

$$Y1 \div Vt \times (Vt-Vd1) = (4Ta+Y2 \div Vt) \times Vd1$$

$$Y2 \div Vt \times (Vt-Vd2) = (4Ta+Y1 \div Vt) \times Vd2$$

By manipulating these expressions, the following expressions for obtaining the minimum size Y1 for the reproduction area and the minimum size Y2 for the recording area are obtained.

$$Y1 = (4Ta \times Vt \times Vd1) \div (Vt-Vd1-Vd2)$$

$$Y2 = (4Ta \times Vt \times Vd2) \div (Vt-Vd1-Vd2)$$

The simultaneous recording and reproduction condition for recording and reproducing two pieces of real time data having different transfer rates without missing any part of the data can be fulfilled where each of at least one reproduction area assigned as an area having the real time data A recorded therein has a size of Y1 or greater, and each of at least one recording area assigned as an area in which the real time data B is to be recorded has a size of Y2 or greater.

A buffer size B1 required for the reproduction buffer 73 and a buffer size B2 required for the recording buffer 72 are obtained by the following expressions.

$$B1 = (4Ta+Y2 \div Vt)Vd1$$

$$B2 = (4Ta+Y1 \div Vt)Vd2$$

By setting Vd1>Vd2 as above, Y2 and B2 can be smaller than Y1 and B1, respectively.

In the case where the maximum transfer rate of the data to be recorded and reproduced is known before the real time data A is recorded so as to realize simultaneous recording and reproduction of real time data, data recording is made possible by assigning a large continuous empty area, which is larger than the size fulfilling the simultaneous recording and reproduction condition, as a recording area.

The simultaneous recording and reproduction of the second example can be performed by the recording and reproduction method described in the first example with reference to FIG. 6 by using, for searching for an unassigned area, different expressions from those of the first example for obtaining the simultaneous recording and reproduction condition.

In the case where the transfer rate is not known until immediately before the recording is performed, the real time data A, which is to be recorded first, is set to be recorded at the maximum transfer rate in the range. The real time data B, which is to be recorded while the real time data A is being reproduced, is set to be recorded at the maximum transfer rate permitted by the system. Thus, an area which fulfills the simultaneous recording and reproduction condition can be retrieved as an area in which the real time data A is to be recorded. When recording the real time data B, the transfer rate thereof is already known. Thus, an appropriate size of recording area can be retrieved.

The information recording and reproduction apparatus in the second example has the same structure as that of the first example except for the sizes of the recording buffer memory and the reproduction buffer memory. The algorithm for switching the recording operation and the reproduction operation is the same as that of the first example. Namely, when the recording buffer memory becomes empty, the recording operation is switched to the reproduction operation. When the reproduction buffer memory becomes full, the reproduction operation is switched to the recording operation.

The present invention is applicable to additional recording of audio data to AV data compressed by MPEG. The minimum size of the reproduction area for the MPEG data can be obtained by presetting the transfer rate of the audio data to be after-recorded. After-recording of the audio data can be performed by recording the audio data at an appropriate timing while reproducing the MPEG data which is already recorded.

As described below, it is also possible to after-record two channels of audio data by defining the simultaneous recording and reproduction condition for a larger number of pieces of real time data. For example, it is possible to first record MPEG data and then record the background music and the narration separately.

Figure 11:
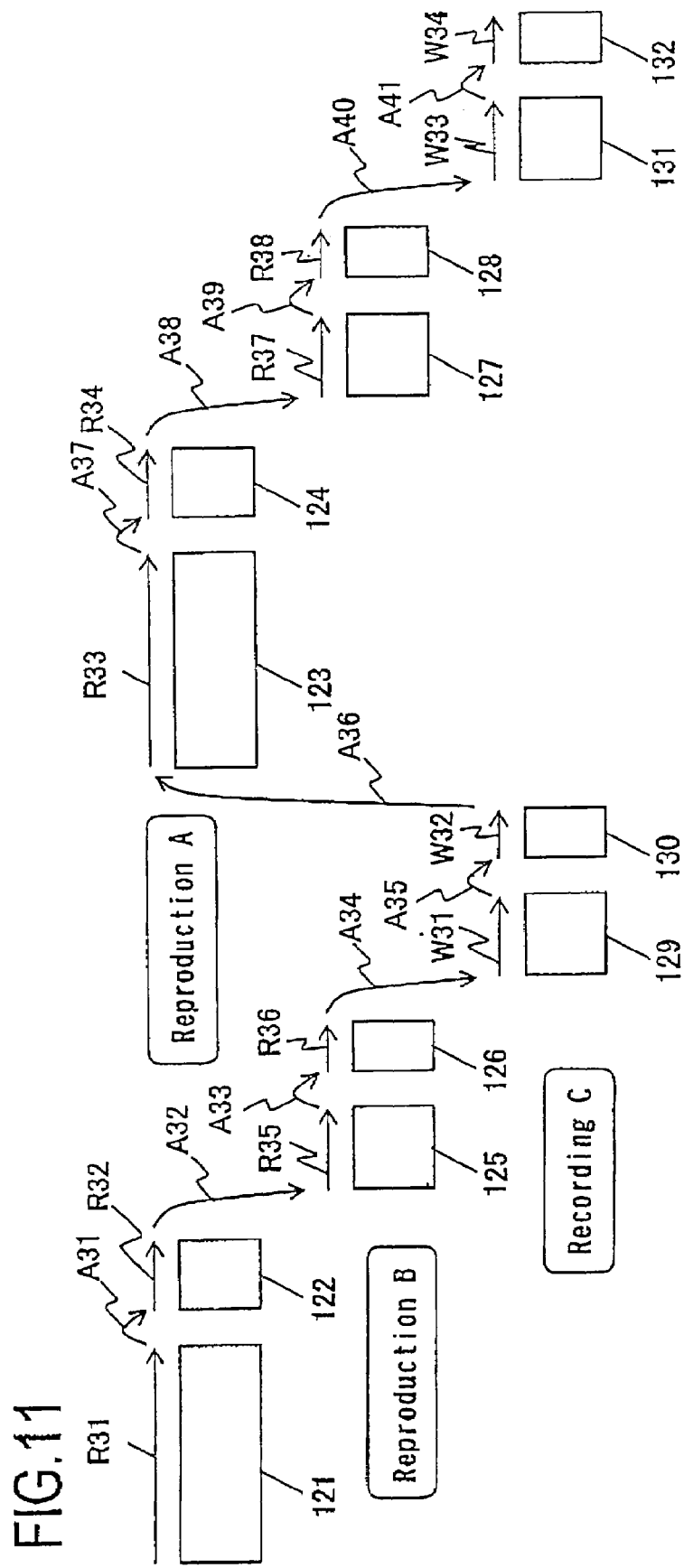
FIG. 11 shows recording operations, reproduction operations and access operations for simultaneous recording and reproduction of three pieces of real time data according to the second example of the present invention.

FIG. 11 shows recording operations, reproduction operations and access operations for three pieces of real time data having different transfer rates. Like in FIG. 9, R31 through R38 refer to reproduction operations, W31 through W34 refer to recording operations, and A31 through A41 refer to access operations. Reference numerals 121 through 128 each represent a part of a reproduction area from which the real time data is actually to be read, and reference numerals 129 through 132 each represent a part of a recording area in which the real time data is actually to be recorded. Based on FIG. 11, the simultaneous recording and reproduction condition for the three pieces of real time data can be obtained as follows in a similar manner as for the two pieces of real time data.

$$Y1 = (6Ta \times Vt \times Vd1) \div (Vt-Vd1-Vd2-Vd3)$$

$$Y2 = (6Ta \times Vt \times Vd2) \div (Vt-Vd1-Vd2-Vd3)$$

$$Y3 = (6Ta \times Vt \times Vd3) \div (Vt-Vd1-Vd2-Vd3)$$

$$B1 = (6Ta+Y2 \div Vt+Y3 \div Vt)Vd1$$

$$B2 = (6Ta+Y3 \div Vt+Y1 \div Vt)Vd2$$

$$B3 = (6Ta+Y1 \div Vt+Y2 \div Vt)Vd3$$

In the above expressions, Y is the minimum size of the reproduction area or the recording area, Vd is the transfer rate of the data to be reproduced or recorded, and B is the size of the reproduction buffer or the recording buffer. The numerals added to Y, Vd and B each represent the number assigned to the real time data to be reproduced or recorded.

For simultaneous recording and reproduction of n number of real time data, the "n-simultaneous recording and reproduction model" described above is used. A minimum size Yi for each of at least one recording area assigned as an area Ai in which real time data Di is to be recorded, a size Bi of a recording buffer WBi for accumulating the real time data Di, a minimum size Yj for each of at least one reproduction area assigned as an area Aj having real time data Dj recorded therein, and a size Bj of a reproduction buffer RBj for accumulating the real time data Dj are obtained by the following expressions.

$$Yi = (2 \times n \times Ta \times Vt \times Vdi) \div \{Vt-(Vd1+Vd2+\ldots+Vdn)\}$$

$$Yj = (2 \times n \times Ta \times Vt \times Vdj) \div \{Vt-(Vd1+Vd2+\ldots+Vdn)\}$$

$$Bi = \{2 \times n \times Ta+(Y1+Y2+\ldots+Yn) \div Vt-Yi \div Vt)Vdi$$

$$Bj = \{2 \times n \times Ta+(Y1+Y2+\ldots+Yn) \div Vt-Yj \div Vt)Vdj$$

Ta is the access time required for the pickup P to access between an innermost area and an outermost area of the information recording medium.

Vt is the data transfer rate between the pickup P and the recording buffer WBi, and also the data transfer rate between the pickup P and the reproduction buffer RBj.

Vdi is the data transfer rate between the encoding module EMi and the recording buffer WBi.

Vdj is the data transfer rate between the decoding module DMj and the reproduction buffer RBj.

In addition, i is any integer of 1 or greater and m or less, and j is any integer of (m+1) or greater and n or less. m is any integer which fulfills m<n and is 1 or greater. n is any integer of 2 or greater which represents the number of the plurality of pieces of real time data for simultaneous recording and reproduction.

The above-described simultaneous recording and reproduction condition is applicable to the case where the transfer rate of the plurality of pieces of real time data is the same (i.e., in the case where Vd1=Vd2= . . . =Vdn).

EXAMPLE 3

In a third example, a case where a plurality of pieces of real time data to be reproduced and recorded have different and fixed transfer rates will be described. DV-format data which is used for digital video cameras has a fixed transfer rate, not a variable transfer rate as in the MPEG format. With the real time data having a fixed transfer rate, the reproduction operation and the recording operation can be switched to each other in units of recording area or reproduction area once an optimal size for each of the recording area and the reproduction area is determined. This simplifies the switching operation and also reduces the size of each of the recording area and the reproduction area.

Figure 28:
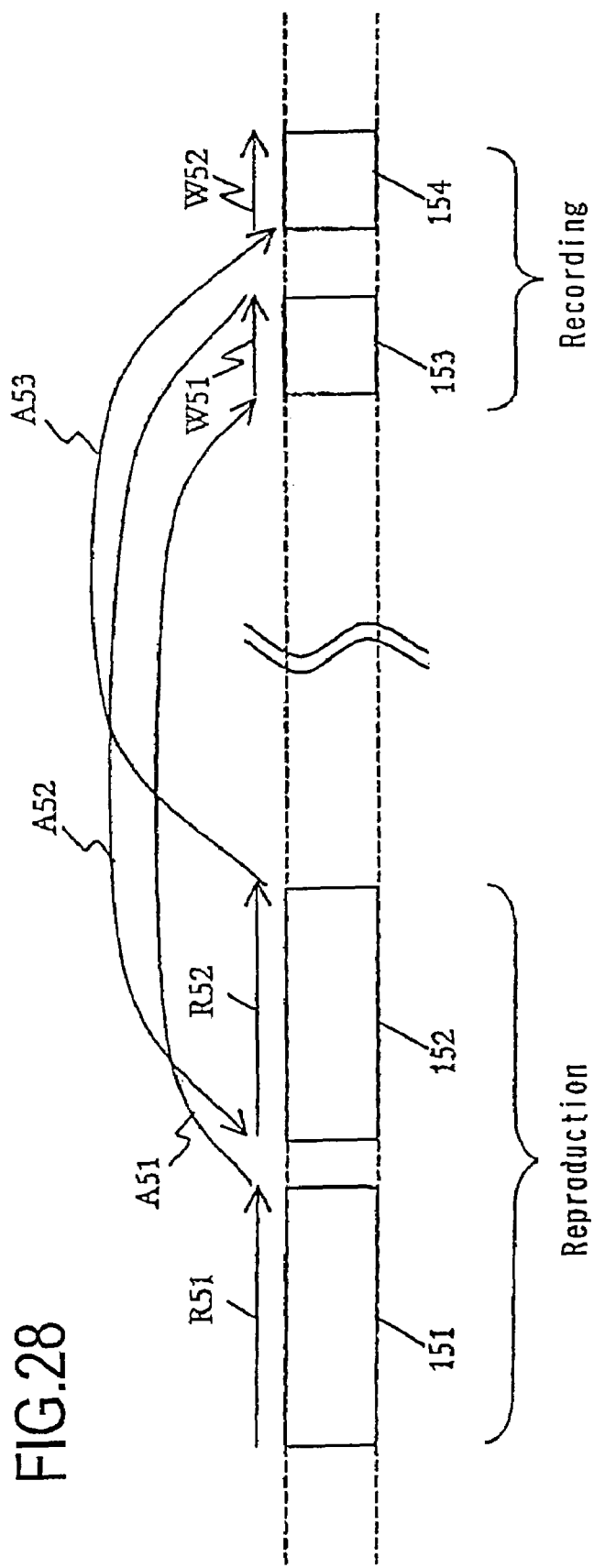
FIG. 28 shows a layout of recording areas for simultaneous recording and reproduction of two pieces of real time data according to the third example of the present invention.

FIG. 28 shows a layout of recording areas for simultaneous recording and reproduction of two pieces of real time data. As shown here, each of the recording areas has a different and fixed size in accordance with the type of data to be recorded in the area.

Figure 12:
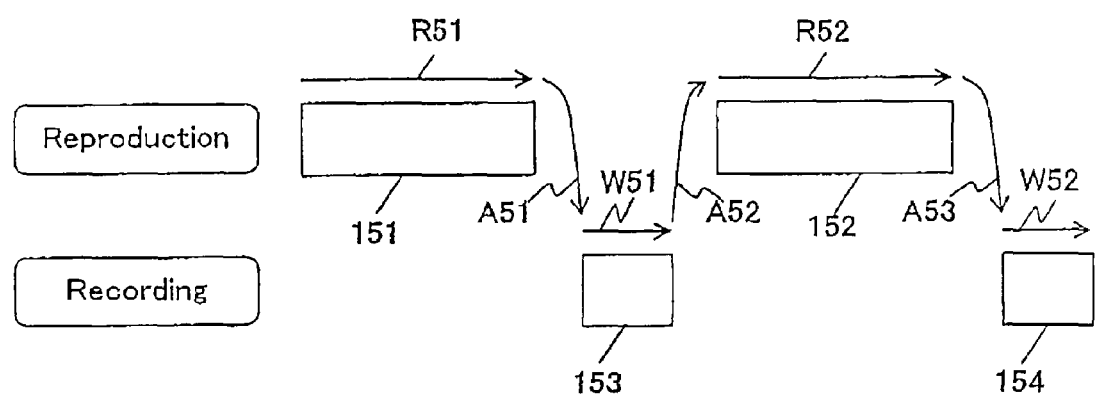
FIG. 12 shows recording operations, reproduction operations and access operations for simultaneous recording and reproduction of two pieces of real time data according to a third example of the present invention.

FIG. 12 shows recording operations, reproduction operations and access operations for two pieces of real time data having different transfer rates. Like in FIG. 9, R51 and R52 refer to reproduction operations, W51 and W52 refer to recording operations, and A51 through A53 refer to access operations. Reference numerals 151 and 152 each represent a reproduction area, and reference numerals 153 and 154 each represent a recording area. Since the transfer rates of the plurality of pieces of real time data are fixed, the reproduction operation and the recording operation are switched to each other in units of area. Accordingly, when reproduction from one reproduction area is completed, the reproduction operation can be switched to the recording operation. When recording in one recording area is completed, the recording operation can be switched to the reproduction operation.

The information recording and reproduction apparatus in the third example has the same structure as that of the information recording and reproduction apparatus shown in FIG. 5 except for the operations of the unassigned area search means 503 and the recording and reproduction switching means 502.

Figure 27:
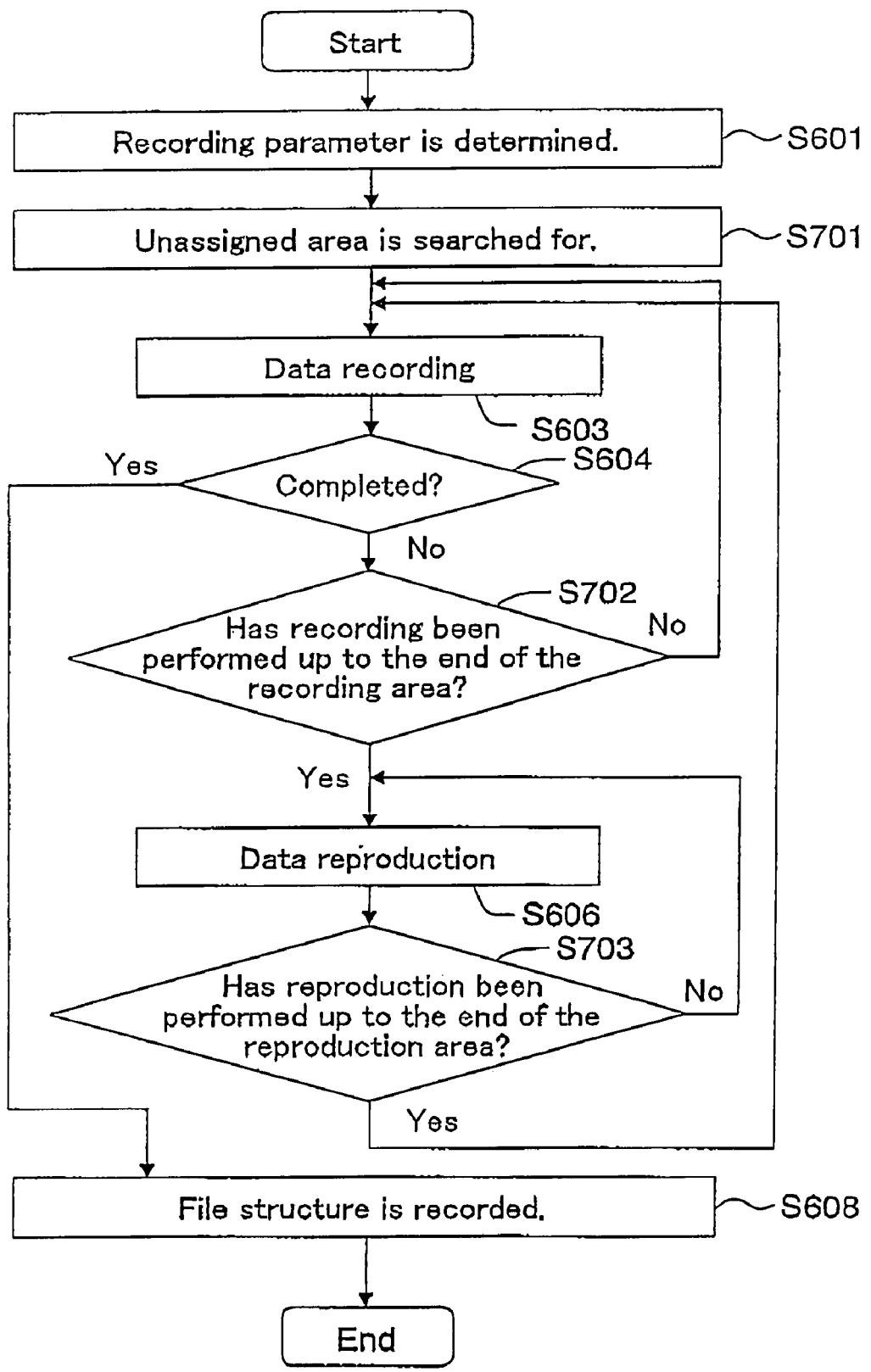
FIG. 27 is a flowchart illustrating a method for simultaneous recording and reproduction according to the third example of the present invention.

FIG. 27 shows a procedure of a method for simultaneous recording and reproduction. Such a method is stored, for example, in the form of a program in a memory in the system control section 501. Such a program can be executed by, for example, the microcomputer in the system control section 501.

The procedure shown in FIG. 27 is the same as that of the first example (FIG. 6) except for the expressions for obtaining the simultaneous recording and reproduction condition used in the step for searching for an unassigned area (S701) and the condition for switching the recording operation and the reproduction operation to each other (S702, S703).

In step S701, the unassigned area search means 503 searches for an unassigned area having a size of Y1 (or Y2) and assigns at least one unassigned area thus found as an area in which the real time data B is to be recorded. A method for obtaining the size Y1 (or Y2) of the recording area will be described below.

In step S702, in the recording operation of the real time data B, the recording and reproduction switching means 502 determines whether or not the real time data B has been recorded up to the end of the at least one recording area assigned as an area in which the real time data B is to be recorded. When it is determined that the real time data B has been recorded up to the end of the recording area, the recording operation of the real time data B is switched to the reproduction operation of the real time data A. When it is determined that the real time data B has not been recorded up to the end of the recording area, the recording operation of the real time data B is continued.

In step S703, in the reproduction operation of the real time data A, the recording and reproduction switching means 502 determines whether or not the real time data A has been reproduced up to the end of at least one reproduction area assigned as a reproduction area having the real time data A recorded therein. When it is determined that the real time data A has been reproduced up to the end of the reproduction area, the reproduction operation of the real time data A is switched to the recording operation of the real time data B. When it is determined that the real time data A has not been reproduced up to the end of the reproduction area, the reproduction operation of the real time data A is continued.

The data amount which is accumulated in the reproduction buffer 73 during the reproduction operation R51 is equal to the data amount consumed from the reproduction buffer 73 during the access operation A51, the recording operation W51 and the access operation A52. Accordingly, the following expressions are satisfied, where Y1 is the size of at least one reproduction area assigned as an area having the real time data A recorded therein, and Y2 is the size of at least one recording area assigned as an area in which the real time data B is to be recorded.

$$Y1 \div Vt \times (Vt - Vd1) = (2Ta + Y2 \div Vt) \times Vd1$$

$$Y2 \div Vt \times (Vt - Vd2) = (2Ta + Y1 \div Vt) \times Vd2$$

By manipulating these expressions, the following expressions for obtaining the size Y1 for the reproduction area and the size Y2 for the recording area are obtained.

$$Y1 = (2Ta \times Vt \times Vd1) \div (Vt - Vd1 - Vd2)$$

$$Y2 = (2Ta \times Vt \times Vd2) \div (Vt - Vd1 - Vd2)$$

A buffer size B1 required for the reproduction buffer 73 and a buffer size B2 required for the recording buffer 72 are obtained by the following expressions.

$$B1 = (2Ta + Y2 \div Vt)Vd1$$

$$B2 = (2Ta + Y1 \div Vt)Vd2$$

By setting the simultaneous recording and reproduction condition for the plurality of pieces of real time data each having a fixed transfer rate utilizing the different recording rates thereof as described above, it is made possible to record data having a low transfer rate in a smaller recording area. Thus, empty areas in the disc can be effectively used.

Figure 13:
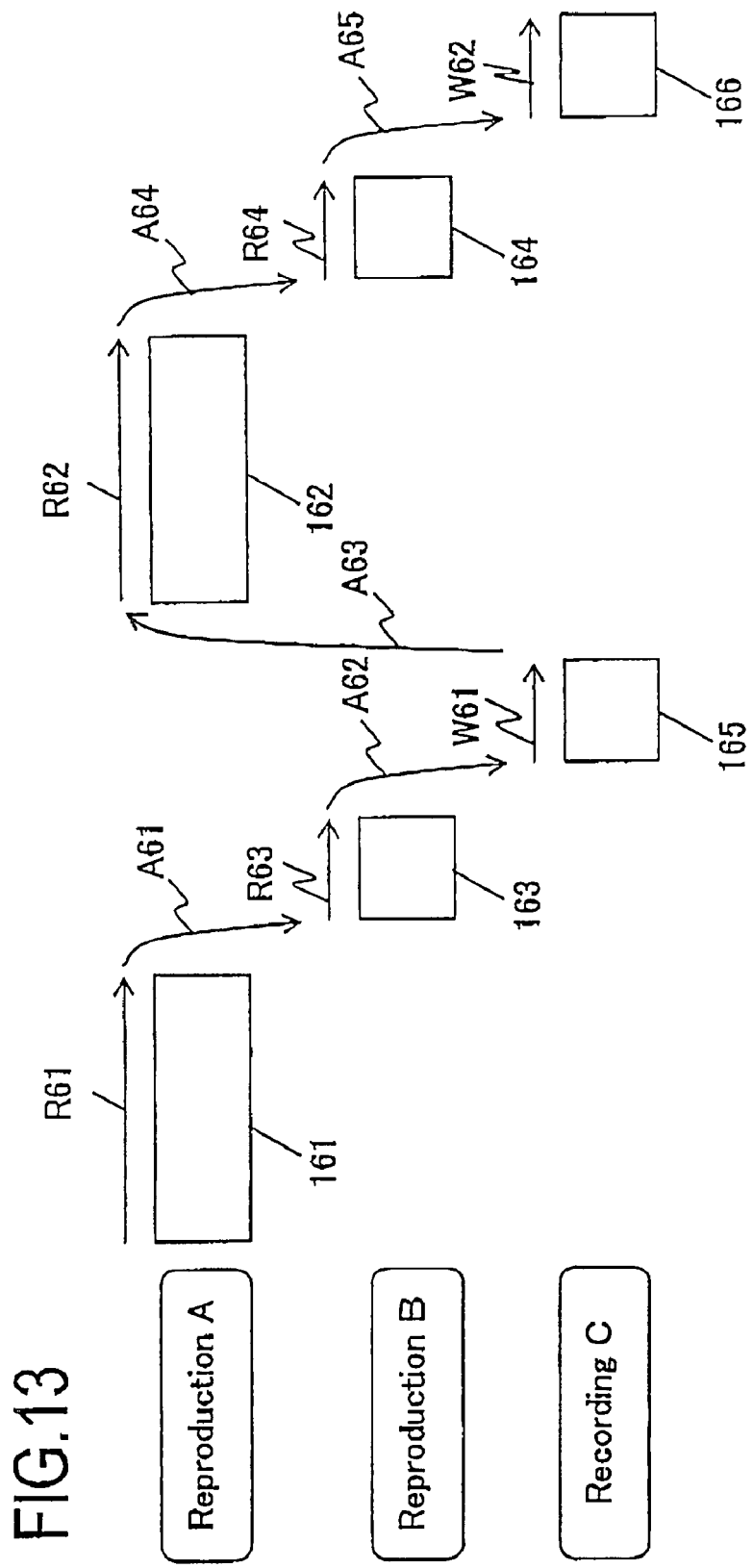
FIG. 13 shows recording operations, reproduction operations and access operations for simultaneous recording and reproduction of three pieces of real time data according to the third example of the present invention.

FIG. 13 shows recording operations, reproduction operations and access operations for three pieces of real time data considered in a similar manner. The simultaneous recording and reproduction condition for the three pieces of real time data can be obtained as follows.

$$Y1=(3Ta \times Vt \times Vd1) \div (Vt-Vd1-Vd2-Vd3)$$

$$Y2=(3Ta \times Vt \times Vd2) \div (Vt-Vd1-Vd2-Vd3)$$

$$Y3=(3Ta \times Vt \times Vd3) \div (Vt-Vd1-Vd2-Vd3)$$

$$B1=(3Ta+Y2 \div Vt+Y3 \div Vt)Vd1$$

$$B2=(3Ta+Y3 \div Vt+Y1 \div Vt)Vd1$$

$$B3=(3Ta+Y1 \div Vt+Y2 \div Vt)Vd1$$

For simultaneous recording and reproduction of n number of real time data, the "n-simultaneous recording and reproduction model" described above is used. Referring to FIG. 27, the following operations are performed in steps S701, S603, S606, S702, and S703.

Step S701: The unassigned area search means 503 searches for an unassigned area in the volume space in the information recording medium and assigns at least one unassigned area in the volume space as an area Ai in which real time data Di is to be recorded.

Step S603: In compliance with the instruction for recording from the data recording means 505, the optical disc drive 531 executes a recording operation Wi for recording the real time data Di accumulated in a recording buffer WBi in the area Ai.

Step S702: In the recording operation Wi, the recording and reproduction switching means 502 determines whether or not the real time data Di has been recorded up to the end of the at least one recording area assigned as the area Ai. When it is determined that the real time data Di has been recorded up to the end of the recording area, the recording and reproduction switching means 502 switches the recording operation Wi to another recording operation Wi or a reproduction operation Rj. When it is determined that the real time data Di has not been recorded up to the end of the recording area, the recording and reproduction switching means 502 continues the recording operation Wi.

Step S606: In compliance with the instruction for reproduction from the data reproduction means 506, the optical disc drive 531 executes a reproduction operation Rj for reproducing real time data Dj from the area Aj having the real time data Dj recorded therein.

Step S703: In the reproduction operation Rj, the recording and reproduction switching means 502 determines whether or not the real time data Dj has been reproduced up to the end of at least one reproduction area assigned as the area Aj. When it is determined that the real time data Dj has been reproduced up to the end of the reproduction area, the recording and reproduction switching means 502 switches the reproduction operation Rj to another reproduction operation Rj or a recording operation Wi. When it is determined that the real time data Dj has not been reproduced up to the end of the reproduction area, the recording and reproduction switching means 502 continues the reproduction operation Rj.

With reference to FIG. 27, a method for simultaneous recording and reproduction of two pieces of real time data is described. Thus, the recording operation and the reproduction operation are alternately switched. For simultaneous recording and reproduction of n number of real time data, n may be an odd number, and the number of pieces of real time data to be recorded may be different from the number of pieces of real time data to be reproduced. Therefore, a recording operation may be switched to another recording operation, and a reproduction operation may be switched to another reproduction operation.

Each of at least one area assigned as the area Ai is structured so as to fulfill the condition that the real time data Di, which is accumulated in the recording buffer WBi during n number of access operations accompanying the recording/reproduction operation switching, (m−1) number of recording operations and (n−m) number of reproduction operations, can be recorded by one recording operation.

Each of at least one area assigned as the area Aj is structured so as to fulfill the condition that the real time data Dj, which is accumulated in the reproduction buffer RBj during one reproduction operation, can be consumed during n number of access operations accompanying the recording/reproduction operation switching, (n−m−1) number of reproduction operations and m number of recording operations. Fulfilling these two conditions is to fulfill the simultaneous recording and reproduction condition.

The simultaneous recording and reproduction condition can be fulfilled where, for example, each of at least one area assigned as the area Ai in which the real time data Di is to be recorded has a size of Yi and each of at least one area assigned as the area Aj from which the real time data Dj is to be reproduced has a size of Yj.

The size Yi for a recording area, the size Yj for a reproduction area, the size Bi for the recording buffer WBi, and the size Bj for the reproduction buffer RBj are obtained by the following expressions.

$$Yi=(n \times Ta \times Vt \times Vdi) \div \{Vt-(Vd1+Vd2+\ldots+Vdn)\}$$

$$Yj=(n \times Ta \times Vt \times Vdj) \div \{Vt-(Vd1+Vd2+\ldots+Vdn)\}$$

$$Bi=\{n \times Ta+(Y1+Y2+\ldots+Yn) \div Vt-Yi \div Vt\}Vdi$$

$$Bj=\{n \times Ta+(Y1+Y2+\ldots+Yn) \div Vt-Yj \div Vt\}Vdj$$

Ta is the access time required for the pickup P to access between an innermost area and an outermost area of the information recording medium.

Vt is the data transfer rate between the pickup P and the recording buffer WBi, and also the data transfer rate between the pickup P and the reproduction buffer RBj.

Vdi is the data transfer rate between the encoding module EMi and the recording buffer WBi.

Vdj is the data transfer rate between the decoding module DMj and the reproduction buffer RBj.

In addition, i is any integer of 1 or greater and m or less, and j is any integer of (m+1) or greater and n or less. m is any integer which fulfills m<n and is 1 or greater. n is any integer of 2 or greater which represents the number of the plurality of pieces of real time data for simultaneous recording and reproduction.

Figure 14:
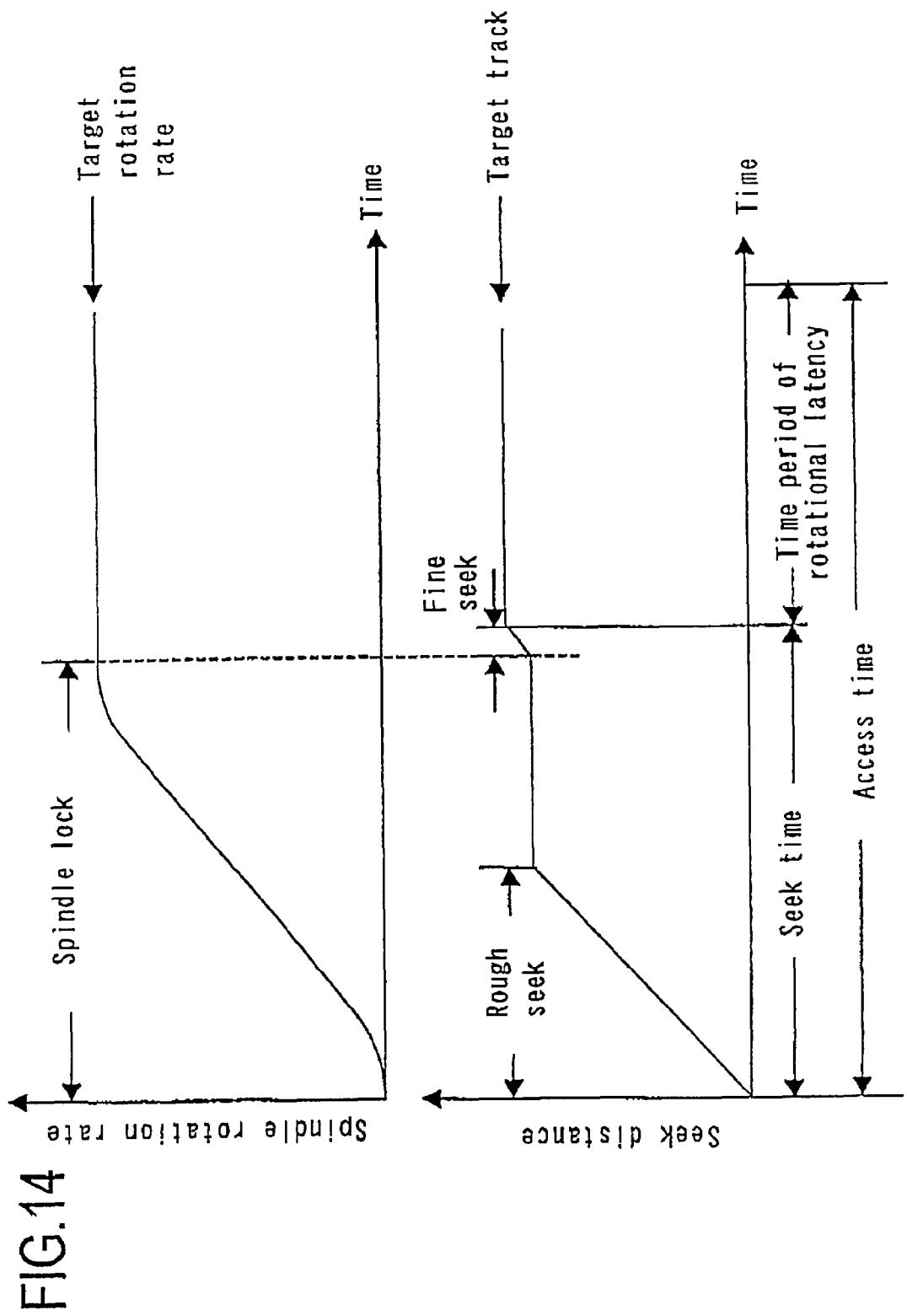
FIG. 14 shows the details of the access time according to the third example of the present invention.

Next, access performance of a drive for performing recording to and reproduction from a disc will be described. FIG. 14 shows the details of the access time of the drive for accessing a sector of a target track. When the distance for access is longer, the access time is longer by the distance corresponding to the movement (rough seek) of the pickup.

For recording data on a CLV system (constant linear velocity system) disc, the rotation rate of the disc needs to be changed in accordance with the radial position to be accessed. Therefore, a spindle lock time is required for accelerating or decelerating the rotation of a spindle motor to match a prescribed rotation rate. The spindle motor is provided for rotating the disc. Once the rotation rate of the disc is locked, the search for an address becomes possible. Then, the movement of the pickup for performing multiple jumps in units of a plurality of tracks to access the target track (fine seek) requires some time. The multiple jumps are performed mainly using an optical system. After this, the pickup waits for the prescribed sector to come to the position corresponding to the pickup. Thus, recording or reproduction is made possible. When the distance for access is within a range of fine seek, the access time is the sum of the fine seek time and the time period of rotational latency. When the distance for access is 1/3 of the disc capacity, the access time is the sum of the corresponding spindle lock time and the rough seek time.

By pre-checking the access performance of the drive, the time for access between extents for simultaneous recording and reproduction can be the access time obtained by the access performance of the drive, not the full seek time. Since such an access time is shorter than the full seek time, data can be recorded in a smaller continuous empty area. Even when the extent is made shorter by editing, it is more often determined that continuous reproduction is possible.

Figure 26:
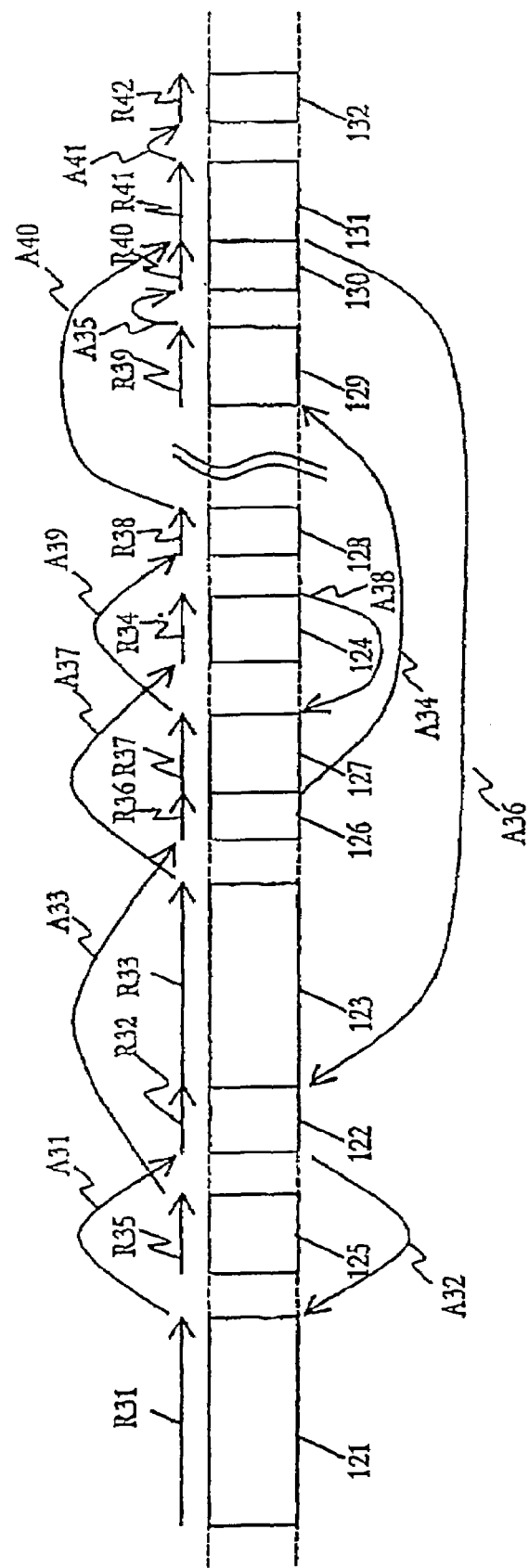
FIG. 26 shows access operations and a layout of recording areas for simultaneous recording and reproduction of three pieces of real time data according to the third example of the present invention.

FIG. 26 shows access operations and a layout of recording areas for simultaneous recording and reproduction of three pieces of real time data. In the case where, for example, the recording areas 128 and 129 are distanced from each other as far as an innermost area and an outermost area of the disc are distanced, the time required for each of access operations A40, A34 and A36 substantially equals the full seek time. In the case where the recording areas 122 and 121 are distanced from each other by approximately 100 tracks, the time required for the access operation A31 substantially equals the fine seek time.

In the method for simultaneous recording and reproduction shown in FIG. 6, the access time (first access time or second access time) is estimated in step S602 in which an unassigned area is searched for. In the method for simultaneous recording and reproduction shown in FIG. 27, the access time is estimated in step S701 in which an unassigned area is searched for. Such an estimation of the access time is performed by the unassigned area search means 503 (FIG. 5).

In consideration of the estimated access time, the simultaneous recording and reproduction condition described in the second example is as follows.

$$Yi=\{2\times(T1+\ldots+Tn)\times Vt\times Vdi\}\div\{Vt-(Vd1+Vd2+\ldots+Vdn)\}$$

$$Yj=\{2\times(T1+\ldots+Tn)\times Vt\times Vdj\}\div\{Vt-(Vd1+Vd2+\ldots+Vdn)\}$$

$$Bi=\{2\times(T1+\ldots+Tn)+(Y1+Y2+\ldots+Yn)\div Vt-Yi\div Vt\}Vdi$$

$$Bj=\{2\times(T1+\ldots+Tn)+(Y1+Y2+\ldots+Yn)\div Vt-Yj\div Vt\}Vdj$$

Tk is a first access time or a second access time. The first access time is the access time required for the pickup P to access from an area Ak to an area Al. The second access time is the access time required to access from one area among at least one area assigned as the area Ak to another area. k and l are each any integer of 1 or greater and n or less. k≠l.

In addition, i is any integer of 1 or greater and m or less, and j is any integer of (m+1) or greater and n or less. m is any integer which fulfills m<n and is 1 or greater, and n is any integer of 2 or greater which represents the number of a plurality of pieces of real time data.

The above-described simultaneous recording and reproduction condition is applicable to the case where the transfer rate of the plurality of pieces of real time data is the same (i.e., in the case where Vd1=Vd2= ... =Vdn).

In consideration of the estimated access time, the simultaneous recording and reproduction condition described in the third example is as follows.

$$Yi=\{(T1+\ldots+Tn)\times Vt\times Vdi\}\div\{Vt-(Vd1+Vd2+\ldots+Vdn)\}$$

$$Yj=\{(T1+\ldots+Tn)\times Vt\times Vdj\}\div\{Vt-(Vd1+Vd2+\ldots+Vdn)\}$$

$$Bi=\{(T1+\ldots+Tn)+(Y1+Y2+\ldots+Yn)\div Vt-Yi\div Vt\}Vdi$$

$$Bj=\{(T1+\ldots+Tn)+(Y1+Y2+\ldots+Yn)\div Vt-Yj\div Vt\}Vdi$$

Tk is the access time required for the pickup P to access from an area Ak to an area Al. k and l are each any integer of 1 or greater and n or less. k≠l.

In addition, i is any integer of 1 or greater and m or less, and j is any integer of (m+1) or greater and n or less. m is any integer which fulfills m<n and is 1 or greater, and n is any integer of 2 or greater which represents the number of a plurality of pieces of real time data to be simultaneously recorded and reproduced.

The above-described simultaneous recording and reproduction condition is applicable to the case where the transfer rate of the plurality of pieces of real time data is the same (i.e., in the case where Vd1=Vd2= ... =Vdn).

Figure 15:
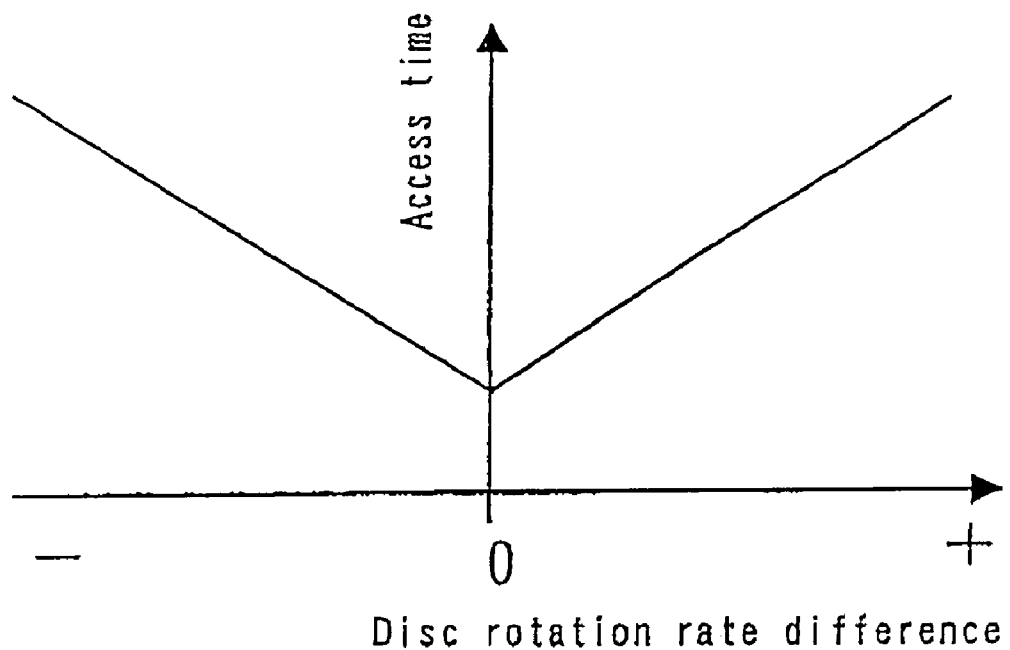
FIG. 15 shows the relationship between the rotation rate difference and the access time of the disc according to the third example of the present invention.

Next, a method for improving the utilization efficiency and editing efficiency of the disc by restricting the full seek time will be described. FIG. 15 shows the relationship between the rotation rate difference of the spindle motor of the drive and the access time. With the premise of TRQ=(N1−N2)·J/(dt·Kj), the access time Tacc is obtained as follows.

$$Tacc=\text{(spindle lock time)}+\text{(time period of rotational latency)}+\text{constant}=(N1-N2)\times J\div(TRQ\times KJ)+Trev+\text{constant}=A\times dN+B$$

In the above expression, A and B are each a constant, dN is the rotation rate difference (=N1−N2), dt is the spindle lock time, J is the inertial of the disc, Kj is the conversion constant, N1 is the rotation rate before access, N2 is the rotation rate after access, Trev is the time period of rotational latency, and TRQ is the torque of the motor. The above-mentioned access performance model is set based on the relationship between the rotation rate difference of the disc and the access time. As described above with reference to FIG. 14, for moving the pickup to a position close to the target track, rough seek and a change in the rotation rate of the spindle motor are necessary. With the performance of the spindle motor used in an optical disc drive, the access time is dominantly influenced by the change in the rotation rate of the spindle motor. Paying attention to the fact that the spindle lock time is in proportion to the rotation rate difference, the access time can be represented by the above expression. The time period of rotational latency (Trev), when being sufficiently smaller than the spindle lock time, can be omitted. In that case, the access time Tacc can be linearly estimated with respect to the rotation rate difference dN of the disc.

Once the initial position and the target position of the pickup are found, the rotation rate and the rotation rate difference of the disc can be uniquely obtained from the relationship thereof with the linear velocity of the disc. Where A1 is the address before access, A2 is the address after access, r1 is the radial position of A1, r2 is the radial position of A2, and r0 is the radial position of address 0, the addresses A1 and A2 are obtained as follows. The value of an address is in proportion to the area of a circle having the address on the outer circumference thereof. C is a constant.

$$A1 = C \cdot (\pi \cdot r1 \cdot r1 - \pi \cdot r0 \cdot r0)$$

$$A2 = C \cdot (\pi \cdot r2 \cdot r2 - \pi \cdot r0 \cdot r0)$$

The rotation rate at a certain address is in inverse proportion to the radial position thereof. Therefore, where N1 is the rotation rate of A1, N2 is the rotation rate of A2, and D is the constant, $$N1 = D/r1, \text{ and}$$

$$N2 = D/r2.$$

Using the above expressions, the rotation rate can be obtained from the address.

Figure 16:
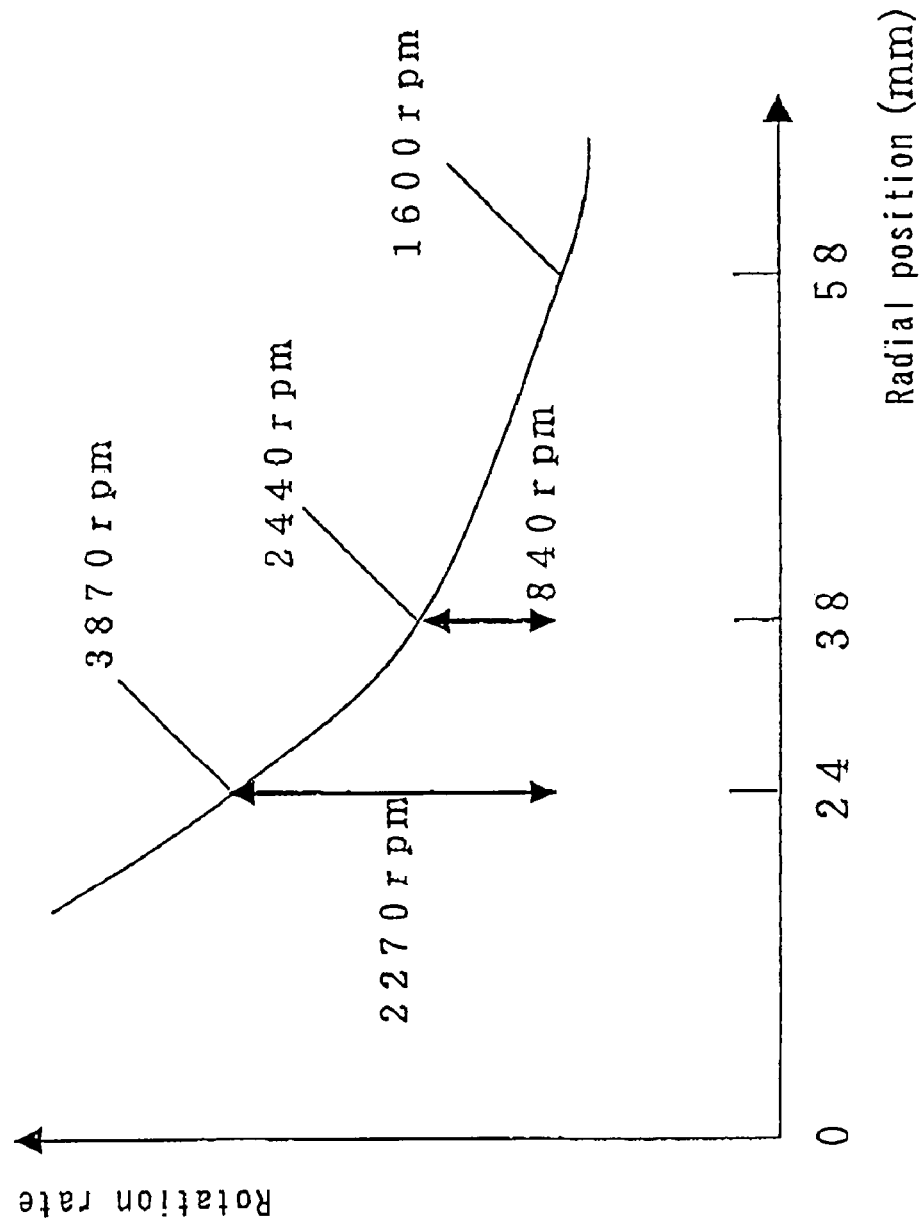
FIG. 16 shows the relationship between the radial position and the rotation rate difference of the disc according to the third example of the present invention.
Figure 29:
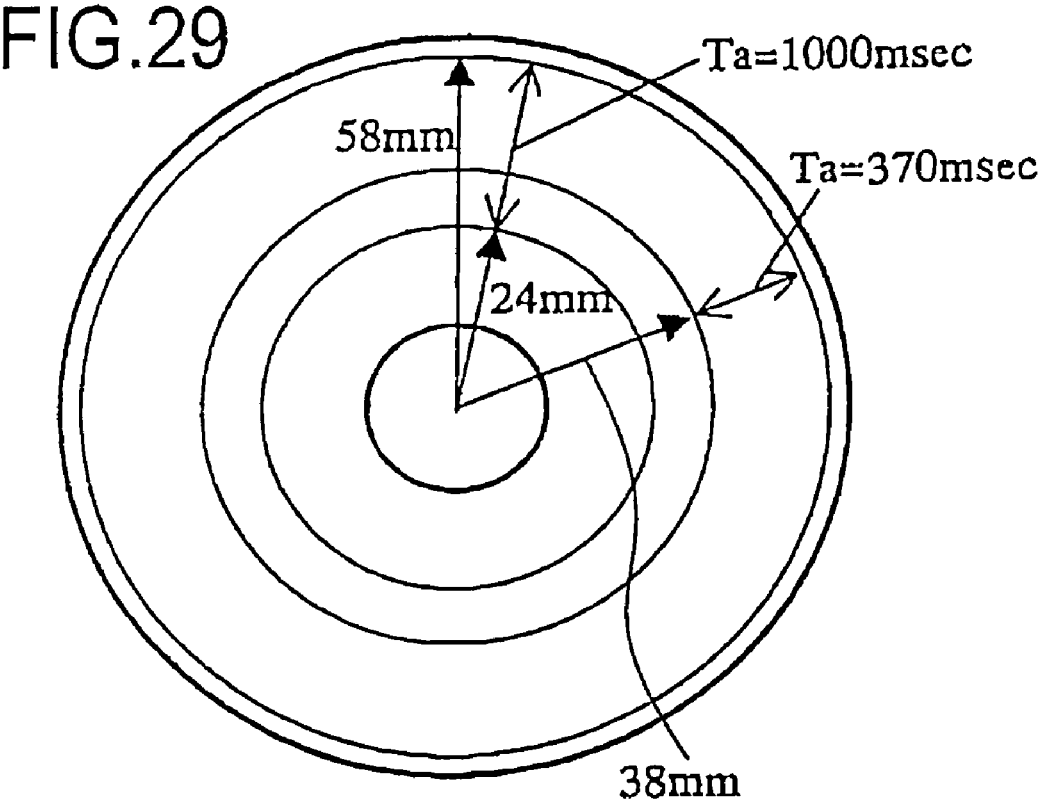
FIG. 29 shows areas to be accessed on the disc and an access time required for full seek in the area according to the third example of the present invention.
Figure 30:
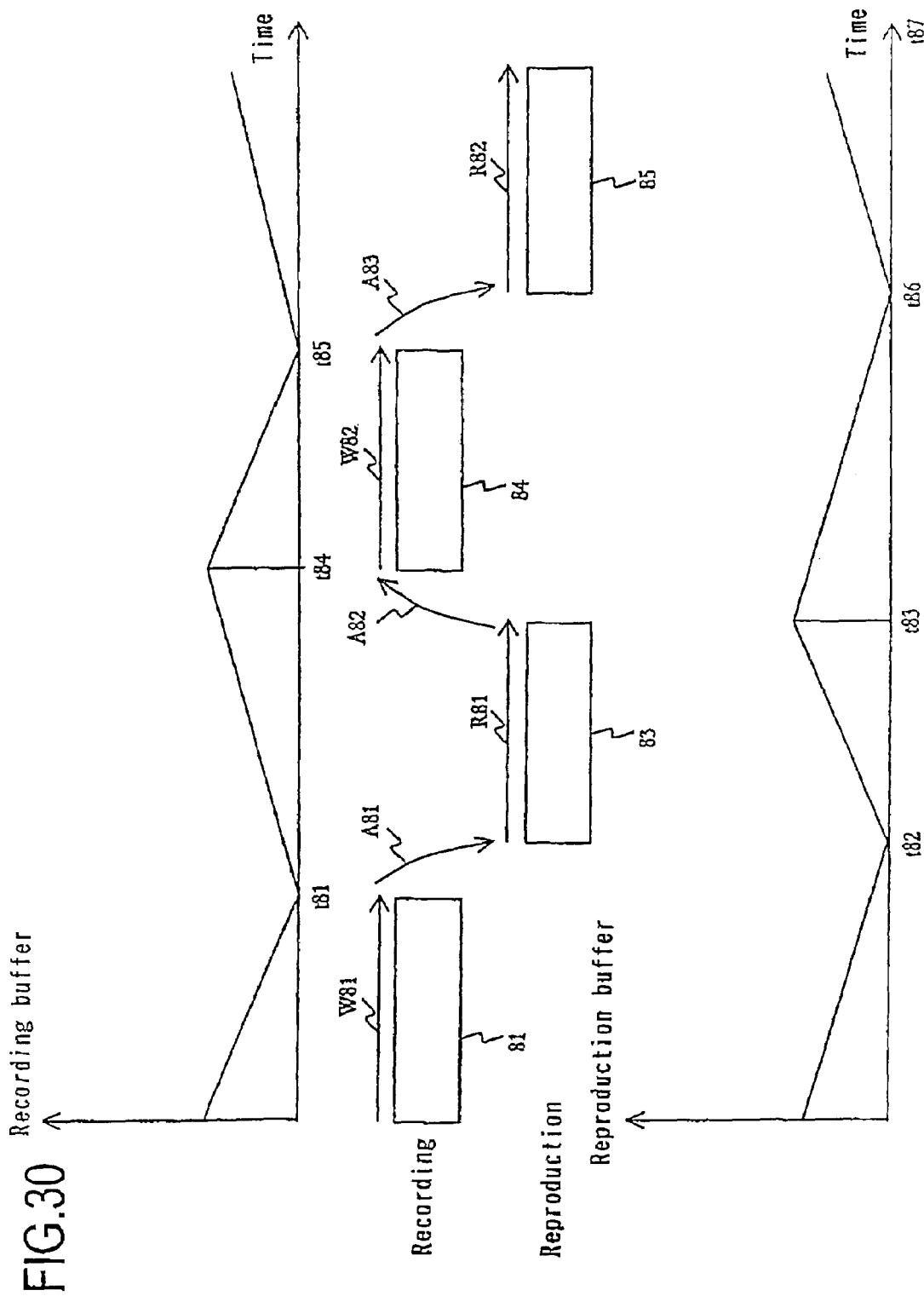
FIG. 30 shows a conventional simultaneous recording and reproduction condition.
Figure 31:
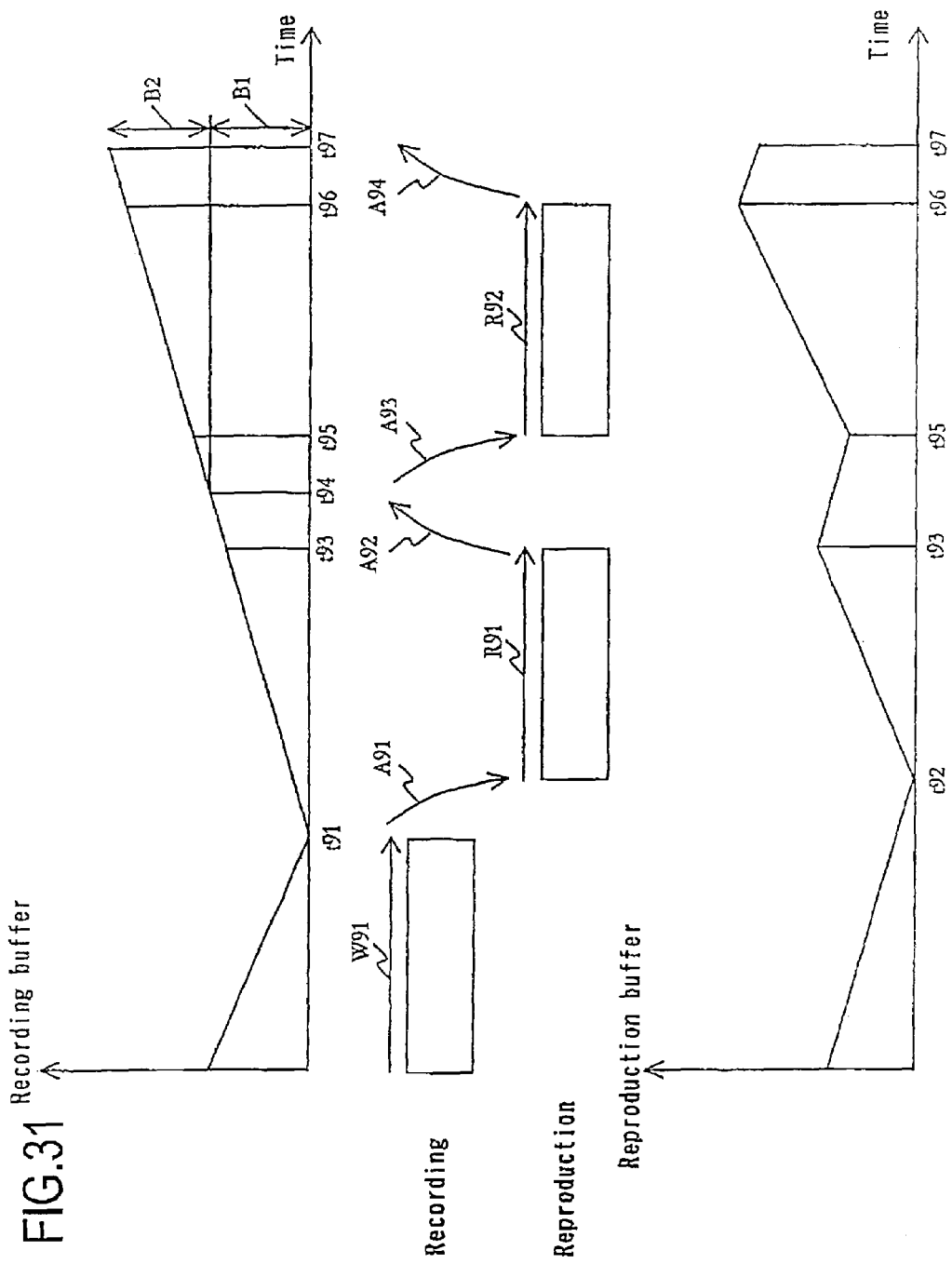
FIG. 31 shows a conventional simultaneous recording and reproduction operation.

FIG. 16 shows the relationship between the radial position and the rotation rate of a disc having a diameter of 12 cm, a capacity of 25 GB, and a reading rate of 72 Mbps. The logical product of the radial position and the rotation rate is constant. Therefore, when an access of a given distance is made in a radial direction, the access time is shorter at an outer portion of the disc than at an inner portion of the disc since the rotation rate difference is smaller at the outer portion of the disc than the inner portion. The volume space extends between a position having a radius of 24 mm and a position having a radius of 58 mm, and the full seek time is in proportion to the rotation rate difference of 2270 rpm. It is assumed now that AV data is to be recorded in an area extending between a position having a radius of 38 mm and a position having a radius of 58 mm. The access time, which is in proportion to the rotation rate difference of 840 rpm, is about 1/2.7 of 2270 rpm. In FIG. 29, the longest access time from a position having a radius of 24 mm to a position having a radius of 58 mm is 1000 msec. In such a case, the longest access time is reduced to 370 msec. by providing a recording area between a position having a radius of 38 mm and a position having a radius of 58 mm. The capacity of the area between the position having a radius of 38 mm and the position having a radius of 58 mm is 17 GB, which is about 30 percent less than the case where the longest access time is 1000 msec. Unless a significantly large capacity is required, an outer portion of the disc can be set as a high-speed access zone in which AV data is to be recorded. In this manner, the access time can be significantly reduced, and the size required for a continuous recording area under the simultaneous recording and reproduction condition can be reduced in proportion to the access time. Owing to such a high-speed access zone, even when the extent is shortened, continuous simultaneous recording and reproduction is made possible more often. This is especially useful for after-recording (post-recording), chasing reproduction or the like.

When recording is performed utilizing the above-described characteristics of the disc, the discs may be classified into discs having a high-speed access zone and discs with no such zone. Information indicating to which class the disc belongs may be recorded in the lead-in area or the volume space. For example, the disc having a high-speed access zone is classified as class 1, and the disc having no such zone is classified as class 0. The maximum access time in the high-speed access zone may be recorded together with the information on the class. Such settings improve inter-apparatus compatibility since an optical disc apparatus on which the disc is mounted can find the information on the class of the disc.

When an optical disc having a capacity of 25 GB is used for a consumer video recorder, which has the same functionality as, for example, a VTR, such an optical disc realizes a recording time as long as 10 hours. This allows various types of processing to be performed with one disc, such as material editing, as well as timer recording. The editing performance after recording can be improved where a plurality of high-speed access zones are set.

When a high-speed access zone is set in a one-layer disc, the capacity is small. This problem is solved in the case of a two-layer disc, which has a high-speed access zone formed of (i) a zone of a recording surface of the first layer and (ii) a zone of a recording surface of a second layer, the zones being at the same radial position. Precisely, the zones of the two recording surfaces are not exactly at the same radial position due to the physical production process. However, the access time required for accessing between a target track in the first layer and a target track in the second layer is about the same as the sum of a focus switching time required by the pickup and the time period of rotational latency, and thus is generally shorter than the fine seek time. The time required for accessing between the target tracks in the layers is sufficiently shorter than the access time from an innermost portion to an outermost portion of the high-speed access zone.

For simultaneous recording and reproduction of n number of real time data, areas Ai in which real time data Di is to be recorded and areas Aj from which real time data Dj is to be reproduced may be provided in an outer portion of the information recording medium (for example, in the high-speed access zone) for all the values of i and j. Thus, the access time can be shortened.

EXAMPLE 4

In the first, second and third examples, the basics of the present invention for simultaneous recording and reproduction are described. In a fourth example of the present invention, actual simultaneous recording and reproduction will be described by way of three specific examples of after-recording (post-recording). In the fourth example, an area in which new audio data is to be recorded is determined while pre-recorded video data and audio data are being reproduced, and the new audio data is additionally recorded to the originally recorded audio data. In the case where the audio data and the video data are not recorded as one MPEG stream but are recorded in separate areas, the audio data and the video data can be regarded as being two pieces of real time data. In such a case, the simultaneous recording and reproduction is realized by the methods described in the first, second and third examples.

Figure 17:
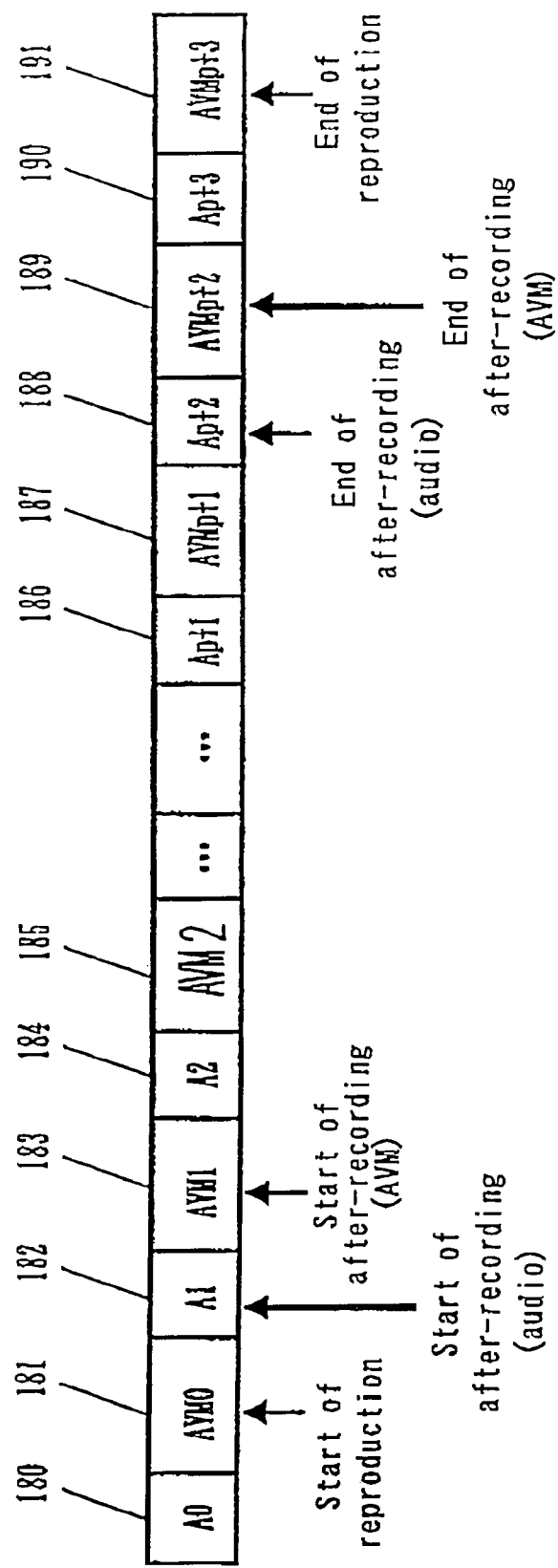
FIG. 17 shows an arrangement of recording areas in the case where AVM data and data for after-recording (post-recording) are recorded alternately according to a fourth example of the present invention.
Figure 18:
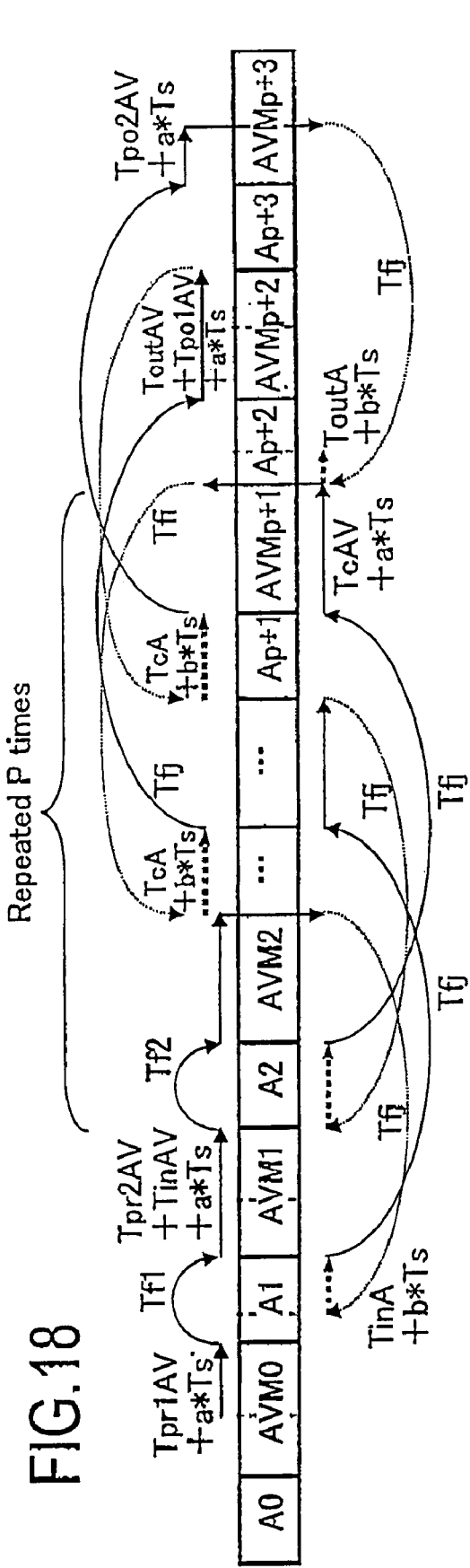
FIG. 18 shows access operations for recording and reproduction with after-recording in the case where AVM data and data for after-recording are recorded alternately according to the fourth example of the present invention.
Figure 19:
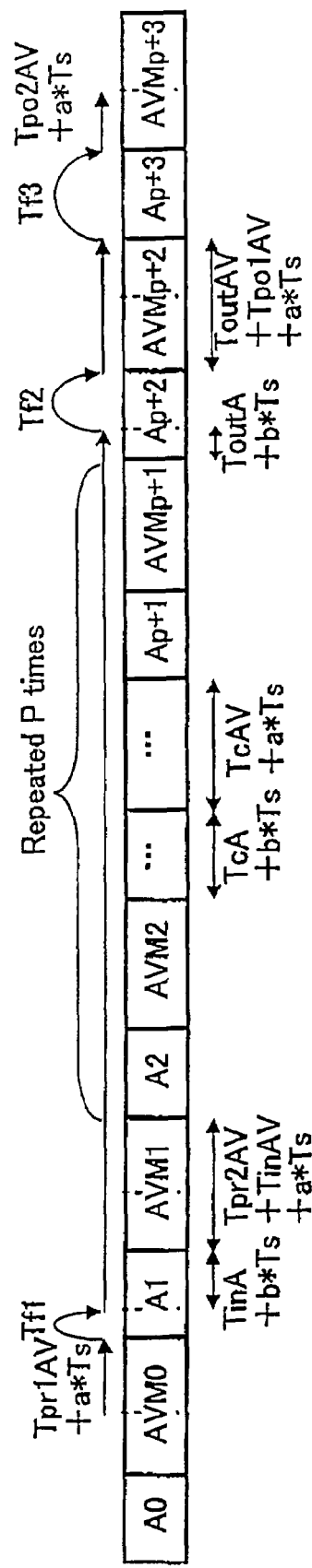
FIG. 19 shows access operations for reproduction after after-recording in the case where AVM data and data for after-recording are recorded alternately according to the fourth example of the present invention.

FIGS. 17, 18 and 19 show a method for after-recording data on a disc in which audio data and video data encoded in a mixed manner are recorded, and a method for reproducing data from such a disc. After-recording of the audio data is assumed to be performed in a pre-determined recording area. In this example, the audio data and video data encoded in a mixed manner such as, for example, MPEG data and DV data will be referred to as "AVM (Audio Video Mix Data)". FIG. 17 shows an arrangement of the AVM data and data for after-recording on a disc. A recording area for audio data to be after-recorded is defined by a prescribed period (recording areas 180, 182, 184, 186, 188 and 190). Recording areas 181, 183, 185, 187, 189 and 191 have the AVM data recorded therein. The numerals added to AVM (0 of AVM0 through p+3 of AVMp+3) each represent the number assigned to the data in the order of address.

In the after-recording in this example, audio data is recorded while reproducing the AVM data. Since the AVM data is reproduced after being accumulated in the buffer, the pickup needs to read the data from the disc in advance. Therefore, audio data cannot be after-recorded in an area immediately after a recording area of the AVM data. According to the present invention, a recording area for after-recording is set before a recording area of the AVM data, such that the size of the reproduction buffer is as small as possible. Owing to such an arrangement, reproduction can be started immediately after the start of the reading of the video data, which is performed after the audio data is read. Thus, the size of the reproduction buffer can be reduced. In the case where the video data is read before the audio data, the reproduction can only be started after the start of the reading of the audio data which is performed after the video data is read. A reason why the audio data is read before the video data according to the present invention is that in this way, the time required for an image to be output is shorter. The AVM data has a higher transfer rate than that of the audio data to be after-recorded. Therefore, if the AVM data is read first, the image can only be output after the recording area for after-recording is accessed. It is preferable to read the audio data before the video data. In this case, once the after-recorded audio data recorded in a small recording area is read and the recording area of the AVM data is accessed, the image can be output.

The reproduction start position is set in the recording area 181, the positions to start the after-recording of audio data and the corresponding video data are set respectively in the recording areas 182 and 183, and the after-recording termination positions are set in the recording areas 188 and 189. The reproduction termination position is set in the recording area 191.

FIG. 18 shows the order of the recording areas shown in FIG. 17 to be accessed for after-recording. It is difficult to after-record data at an appropriate timing after the AVM data is read, since the recording area for after-recording is immediately before a recording area of the AVM data. Therefore, data is after-recorded in correspondence with the AVM data which is immediately previous to the AVM data which has just been read. For example, after AVM2 is reproduced, data corresponding to AVM1 is after-recorded in a recording area immediately before AVM1. In this manner, after AVM data is read, audio data corresponding to different AVM data which has already been read is after-recorded. Thus, simultaneous recording and reproduction can be realized.

P is the number of the sets of continuous areas, from each of which whole data is read completely ($P \geq 0$). Tpr1AV is the net time period required for reading AVM0 from the reproduction start position. The label "repeated P times" means that, for example, in the case of P=3, A2, AVM2, A3, AVM3, A4, and AVM4 exist in the range of P number of continuous areas. As described above regarding skip recording, when there are "a" number of defective ECC blocks in the recording area of AVM0, the time $a \times Ts$ is required in addition to Tpr1AV, where Ts is the time for reading one ECC block. Tf1, Tf2, Tfi, and Tfj each represent an access time between recording areas, which is approximately within the range of fine seek. Tpr2AV is the time required for reading data in the recording area of AVM1 up to the after-recording start position. TinAV is the time required for reading data from the after-recording start position until the end of the recording area of AVM1. ToutAV is the time required for reading data in a recording area of AVM until the after-recording termination position. TcA is the net time period required for reading after-recorded audio data. TcAV is the net time period required for reading AVM data. TinA is the time period required for reading after-recorded data from the after-recording start position. ToutA is the time required for reading after-recorded data until the after-recording termination position. Tpo1AV is the time required for reading data in a recording area in which the after-recording termination position is set, from the after-recording termination position. Tpo2AV is the time required for reading data in a recording area in which the reproduction termination position is set, until the reproduction termination position. "a" represents the number of ECC blocks to be skipped in a recording area of the AVM, and "b" represents the number of ECC blocks to be skipped in a recording area for after-recording.

Hereinafter, a simultaneous recording and reproduction condition for realizing after-recording of data in the order of the recording areas to be accessed shown in FIG. 18 will be discussed. As long as the size of the real time data recorded on a disc is larger than the logical product of (i) the time required from the start of the reading of the data until the next recording area is accessed and (ii) the transfer rate of the data, the reproduction buffer does not become empty. Thus, the following expressions are obtained.

$$Y/Vd \geq Tpr1AV + Tf1 + TcAV + Tf2 + TcAV + 2*Tfj + TinA + (P-1)*(TcAV + TcA + 2*Tfj) + TcAV + 2*Tfj + TcA + Tpo2AV + (P+1)*(a+b)*Ts + 3*a*Ts$$

$$Y = (Tpr1AV + (P+2)*TcAV + Tpo2AV)*Vt$$

$$TinAV*Vt*(VdA/Vd) = TinA*Vt$$

$$ToutAV*Vt*(VdA/Vd) = ToutA*Vt$$

$$TcAV*Vt*(VdA/Vd) = TcA*Vt$$

$$TcAV = Tpr2AV + TinAV = ToutAV + Tpo1AV$$

Y is the size of the AVM data in FIG. 17 recorded in a zone from the reproduction start position until the reproduction termination position. Vd is the transfer rate of the AVM data between the decoding module and the reproduction buffer. VdA is the transfer rate of the audio data for after-recording between the encoding module and the recording buffer. Vt is the transfer rate by which the pickup P reads the data from the disc. Accordingly, the following expression is obtained.

$$Y/Vd \geq (Tf1 + Tf2 + (P+1)*2*Tfj + (P+1)*(a+b)*Ts + 3*a*Ts - (Tpr1AV + Tpr2AV + ToutAV + Tpo1AV + Tpo2AV)*VdA/Vd)*Vt/(Vt - Vd - VdA)$$

Regarding one cycle of after-recording in which the AVM data is read, the recording area for audio data for after-recording is accessed, the audio data is after-recorded, and the next recording area of the AVM data is accessed, the following expressions are obtained.

$$Y'/Vd \geq TcAV + 2*Tfj + TcA + (a+b)*Ts$$

$$Y' = TcAV*Vt$$

Y' is the size of the recording area of the AVM, and is, for example, the size of the recording area 187 in FIG. 17. Accordingly, the following expression is obtained.

$$Y'/Vd \geq (2*Tfj+(a+b)*Ts)*Vt/(Vt-Vd-VdA)$$

Regarding the section from the reproduction start position to Tf2, the following expressions are obtained in consideration of the influence of the reproduction start position which is set in the middle of the recording area 181.

$$Y''/Vd \geq Tpr1AV+Tf1+TcAV+Tf2+2*a*Ts$$

$$Y''=(Tpr1AV+TcAV)*Vt$$

Accordingly, the following expression is obtained.

$$Y''/Vd \geq (Tf1+Tf2+2*a*Ts)*Vt/(Vt-Vd)$$

When all the above expressions are satisfied, after-recording is made possible.

It is understood that even if one of the expressions in which the left side is Y'/Vd is not satisfied, simultaneous recording and reproduction cannot be performed in the range of P number of continuous areas. In order to check at which access operation simultaneous recording and reproduction is disabled, the above expressions are set for each of prescribed sections.

FIG. 19 shows the order of the recording areas to be accessed for reproducing data after after-recording. Data can be read without requiring any access time since the after-recorded data is before the recording area of the AVM data. The reproduction condition for audio data and video data is as follows.

$$YV/VdV \geq Tpr1AV+Tf1+TinA+TcAV+P*(TcAV+TcA)+ \\ ToutA+Tf2+TcAV+Tf3+Tpo2AV+(P+2)*(a+b) \\ *Ts+2*a*Ts\ YV=(Tpr1AV+(P+2)*TcAV+Tpo2AV) \\ *Vt*(VdV/Vd)$$

$$YA/VdA \geq Tpr1AV+Tf1+TinA+TcAV+P*(TcAV+TcA)+ \\ ToutA+Tf2+TcAV+Tf3Tpo2AV+(P+2)*(a+b)*Ts+ \\ 2*a*Ts\ YA=(Tpr1AV+Tpr2AV+Tpo1AV+Tpo2AV) \\ *Vt*(VdA/Vd)+(TinA+P*TcA+ToutA)*Vt$$

$$TinAV*Vt*(VdA/Vd)=TinA*Vt$$

$$ToutAV*Vt*(VdA/Vd)=ToutA*Vt$$

$$TcAV*Vt*(VdA/Vd)=TcA*Vt$$

$$TcAV=Tpr2AV+TinAV=ToutAV+Tpo1AV$$

Accordingly, the following expression is obtained.

$$YV/VdV \geq (Tf1+Tf2+Tf3+(P+2)*(a+b)*Ts+2*a*Ts- \\ (Tpr1AV+Tpr2AV+Tpo1AV+TpoAV2)*VdA/Vd) \\ *Vt/(Vt-VdA)$$

Where the reading of the after-recorded audio data and the reading of the AVM data are performed in one cycle of reproduction, the reproduction condition of the video data is as follows.

$$YV'/VdV \geq TcA+TcAV+(a+b)*Ts$$

$$YV'=TcAV*Vt*(VdV/Vd)$$

Accordingly, the following expression is obtained.

$$Y'/Vd \geq ((a+b)*Ts)*Vt/(Vt-Vd-VdA)$$

The reproduction condition is less strict than the recording condition.

As a second specific example, a method for recording and a method for reproduction in the case where the audio data is after-recorded in a recording area which is distanced from the recording area of the AVM data will be described with reference to FIGS. 20, 21 and 22.

Figure 20:
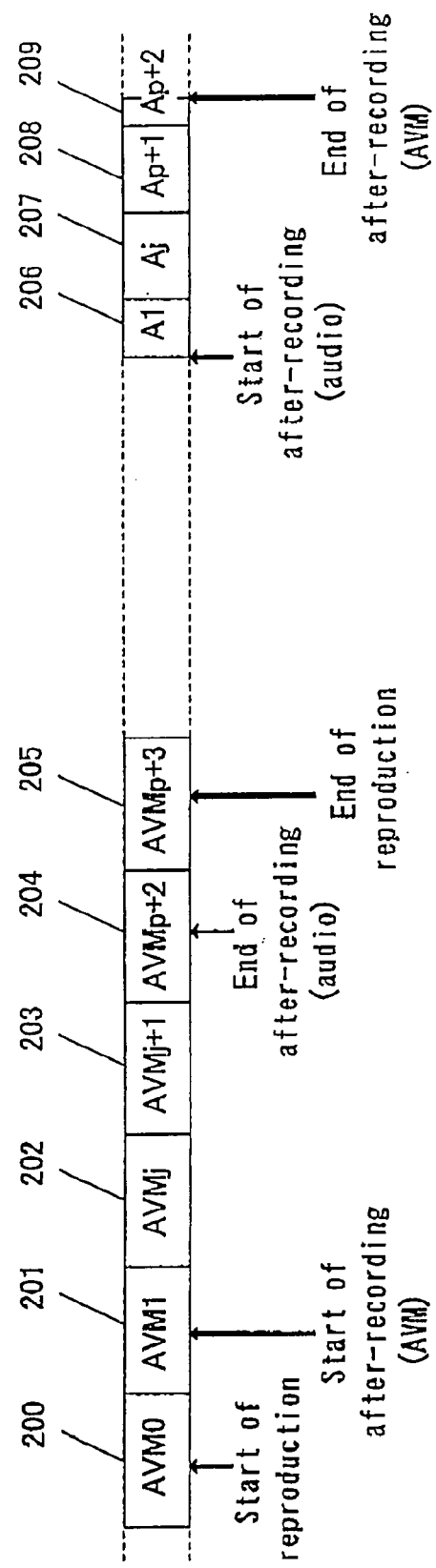
FIG. 20 is an arrangement of recording areas in the case where AVM data and data for after-recording are recorded in areas distanced from each other according to the fourth example of the present invention.

FIG. 20 shows an arrangement of the AVM data and data for after-recording data on a disc. The AVM data is continuously recorded (recording areas 200, 201, 202, 203, 204 and 205). For after-recording, the data is recorded in recording areas distanced from the AVM data (recording areas 206, 207, 208 and 209).

The reproduction start position is set in the recording area 200, and the after-recording start positions for audio data and the corresponding video data are set in the recording areas 201 and 206, respectively. The after-recording termination positions are set in the recording areas 204 and 209, and the reproduction termination position is set in the recording area 205.

Figure 21:
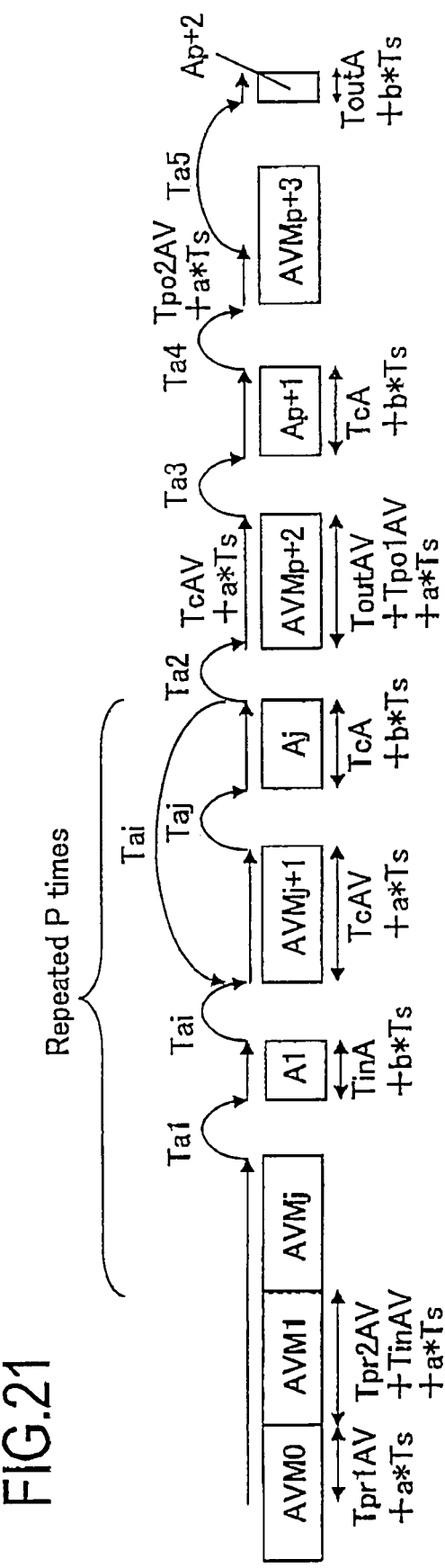
FIG. 21 shows access operations for recording and reproduction with after-recording in the case where AVM data and data for after-recording are recorded in areas distanced from each other according to the fourth example of the present invention.

FIG. 21 shows the order of the recording areas shown in FIG. 20 to be accessed for after-recording. As described above, data is after-recorded in correspondence with the AVM data which is immediately previous to the AVM data which has just been read. In the previous specific example, the recording area of the AVM data and the recording area for after-recording are close to each other, and thus the access time between these areas is short. In the case of FIG. 21, the access time is longer and the sizes required for the recording areas are larger. However, the arrangement of the recording areas for after-recording has flexibility. Therefore, data can be after-recorded in a new area, without overwriting the previously after-recorded data, i.e., while leaving the previously after-recorded data.

Hereinafter, a simultaneous recording and reproduction condition for realizing after-recording in the order of the recording areas to be accessed shown in FIG. 21 will be discussed.

Here, Ta1, Ta2, Tai and Taj (i and j each represent the number assigned to the data in the order of address) each represent an access time between corresponding areas which is determined based on the access performance of the drive. Each access time is close to the full seek time.

The simultaneous recording and reproduction condition for video data with after-recording is as follows.

$$Y/Vd \geq Tpr1AV+2*TcAV+Ta1+TinA+(P-1)*(TcAV+ \\ TcA+Taj+Tai)+Ta2+TcAV+Ta3+TcA+Ta4+ \\ Tpo2AV+(P+1)*(a+b)*Ts+3*a*Ts$$

$$Y=(Tpr1AV+(P+2)*TcAV+Tpo2AV)*Vt$$

$$TinAV*Vt*(VdA/Vd)=TinA*Vt$$

$$ToutAV*Vt*(VdA/Vd)=ToutA*Vt$$

$$TcAV*Vt*(VdA/Vd)=TcA*Vt$$

$$TcAV=Tpr2AV+TinAV=ToutAV+Tpo1AV$$

The label "repeated P times" in FIG. 21 means that, for example, in the case of P=3, AVM2, A1, AVM3, A2, AVM4 and A3 exist in the range of P number of continuous areas, where $2 \leq j \leq P$. Accordingly, the following expression is obtained.

$$Y/Vd \geq Ta1+Ta2+(P-1)*(Taj+Tai)+Ta3+Ta4+(P+1)* \\ (a+b)*Ts+3*a*Ts-(Tpr1AV+Tpr2AV+ToutAV+ \\ Tpo1AV+Tpo2AV)*VdA/Vd)*Vt/(Vt-Vd-VdA)$$

Regarding one cycle of after-recording in which the AVMj+1 is read, Aj is accessed, the data is recorded in Aj, and AVMj+2 is accessed, the following expressions are obtained.

$$Y'/Vd \geq TcAV+Taj+TcA+Tai+(a+b)*Ts$$

$$Y'=TcAV*Vt$$

Accordingly, the following expression is obtained.

$$Y'/Vd \geq (Taj+Tai+(a+b)*Ts)*Vt/(Vt-Vd-VdA)$$

In consideration of the section from the reproduction start position to Tai, the following expressions are obtained.

$$Y''/Vd \geq Tpr1AV+2*TcAV+Ta1+TinA+Tai+3*a*Ts+b*Ts$$

$$Y''=(Tpr1AV+2*TcAV)*Vt$$

Accordingly, the following expression is obtained.

$$Y''/Vd \geq (Ta1+TinA+Tai+3*a*Ts+b*Ts)*Vt/(Vt-Vd)$$

When the three expressions in which the left side is Y/Vd, Y'/Vd and Y''/Vd are all fulfilled, after-recording is made possible.

Figure 22:
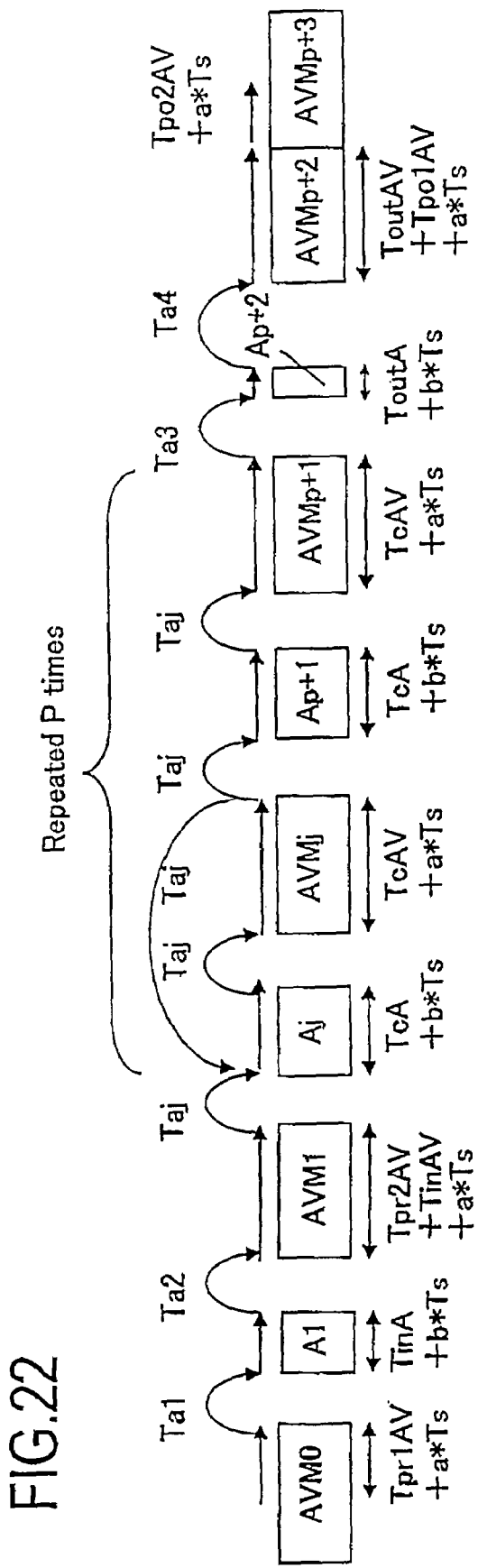
FIG. 22 shows access operations for reproduction after after-recording in the case where AVM data and data for after-recording are recorded in areas distanced from each other according to the fourth example of the present invention.

FIG. 22 shows the order of the recording areas to be accessed for reproducing data after after-recording. For reproduction, an access time is required since the after-recorded data is distanced from the recording area of the AVM data. The condition for reproducing the video data with after-recording is as follows.

$$YV/VdV \geq (Tpr1AV+Ta1+TinA+Ta2+TcV+P*(TcA+Taj+TcAV+Taj)+Ta3+ToutA+Ta4+TcAV+Tpo2AV+(P+2)*(a+b)*Ts+2*a*Ts)$$

$$YV=(Tpr1AV+Tpr2AV+TinAV+P*TcAV+TcAV+Tpo2AV)*Vt*(VdV/Vd)$$

The condition for reproducing the after-recorded audio data is as follows.

$$YA/VdA \geq (Tpr1AV+Ta1+TinA+Ta2+TcV+P*(TcA+Taj+TcAV+Taj)+Ta3+ToutA+Ta4+TcAV+Tpo2AV+(P+2)*(a+b)*Ts+2*a*Ts)$$

$$YA=(Tpr1AV+Tpr2AV+Tpo1AV+Tpo2AV)*Vt*(VdA/Vd)+(TinA+P*TcA+ToutA)*Vt$$

$$TinAV*Vt*(VdA/Vd)=TinA*Vt$$

$$ToutAV*Vt*(VdA/Vd)=ToutA*Vt$$

$$TcAV*Vt*(VdA/Vd)=TcA*Vt$$

$$TcAV=Tpr2AV+TinAV=ToutAV+Tpo1AV$$

Accordingly, the following expression is obtained.

$$YV/VdV \geq (Ta1+Ta2+2*P*Taj+Ta3+Ta4+(P+2)*(a+b)*Ts+2*a*Ts-(Tpr1AV+Tpr2AV+ToutAV+Tpo1AV+Tpo2AV)*VdA/Vd)*Vt/(Vt-Vd-VdA)$$

The condition regarding the video data for the section from the reproduction start position to Ta2 is as follows.

$$(Tpr1AV*Vt*(VdV/Vd))/VdV \geq (Tpr1AV+Ta1+TinA+Ta2+(a+b)*Ts)$$

Accordingly, the following expression is obtained.

$$(Tpr1AV*Vt*(VdV/Vd))/VdV \geq (TinAV+Ta1+Ta2+(a+b)*Ts)*Vt/(Vt-Vd)$$

The condition regarding the video data from the preroll to immediately before AVMj is as follows.

$$YV'/VdV \geq (Tpr1AV+Ta1+TinA+Ta2+TcAV+Taj+TcA+Taj+2*(a+b)*Ts) \quad YV'=(Tpr1AV+TcAV)*Vt*(VdV/Vd)$$

Accordingly, the following expression is obtained.

$$YV'/VdV \geq (Ta1+Ta2+2*Taj+2*(a+b)*Ts+TinA-Tpr1A)*Vt/(Vt-Vd-VdA)$$

The after-recording is different from recording in that in the case of after-recording, after the corresponding audio data is read, the AVM data is read. However, one cycle of after-recording and one cycle of reading Aj and AVMj are different from each other merely in Taj. When all the access times represented by Taj are the same between one cycle of after-recording and one cycle of reading Aj and AVMj, the conditions for after-recording and for recording are the same.

Next, as a third specific example, a method for recording and a method for reproduction in the case where audio data and video data are encoded and recorded in different areas, and audio data to be after-recorded is also recorded in a recording area distanced from the video data will be described with reference to FIGS. 23, 24 and 25.

Figure 23:
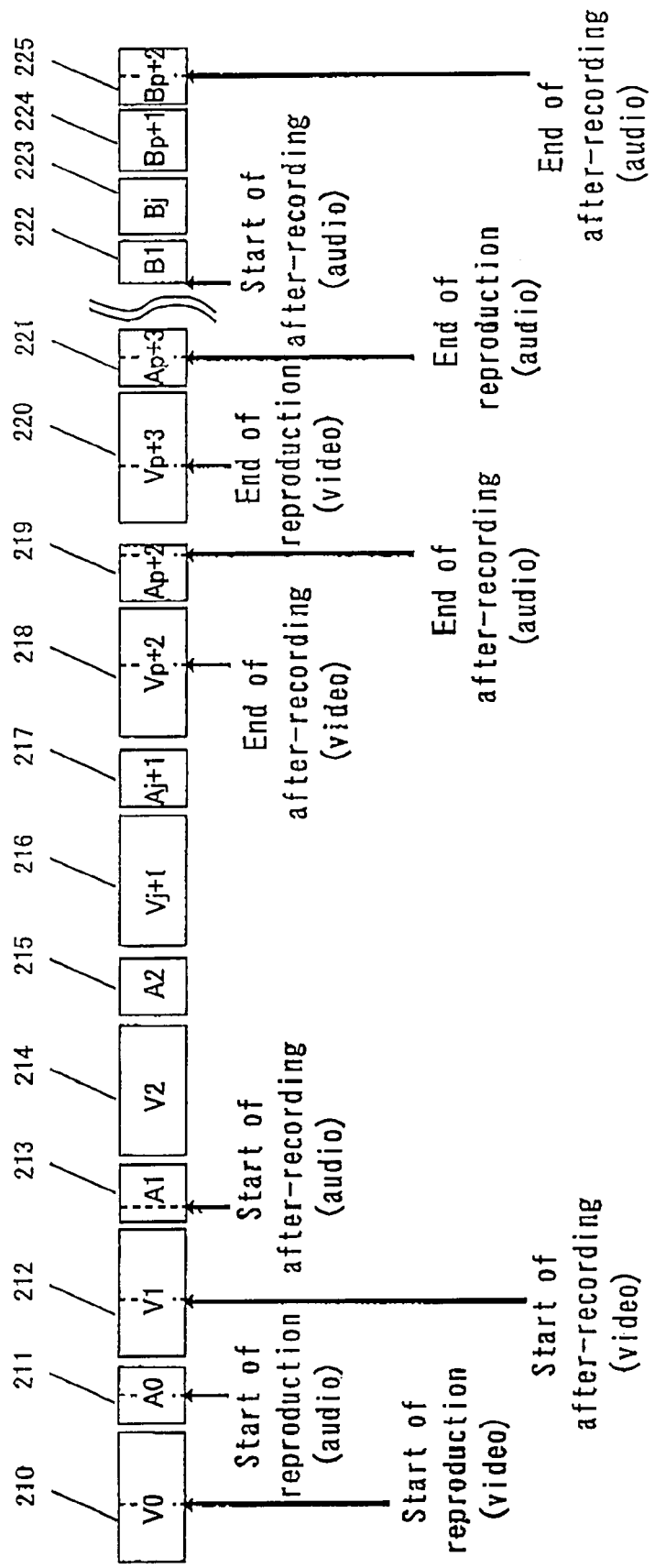
FIG. 23 shows an arrangement of recording areas in the case where audio data, video data and data for after-recording are recorded in separate areas according to the fourth example of the present invention.

FIG. 23 shows an arrangement of the video data, the audio data, and the data for after-recording on a disc. The video data and the audio data are recorded alternately in different recording areas at a prescribed period. (The recording areas of the video data are recording areas 210, 212, 214, 216, 218 and 220. The recording areas of the audio data are recording areas 211, 213, 215, 217, 219 and 221. The data for after-recording is recorded in different recording areas from these areas, i.e., recording areas 222, 223, 224 and 225).

The reproduction start positions for the audio data and the video data are respectively set in the recording areas 211 and 210, and the after-recording start positions for audio data and video data are respectively set in the recording areas 213 and 212. The after-recording termination positions are set in the recording areas 219 and 218, and the reproduction termination positions are set in the recording areas 221 and 220. The after-recording start position for the data for after-recording is further set in the recording area 222, and the after-recording termination position for the data for after-recording is further set in the recording area 225.

As described above, during after-recording, data is reproduced from the reproduction start position until the reproduction termination position in the recording areas 210 through 221. Thus, new audio data is added to the audio data Ai which is recorded from the after-recording start position to the after-recording termination position. The new data is recorded in the new recording areas 222 through 225. In this case, the audio data is after-recorded while reproducing the two pieces of real time data, i.e., the audio data and the video data which have already been recorded.

Figure 24:
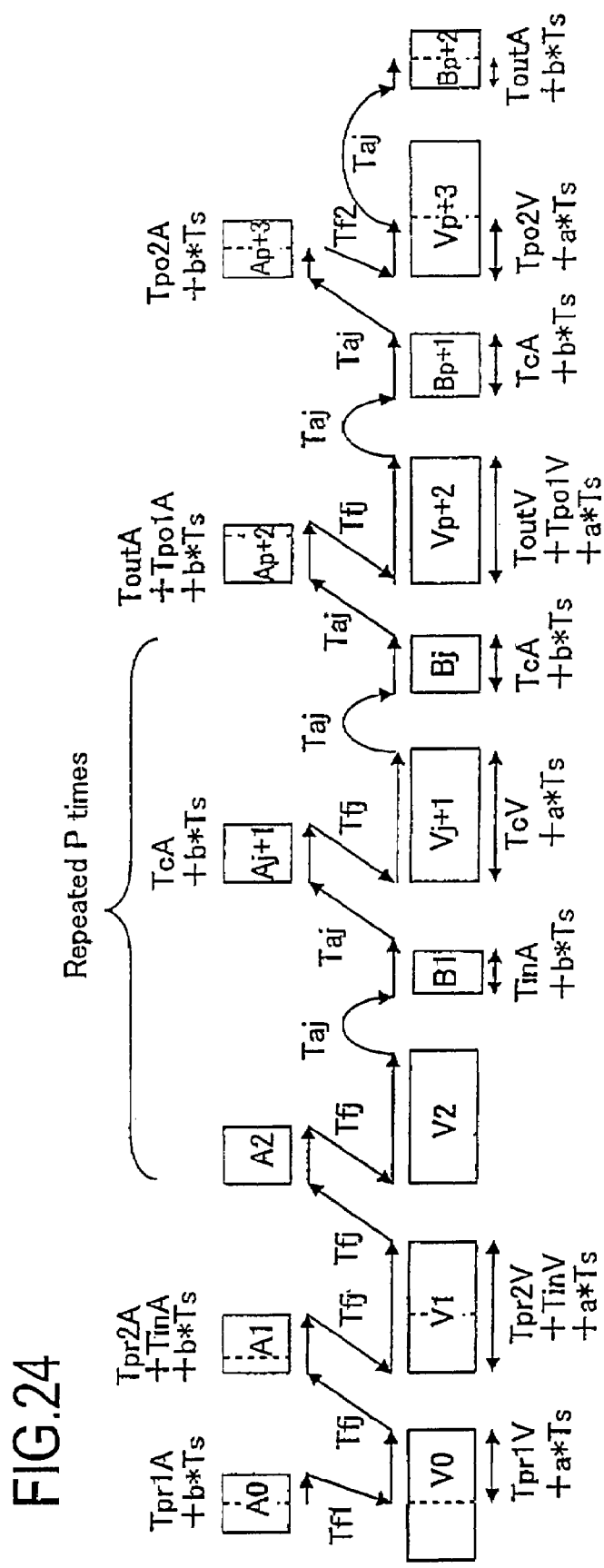
FIG. 24 shows access operations for recording and reproduction with after-recording in the case where audio data, video data and data for after-recording are recorded in separate areas according to the fourth example of the present invention.

FIG. 24 shows the order of the recording areas shown in FIG. 23 to be accessed for after-recording, and also shows the reading time from the recording areas and recording time or access time to the recording areas. As described above, data is after-recorded in correspondence with the video data which is immediately previous to the video data which has just been read. In the previous, first specific example, the video data and the audio data are recorded together as AVM data and thus there is no access time necessary between the video data and the audio data. In this example, the video data and the audio data are recorded separately, and thus an access time therebetween is necessary. However, the arrangement of recording areas for audio data has flexibility.

Therefore, audio data can be recorded in a new area, without overwriting the previously recorded audio data, i.e., while leaving the previously recorded audio data. Similarly, after-recording can be performed a plurality of times.

Hereinafter, a simultaneous recording and reproduction condition for realizing after-recording in the order of the recording areas to be accessed shown in FIG. 24 will be discussed. The simultaneous recording and reproduction condition for video data with after-recording is as follows.

$$YV/VdV \geq Tpr1A + Tpr1V + Tf1 + 2*(TcA + TcV + 2Tfj) + \\ 2*Taj + TinA + (P-1)*(TcV + 2*TcA + Tfj + 2*Taji) + \\ TcA + Tfj + TcV + Taj + TcA + Taj + Tpo2A + Tf2 + Tpo2V + \\ (P+1)*(a+b)*Ts + 3*a*Ts$$

The label "repeated P times" in FIG. 24 means that, for example, in the case of P=3, A2, V2, B1, A3, V3, B2, A4, V4 and B3 exist in the range of P number of continuous areas, where $2 \leq j \leq P$. Accordingly, the following expression is obtained.

$$YV = (Tpr1V + (P+2)*TcV + Tpo2V)*Vt$$

$$TinV*VdA = TinA*VdV$$

$$ToutV*VdA = ToutA*VdV$$

$$TcV*VdA = TcA*VdV$$

$$TcV = Tpr2V + TinV = ToutV + Tpo1V$$

$$TcA = Tpr2A + TinA = ToutA + Tpo1A$$

Accordingly, the following expression is obtained.

$$YV/VdV \geq (Tf1 + Tf2 + (P+5)*Tfj + (2*P+2)Taj + (P+1)* \\ (a+b)*Ts + 3*a*Ts - Tpr1A - Tpri2A - T \text{ out} \\ A - Tpo1A - Tpo2A)*Vt/(Vt - VdV - 2*VdA)$$

In consideration of one cycle of after-recording in which Aj+1 is read, Vj+1 is accessed, Vj+1 is read, Bj is accessed, data is recorded in Bj, and Aj+2 is accessed, the following expressions are obtained.

$$YV'/VdV \geq TcA + Tfj + TcV + 2*Taj + TcA + (a+2*b)*Ts$$
$$YV' = TcV*Vt$$

Accordingly, the following expression is obtained.

$$Y'/Vd \geq (Tfj + 2*Taj + (a+2*b)*Ts)*Vt/(Vt - VdV - 2*VdA)$$

In consideration of the section from the reproduction start position to immediately before Vj+1, the following expressions are obtained.

$$YV''/VdV \geq Tpr1A + Tpr1V + Tf1 + 2*(TcA + TcV + 2Tfj) + \\ 2*Taj + TinA + TcA + Tfj + 3*a*Ts + 5*b*Ts \ YV'' = \\ (Tpr1V + 2*TcV)*Vt$$

Accordingly, the following expression is obtained.

$$YV'''/Vd \geq (TinA + TcA + 2*Taj + Tf1 + 5*Tfj + 3*a*Ts + \\ 5*b*Ts)*Vt/(Vt - VdV - VdA)$$

By determining the sizes of the recording areas of the audio data, video data, and data for after-recording such that the sizes fulfill the above three expressions, simultaneous recording and reproduction is made possible.

In the above specific examples, the data for after-recording is recorded in a recording area distanced from the audio data and the video data. Alternatively, the video data, audio data and data for after-recording may be recorded in this order by turns. In this case, the recording areas for the audio data and data for after-recording are determined in advance when the video data is recorded. Since the recording areas are determined in advance, the recording areas cannot be easily used for other purposes when no after-recording is performed. However, an access time for data for after-recording is shortened, and thus the simultaneous recording and reproduction condition is alleviated.

Figure 25:
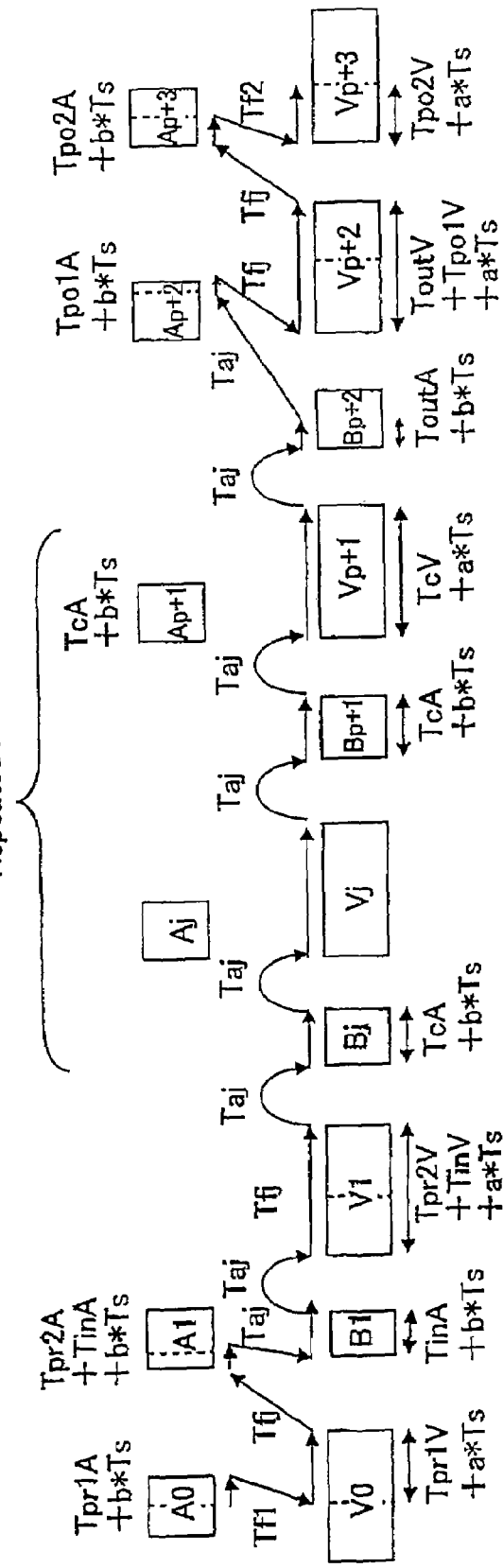
FIG. 25 shows access operations for reproduction after after-recording in the case where audio data, video data and data for after-recording are recorded in separate areas according to the fourth example of the present invention.

FIG. 25 shows the order of the recording areas to be accessed for reproducing data after after-recording. For recording, Bj needs to be recorded after Aj is read. The condition for reproduction is less strict than the condition for recording since access to Aj and reading of Aj are not necessary.

INDUSTRIAL APPLICABILITY

With an information recording medium according to the present invention, a recording operation and a reproduction operation are switched to each other in accordance with the amounts of data accumulated in the buffer memories. Therefore, the recording buffer is controlled to be kept close to empty, and the reproduction buffer is controlled to be kept close to full. Accordingly, even in a situation where data cannot be read by the pickup for a prescribed period of time, simultaneous recording and reproduction can be performed stably. Since the recording operation and the reproduction operation are switched at an appropriate timing, simultaneous recording and reproduction can be realized with a small buffer memory capacity. In the case where data is assigned such that the areas in which data is to be recorded has at least the minimum size required for four access operations, simultaneous recording and reproduction can be performed without fail even for a disc having data recorded by another apparatus.

By setting the optimal simultaneous recording and reproduction condition utilizing different transfer rates of the data to be recorded and the data to be reproduced, data having a low transfer rate can be recorded in a smaller recording area, which improves the utilization efficiency of the disc.

The invention claimed is:

1. A method for simultaneously recording and reproducing a plurality of pieces of real time data in accordance with a simultaneous recording and reproduction model,
    wherein the simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj,
    the method comprising the steps of:
    searching for an unassigned area in a volume space in the information recording medium and assigning at least one unassigned area in the volume space as an area Ai in which the real time data Di is to be recorded;
    executing a recording operation Wi for recording the real time data Di accumulated in the recording buffer WBi in the area Ai;
    executing a reproduction operation Rj for reading the real time data Dj from an area Aj having the real time data Dj recorded therein;
    determining whether the real time data Di has been recorded up to an end of one of at least one area assigned as the area Ai or not in the recording operation Wi; when the real time data Di is determined to have been recorded up to the end, switching the recording operation Wi to another recording operation Wi or a reproduction operation Rj; and when the real time data Di is determined not to have been recorded up to the end, continuing the recording operation Wi; and determining whether the real time data Dj has been reproduced up to an end of one of at least one area assigned as the area Aj or not in the reproduction operation Rj; when the real time data Dj is determined to have been reproduced up to the end, switching the reproduction operation Rj to another reproduction operation Rj or a recording operation Wi; and when the real time data Dj is determined not to have been reproduced up to the end, continuing the reproduction operation Rj;

wherein:

each of the at least one area assigned as the area Ai is structured to fulfill a condition that the real time data Di, which is accumulated in the recording buffer WBi during n number of access operations accompanying switching between the recording operation and the reproduction operation, (m−1) number of recording operations and (n−m) number of reproduction operations, can be recorded by one recording operation;

each of the at least one area assigned as the area Aj is structured to fulfill a condition that the real time data Dj, which is accumulated in the reproduction buffer RBj during one reproduction operation, can be consumed during n number of access operations accompanying switching between the reproduction operation and the recording operation, (n−m−1) number of reproduction operations and m number of recording operations; and i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

2. A method according to claim 1, wherein:

each of the at least one area assigned as the area Ai has a size of Yi, and each of the at least one area assigned as the area Aj has a size of Yj;

$$Yi=(n \times Ta \times Vt \times Vdi) \div \{Vt-(Vd1+Vd2+\ldots+Vdn)\};$$

$$Yj=(n \times Ta \times Vt \times Vdj) \div \{Vt-(Vd1+Vd2+\ldots+Vdn)\};$$

Ta is an access time required for the pickup P to access between an innermost area and an outermost area of the information recording medium;

Vt is a data transfer rate between the pickup P and the recording buffer WBi, and also a data transfer rate between the pickup P and the reproduction buffer RBj;

Vdi is a data transfer rate between the encoding module EMi and the recording buffer WBi; and Vdj is a data transfer rate between the decoding module DMj and the reproduction buffer RBj.

3. A method according to claim 1, further comprising the steps of estimating an access time required for the pickup P to access from an area Ak to an area Al where k and l are each any integer of 1 or greater and n or less, and k≠l.

4. A method according to claim 3, wherein:

each of the at least one area assigned as the area Ai has a size of Y, and each of the at least one area assigned as the area Aj has a size of Y;

$$Y=\{(T1+\ldots+Tn) \times Vt \times Vd\} \div (Vt-n \times Vd);$$

Tk is the access time;

Vt is a data transfer rate between the pickup P and the recording buffer WBi, and also a data transfer rate between the pickup P and the reproduction buffer RBj; and Vd is a data transfer rate between the encoding module EMi and the recording buffer WBi, and also a data transfer rate between the decoding module DMj and the reproduction buffer RBj, for all values of i and j.

5. A method according to claim 3, wherein:

each of the at least one area assigned as the area Ai has a size of Yi, and each of the at least one area assigned as the area Aj has a size of Yj;

$$Yi=\{(T1+\ldots+Tn) \times Vt \times Vdi\} \div \{Vt-(Vd1+Vd2+\ldots+Vdn)\};$$

$$Yj=\{(T1+\ldots+Tn) \times Vt \times Vdj\} \div \{Vt-(Vd1+Vd2+\ldots+Vdn)\};$$

Tk is the access time;

Vt is a data transfer rate between the pickup P and the recording buffer WBi, and also a data transfer rate between the pickup P and the reproduction buffer RBj;

Vdi is a data transfer rate between the encoding module EMi and the recording buffer WBi; and Vdj is a data transfer rate between the decoding module DMj and the reproduction buffer RBj.

6. A method according to claim 1, wherein the area Ai and the area Aj are provided in an outer portion of the information recording medium, for all values of i and for all values of j.

7. An information recording and reproduction apparatus for simultaneously recording and reproducing a plurality of pieces of real time data in accordance with a simultaneous recording and reproduction model, wherein the simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj, the information recording and reproduction apparatus comprising:

means for searching for an unassigned area in a volume space in the information recording medium and assigning at least one unassigned area in the volume space as an area Ai in which the real time data Di is to be recorded;

means for executing a recording operation Wi for recording the real time data Di accumulated in the recording buffer WBi in the area Ai;

means for executing a reproduction operation Rj for reading the real time data Dj from an area Aj having the real time data Dj recorded therein;

means for determining whether the recording buffer WBi is empty or not while the recording operation Wi is being executed; when the recording buffer WBi is determined to be empty, switching the recording operation Wi to another recording operation Wi or a reproduction operation Rj; and when the recording buffer WBi is determined not to be empty, continuing the recording operation Wi; and means for determining whether the reproduction buffer RBj is full or not while the reproduction operation Rj is being executed; when the reproduction buffer RBj is determined to be full, switching the reproduction operation Rj to another reproduction operation Rj or a recording operation Wi; and when the reproduction buffer RBj is determined not to be full, continuing the reproduction operation Rj;

wherein:

each of the at least one area assigned as the area Ai is structured to fulfill a condition that the recording buffer WBi can be made empty by at most one access operation and at most two recording operations;

each of at least one area assigned as the area Aj is structured to fulfill a condition that the reproduction buffer RBj can be made full by at most one access operation and at most two reproduction operations; and i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

8. An information recording and reproduction apparatus for simultaneously recording and reproducing a plurality of pieces of real time data in accordance with a simultaneous recording and reproduction model, wherein the simultaneous recording and reproduction model includes a pickup P for accessing an area on an information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj, the information recording and reproduction apparatus comprising:

means for searching for an unassigned area in a volume space in the information recording medium and assigning at least one unassigned area in the volume space as an area Ai in which the real time data Di is to be recorded;

means for executing a recording operation Wi for recording the real time data Di accumulated in the recording buffer WBi in the area Ai;

means for executing a reproduction operation Rj for reading the real time data Dj from an area Aj having the real time data Dj recorded therein;

means for determining whether the real time data Di has been recorded up to an end of one of at least one area assigned as the area Ai or not in the recording operation Wi; when the real time data Di is determined to have been recorded up to the end, switching the recording operation Wi to another recording operation Wi or a reproduction operation Rj; and when the real time data Di is determined not to have been recorded up to the end, continuing the recording operation Wi; and means for determining whether the real time data Dj has been reproduced up to an end of one of at least one area assigned as the area Aj or not in the reproduction operation Rj; when the real time data Dj is determined to have been reproduced up to the end, switching the reproduction operation Rj to another reproduction operation Rj or a recording operation Wi; and when the real time data Dj is determined not to have been reproduced up to the end, continuing the reproduction operation Rj;

wherein:

each of the at least one area assigned as the area Ai is structured to fulfill a condition that the real time data Di, which is accumulated in the recording buffer WBi during n number of access operations accompanying switching between the recording operation and the reproduction operation, (m−1) number of recording operations and (n−m) number of reproduction operations, can be recorded by one recording operation;

each of the at least one area assigned as the area Aj is structured to fulfill a condition that the real time data Dj, which is accumulated in the reproduction buffer RBj during one reproduction operation, can be consumed during n number of access operations accompanying switching between the reproduction operation and the recording operation, (n−m−1) number of reproduction operations and m number of recording operations; and i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

9. An information recording medium allowing for simultaneous recording and reproducing of a plurality of pieces of real time data in accordance with a simultaneous recording and reproduction model, wherein:

the simultaneous recording and reproduction model includes a pickup P for accessing an area on the information recording medium, an encoding module EMi for encoding real time data Di, a recording buffer WBi for accumulating the encoded real time data Di, a reproduction buffer RBj for accumulating real time data Dj read from the information recording medium, and a decoding module DMj for decoding the real time data Dj accumulated in the reproduction buffer RBj;

each of at least one area assigned as an area Ai in which the real time data Di is to be recorded is structured to fulfill a condition that the real time data Di, which is accumulated in the recording buffer WBi during n number of access operations accompanying switching between the recording operation and the reproduction operation, (m−1) number of recording operations and (n−m) number of reproduction operations, can be recorded by one recording operation;

each of at least one area assigned as an area Aj having the real time data Dj recorded therein is structured to fulfill a condition that the real time data Dj, which is accumulated in the reproduction buffer RBj during one reproduction operation, can be consumed during n number of access operations accompanying switching between the reproduction operation and the recording operation, (n−m−1) number of reproduction operations and m number of recording operations; and i is any integer of 1 or greater and m or less, j is any integer of (m+1) or greater and n or less, m is any integer which fulfills m<n and is 1 or greater, and n is any integer of 2 or greater which represents the number of the plurality of pieces of real time data for simultaneous recording and reproduction.

10. An information recording medium according to claim 9, wherein:

each of the at least one area assigned as the area Ai has a size of Yi, and each of the at least one area assigned as the area Aj has a size of Yj;

$$Yi=(n \times Ta \times Vt \times Vdi) \div \{Vt-(Vd1+Vd2+ \ldots +Vdn)\};$$

$$Yj=(n \times Ta \times Vt \times Vdj) \div \{Vt-(Vd1+Vd2+ \ldots +Vdn)\};$$

Ta is an access time required for the pickup P to access between an innermost area and an outermost area of the information recording medium;

Vt is a data transfer rate between the pickup P and the recording buffer WBi, and also a data transfer rate between the pickup P and the reproduction buffer RBj;

Vdi is a data transfer rate between the encoding module EMi and the recording buffer WBi; and Vdj is a data transfer rate between the decoding module DMj and the reproduction buffer RBj.

11. An information recording medium according to claim 9, wherein:

each of the at least one area assigned as the area Ai has a size of Y, and each of the at least one area assigned as the area Aj has a size of Y;

$$Y=\{(T1+\ldots+Tn)\times Vt\times Vd\}\div(Vt-n\times Vd);$$

Tk is an estimated access time required for the pickup P to access from an area Ak to an area Al, where k and l are each any integer of 1 or greater and n or less, and $k \neq l$;

Vt is a data transfer rate between the pickup P and the recording buffer WBi, and also a data transfer rate between the pickup P and the reproduction buffer RBj; and Vd is a data transfer rate between the encoding module EMi and the recording buffer WBi, and also a data transfer rate between the decoding module DMj and the reproduction buffer RBj, for all values of i and j.

12. An information recording medium according to claim 9, wherein:

each of the at least one area assigned as the area Ai has a size of Yi, and each of the at least one area assigned as the area Aj has a size of Yj;

$$Yi=\{(T1+\ldots+Tn)\times Vt\times Vdi\}\div\{Vt-(Vd1+Vd2+\ldots+Vdn)\};$$

$$Yj=\{(T1+\ldots+Tn)\times Vt\times Vdj\}\div\{Vt-(Vd1+Vd2+\ldots+Vdn)\};$$

Tk is an estimated access time required for the pickup P to access from an area Ak to an area Al, where k and l are each any integer of 1 or greater and n or less, and $k \neq l$;

Vt is a data transfer rate between the pickup P and the recording buffer WBi, and also a data transfer rate between the pickup P and the reproduction buffer RBj;

Vdi is a data transfer rate between the encoding module EMi and the recording buffer WBi; and Vdj is a data transfer rate between the decoding module DMj and the reproduction buffer RBj.

13. An information recording medium according to claim 9, wherein the area Ai and the area Aj are provided in an outer portion of the information recording medium, for all values of i and for all values of j.

* * * * *

UNITED STATES PATENT AND TRADEMARK OFFICE
CERTIFICATE OF CORRECTION

PATENT NO. : 7,324,416 B2 Page 1 of 1
APPLICATION NO. : 11/746673
DATED : January 29, 2008
INVENTOR(S) : Yoshiho Gotoh et al.

It is certified that error appears in the above-identified patent and that said Letters Patent is hereby corrected as shown below:

Title Page, insert -- (30) Foreign Application Priority Data

Aug. 30, 2001 (JP) 2001-262480
Sep. 25, 2001 (JP) 2001-292591
Jul. 30, 2002 (JP) 2002-221620
Aug. 19, 2002 (JP) 2002-238595 --

Title Page, item (62), after "Pat. No. 7,233,553", add -- , which is a 371 of PCT/JP02/08767, filed on August 29, 2002. --

Signed and Sealed this

Sixteenth Day of February, 2010

David J. Kappos
*Director of the United States Patent and Trademark Office*